United States Patent
Yasugi et al.

(10) Patent No.: US 11,070,801 B2
(45) Date of Patent: Jul. 20, 2021

(54) IMAGE CODER/DECODER RESTRICTING BINARY TREE SPLITTING OF TARGET NODE OBTAINED BY TERNARY TREE SPLIT

(71) Applicants: Sharp Kabushiki Kaisha, Sakai (JP); FG Innovation Company Limited, New Territories (HK)

(72) Inventors: Yukinobu Yasugi, Sakai (JP); Tomoko Aono, Sakai (JP); Tomohiro Ikai, Sakai (JP)

(73) Assignees: SHARP KABUSHIKI KAISHA, Sakai (JP); FG INNOVATION COMPANY LIMITED, New Territories (HK)

(*) Notice: Subject to any disclaimer, the term of this patent is extended or adjusted under 35 U.S.C. 154(b) by 0 days.

(21) Appl. No.: 16/469,673

(22) PCT Filed: Dec. 13, 2017

(86) PCT No.: PCT/JP2017/044732
§ 371 (c)(1),
(2) Date: Jun. 14, 2019

(87) PCT Pub. No.: WO2018/110600
PCT Pub. Date: Jun. 21, 2018

(65) Prior Publication Data
US 2019/0364279 A1    Nov. 28, 2019

(30) Foreign Application Priority Data

Dec. 16, 2016  (JP) .............................. JP2016-244902
Dec. 22, 2016  (JP) .............................. JP2016-249778

(51) Int. Cl.
*H04N 19/119*  (2014.01)
*H04N 19/176*  (2014.01)
*H04N 19/96*   (2014.01)

(52) U.S. Cl.
CPC ......... *H04N 19/119* (2014.11); *H04N 19/176* (2014.11); *H04N 19/96* (2014.11)

(58) Field of Classification Search
CPC ..... H04N 19/119; H04N 19/176; H04N 19/96
See application file for complete search history.

(56) References Cited

U.S. PATENT DOCUMENTS 9,912,944 B2 *  3/2018  Guo ....................... H04N 19/96
10,284,845 B2 *  5/2019  Panusopone .......... H04N 19/119
(Continued)

FOREIGN PATENT DOCUMENTS

WO    2014/120367 A1    8/2014

OTHER PUBLICATIONS

Chen et al., "Algorithm Description of Joint Exploration Test Model 4", Joint Video Exploration Team (JVET) of ITU-T SG 16 WP 3 and ISO/IEC JTC 1/SC 29/WG 11, JVET-D1001_v3, Oct. 15-21, 2016, 39 pages.
(Continued)

*Primary Examiner* — Jamie J Atala
*Assistant Examiner* — Michael Robert Cammarata
(74) *Attorney, Agent, or Firm* — Keating & Bennett, LLP

(57) ABSTRACT

Complexity of coding/decoding of a video is reduced. An image decoding apparatus (31) includes a CN information decoder (10) configured to hierarchically split a coding node by at least any of binary tree split and ternary tree split. The CN information decoder refers to a method of splitting an immediately higher node, which is a node one generation higher than a target node, to restrict a method of splitting the target node.

1 Claim, 77 Drawing Sheets

(A-b1)

(56) References Cited

U.S. PATENT DOCUMENTS

| | | | | |
|---|---|---|---|---|
| 10,326,989 | B2* | 6/2019 | Hong | H04N 19/159 |
| 10,779,004 | B2* | 9/2020 | Huang | H04N 19/159 |
| 10,904,580 | B2* | 1/2021 | Huang | H04N 19/96 |
| 2015/0304662 | A1* | 10/2015 | Liu | H04N 19/186 |
| | | | | 375/240.13 |
| 2017/0347128 | A1* | 11/2017 | Panusopone | H04N 19/46 |
| 2018/0103268 | A1* | 4/2018 | Huang | H04N 19/159 |
| 2018/0324441 | A1* | 11/2018 | Lim | H04N 19/198 |
| 2020/0036992 | A1* | 1/2020 | Lim | H04N 19/157 |

OTHER PUBLICATIONS

Li et al., "Multi-Type-Tree", Joint Video Exploration Team (JVET) of ITU-T SG 16 WP 3 and ISO/IEC JTC 1/SC 29/WG 11, JVET-D0117rl, Oct. 15-21, 2016, 3 pages.

Le Leannec, F. et al.; "Asymmetric Coding Units in QTBT"; Joint Video Exploration Team (JVET) of ITU-T SG 16 WP 3 and ISO/IEC JTC 1/SC 29/WG 11; Document: JVET-D0064; Oct. 15-21, 2016; 5 pages.

Yuan, Y. et al.; "CE2: Non-Square Quadtree Transform for symmetric and asymmetric motion partition"; Joint Collaborative Team on Video Coding (JCT-VC) of ITU-T SG16 WP3 and ISO/IEC JTC1/SC 29/WG 11; Document: JCTVC-F412; Jul. 14-22, 2011; pp. 1-7.

* cited by examiner

REFERENCE PICTURE LIST OF currPic (= B3)

QT (Quad Tree, QUAD TREE)

BT (Binary Tree, BINARY TREE)

(NO SPLIT)

TT (Triple Tree, TRIPLE TREE)

| | Descriptor |
|---|---|
| coding_quadtree( x0, y0, log2CbSize, cqtDepth ) { | |
| if( x0 + ( 1 << log2CbSize ) <= pic_width_in_luma_samples &&<br>y0 + ( 1 << log2CbSize ) <= pic_height_in_luma_samples &&<br>log2CbSize > MinCbLog2SizeY | |
| split_cu_flag[ x0 ][ y0 ] | ae(v) |
| if( cu_qp_delta_enabled_flag && log2CbSize >= Log2MinCuQpDeltaSize ) { | |
| IsCuQpDeltaCoded = 0 | |
| CuQpDeltaVal = 0 | |
| } | |
| if( cu_chroma_qp_offset_enabled_flag && log2CbSize >=<br>Log2MinCuChromaQpOffsetSize ) | |
| IsCuChromaQpOffsetCoded = 0 | |
| if( split_cu_flag[ x0 ][ y0 ] ) { | |
| x1 = x0 + ( 1 << ( log2CbSize − 1 ) ) | |
| y1 = y0 + ( 1 << ( log2CbSize − 1 ) ) | |
| coding_quadtree( x0, y0, log2CbSize − 1, cqtDepth + 1 ) | |
| if( x1 < pic_width_in_luma_samples ) | |
| coding_quadtree( x1, y0, log2CbSize − 1, cqtDepth + 1 ) | |
| if( y1 < pic_height_in_luma_samples ) | |
| coding_quadtree( x0, y1, log2CbSize − 1, cqtDepth + 1 ) | |
| if( x1 < pic_width_in_luma_samples &&<br>y1 < pic_height_in_luma_samples ) | |
| coding_quadtree( x1, y1, log2CbSize − 1, cqtDepth + 1 ) | |
| } else | |
| coding_binarytree(x0, y0, log2CbSize, log2CbSize, cqtDepth, 0 ) | |
| } | |

(A-c': HORIZONTAL) OR (A-c': VERTICAL)

(A-c: HORIZONTAL) OR (A-c: VERTICAL)

FIG. 17A

```
PT SPLIT FLAG DETERMINATION ()
{
    BTAvailable = BT SPLIT POSSIBILITY DETERMINATION ()
    TTAvailable = TT SPLIT POSSIBILITY DETERMINATION ()
    if (BTAvailable || TTAvailable)
        return TRUE
    else
        return FALSE
}
```

FIG. 17B

```
PT SPLIT FLAG DECODING ( x0, y0 )
{
    // split_pt_flag DECODING
    split_pt_flag[x0][y0] = decodeSplitPTFlag ()
}
```

FIG. 18A
```
BT SPLIT POSSIBILITY DETERMINATION ()
{
    minPTSize DERIVATION
    if ( (height >= minPTSize*2 || width >= minPTSize*2 ) &&
        width <= maxPTSize && height <= maxPTSize &&
        cptDepth < maxPTDepth )
        return TRUE
    else
        return FALSE
}
```

FIG. 18B
```
BT SPLIT POSSIBILITY DETERMINATION ()
{
    minPTSize DERIVATION
    if ( (height >= minPTSize*2 || width >= minPTSize*2 ) &&
        width <= maxPTSize && height <= maxPTSize &&
        cptDepth < maxPTDepth &&
        BT SPLIT POSSIBILITY DETERMINATION_ADDITIONAL CONDITION () )
        return TRUE
    else
        return FALSE
}
```

FIG. 19A
```
TT SPLIT POSSIBILITY DETERMINATION ()
{
    minPTSize DERIVATION
    if ( (height >= minPTSize*4 || width >= minPTSize*4 ) &&
        width <= maxPTSize && height <= maxPTSize &&
        cptDepth < maxPTDepth )
        return TRUE
    else
        return FALSE
}
```

FIG. 19B
```
TT SPLIT POSSIBILITY DETERMINATION ()
{
    minPTSize DERIVATION
    if ( (height >= minPTSize*4 || width >= minPTSize*4 ) &&
        width <= maxPTSize && height <= maxPTSize &&
        cptDepth < maxPTDepth &&
        TT SPLIT POSSIBILITY DETERMINATION_ADDITIONAL CONDITION () )
        return TRUE
    else
        return FALSE
}
```

```
BT SPLIT POSSIBILITY DETERMINATION_ADDITIONAL CONDITION ()
{
    if (parentSplitMode != MODE_TT || partIdx != 1)
        return TRUE if ((parentSplitDir == 0 && width < minPTSize*2) ||
        (parentSplitDir == 1 && height < minPTSize*2))
        return FALSE return TRUE
}
```

FIG. 20

```
BT SPLIT POSSIBILITY DETERMINATION_ADDITIONAL CONDITION ()
{
    if (parentSplitMode != MODE_BT || partIdx != 1)
        return TRUE // MODE_BT && partIdx == 1
    if (parentSplitDir == 0) {
        siblingHorBTCount DERIVATION
        if (siblingHorBTCount == 1 && width < minPTSize*2)
            return FALSE
    }
    if (parentSplitDir == 1) {
        siblingVerBTCount DERIVATION
        if (siblingVerBTCount == 1 && height < minPTSize*2)
            return FALSE
    }
    return TRUE
}
```

FIG. 21

```
BT SPLIT POSSIBILITY DETERMINATION_ADDITIONAL CONDITION ()
{
    if (parentSplitMode != MODE_TT || partIdx != 2)
        return TRUE // MODE_TT && partIdx == 2
    if (parentSplitDir == 0) {
        siblingHorBTCount DERIVATION
        if (siblingVerBTCount == 2 && height < minPTSize*2)
            return FALSE
    }
    if (parentSplitDir == 1) {
        siblingVerBTCount DERIVATION
        if (siblingHorBTCount == 2 && width < minPTSize*2)
            return FALSE
    }
    return TRUE
}
```

FIG. 22

```
TT SPLIT POSSIBILITY DETERMINATION_ADDITIONAL CONDITION ()
{
    if (parentSplitMode != MODE_TT || partIdx != 2)
        return TRUE // MODE_TT && partIdx == 2
    if (parentSplitDir == HOR) {
        siblingVerTTCount DERIVATION
        if (siblingVerTTCount == 2 && height < minPTSize*4)
            return FALSE
    }
    if (parentSplitDir == VER) {
        siblingHorTTCount DERIVATION
        if (siblingHorTTCount == 2 && width < minPTSize*4)
            return FALSE
    }
    return TRUE
}
```

FIG. 23

```
TT SPLIT POSSIBILITY DETERMINATION_ADDITIONAL CONDITION ()
{
    if (parentSplitMode !- MODE_BT || partIdx !- 1)
        return TRUE // MODE_BT && partIdx == 1
    if (parentSplitDir == 0) {
        siblingVerTTCount DERIVATION
        if (siblingVerTTCount == 1 && height < minPTSize*4)
            return FALSE
    }
    if (parentSplitDir == 1) {
        siblingHorTTCount DERIVATION
        if (siblingHorTTCount == 1 && width < minPTSize*4)
            return FALSE
    }
    return TRUE
}
```

FIG. 24

```
TT SPLIT POSSIBILITY DETERMINATION_ADDITIONAL CONDITION ()
{
    if (parentSplitMode != MODE_TT || parentSplitDir != 0 ||
        partIdx != 2)
        return TRUE // MODE_TT && HOR && partIdx == 2
    siblingVerTTCount DERIVATION
    if (siblingVerTTCount == 2 && height < minPTSize*4)
        return FALSE return TRUE
}
```

FIG. 25

```
TT SPLIT POSSIBILITY DETERMINATION_ADDITIONAL CONDITION ()
{
    if (parentSplitMode != MODE_TT || partIdx != 1)
        return TRUE // MODE_TT && partIdx == 1
    if ((parentSplitDir == HOR && height < minPTSize*4) ||
        (parentSplitDir == VER && width  < minPTSize*4))
        return FALSE return TRUE
}
```

FIG. 26

FIG. 27A
```
SPLIT DIRECTION FLAG DETERMINATION ()
{
   minPTSize DERIVATION
   if (width == minPTSize) {
      split_dir_flag[x0][y0] = 0
      return FALSE
   } else if (height == minPTSize) {
      split_dir_flag[x0][y0] = 1
      return FALSE
   } else {
      // NEITHER WIDTH/HEIGHT IS MINIMUM SIZE
      return TRUE
   }
}
```

FIG. 27B
```
SPLIT DERECTION FLAG DETERMINATION ()
{
 minPTSize DERIVATION
   if (width == minPTSize) {
      split_dir_flag[x0][y0] = 0
      return FALSE
   } else if (height == minPTSize) {
      split_dir_flag[x0][y0] = 1
      return FALSE   }
   else {
      // CASE THAT NEITHER WIDTH/HEIGHT IS MINIMUM SIZE
      BUT THERE IS ADDITIONAL CONDITION
      retrurn SPLIT DERECTION FLAG
      DETERMINATION_ADDITIONAL CONDITION ()
   }
}
```

FIG. 27C
```
SPLIT DIRECTION FLAG DECODING ()
{
   // split_dir_flag DECODING
   split_dir_flag[x0][y0] = decodeSplitDirFlag ()
}
```

```
SPLIT DIRECTION FLAG DETERMINATION_ADDITIONAL CONDITION ()
{
    horSplitAvailable = TRUE
    verSplitAvailable = TRUE if (parentSplitMode != MODE_TT || partIdx != 1)
        return TRUE // parentSplitMode == MODE_TT && partIdx == 1
    if ((parentSplitDir == 0) {         // parent: TT(HOR)
        if (height < minPTSize*4)
            horSplitAvailable = FALSE
    } else {                             // parent: TT(VER)
        if (width < minPTSize*4)
            verSplitAvailable = FALSE
    } if (horSplitAvailable && verSplitAvailable)
        return TRUE if (horSplitAvailable)
        split_dir_flag[x0][y0] = 0
    else
        split_dir_flag[x0][y0] = 1 return FALSE
}
```

FIG. 28

```
SPLIT DIRECTION FLAG DETERMINATION_ADDITIONAL CONDITION ()
{
    horSplitAvailable = TRUE
    verSplitAvailable = TRUE if (parentSplitMode != MODE_BT || partIdx != 1)
        return TRUE // parentSplitMode == MODE_BT && partIdx == 1
    if ((parentSplitDir == 0) {           // parent: TT(HOR)
        siblingHorBTCount DERIVATION
        if (siblingHorBTCount == 1 && height < minPTSize*4)
            horSplitAvailable = FALSE
    } else {                              // parent: TT(VER)
        siblingVerBTCount DERIVATION
        if (siblingVerBTCount == 1 && width < minPTSize*4)
            verSplitAvailable = FALSE
    } if (horSplitAvailable && verSplitAvailable)
        return TRUE if (horSplitAvailable)
        split_dir_flag[x0][y0] = 0
    else
        split_dir_flag[x0][y0] = 1 return FALSE
}
```

FIG. 29

```
SPLIT DIRECTION FLAG DETERMINATION_ADDITIONAL CONDITION ()
{
    horSplitAvailable = TRUE
    verSplitAvailable = TRUE if (parentSplitMode != MODE_TT || partIdx != 2)
        return TRUE // parentSplitMode == MODE_TT && partIdx == 2
    if ((parentSplitDir == 0) {          // parent: TT(HOR)
        siblingHorBTCount DERIVATION
        if (siblingVerBTCount == 2 && width < minPTSize*4)
            verSplitAvailable = FALSE
    } else {                              // parent: TT(VER)
        siblingVerBTCount DERIVATION
        if (siblingHorBTCount == 2 && height < minPTSize*4)
            horSplitAvailable = FALSE
    } if (horSplitAvailable && verSplitAvailable)
        return TRUE if (horSplitAvailable)
        split_dir_flag[x0][y0] = 0
    else
        split_dir_flag[x0][y0] = 1 return FALSE
}
```

FIG. 30

```
SPLIT DIRECTION FLAG DETERMINATION_ADDITIONAL CONDITION ()
{
    return TRUE
}
```

FIG. 31

```
SPLIT DIRECTION FLAG DETERMINATION_ADDITIONAL CONDITION ()
{
    if (parentSplitMode != MODE_TT || partIdx != 1)
        return TRUE // parentSplitMode == MODE_TT && partIdx == 1
    split_dir_flag[x0][y0] = parentSplitDir
}
```

FIG. 32

FIG. 33A
```
SPLIT MODE SELECTION FLAG DETERMINATION ()
{
    BTAvailable DERIVATION
    TTAvailable DERIVATION if (BTAvailable && TTAvailable) {
        return SPLIT MODE SELECTION FLAG
        DETERMINATION_ADDITIONAL CONDITION ()
    } if (BTAvailable)
        split_sel_flag[x0][y0] = MODE_BT
    else            // (TTAvailable == TRUE)
        split_sel_flag[x0][y0] = MODE_TT return FALSE
}
```

FIG. 33B
```
SPLIT MODE SELECTION FLAG DECODING ()
{
    // split_sel_flag DECODING
    split_sel_flag[x0][y0] = decodeSplitSelFlag ()
}
```

FIG. 34A

```
PT SPLIT FLAG DETERMINATION ()
{
    BTAvailable = BT SPLIT POSSIBILITY DETERMINATION ()
    TTAvailable = TT SPLIT POSSIBILITY DETERMINATION ()
    if (BTAvailable || TTAvailable)
        return TRUE
    else
        return FALSE
}
```

FIG. 34B

```
BT SPLIT POSSIBILITY DETERMINATION ()
{
    // BT DEPTH IS LESS THAN MAXIMUM BT DEPTH
    if ( (height >= minPTSize*2 || width >= minPTSize*2 ) &&
         (width <= maxPTSize && height <= maxPTSize) &&
         (btDepth < maxBTDepth) )
        return TRUE
    else
        return FALSE
}
```

FIG. 34C

```
TT SPLIT POSSIBILITY DETERMINATION ()
{
    // TT DEPTH IS LESS THAN MAXIMUM TT DEPTH
    if ( (height >= minPTSize*4 || width >= minPTSize*4 ) &&
         (width <= maxPTSize && height <= maxPTSize) &&
         (ttDepth < maxTTDepth) )
        return TRUE
    else
        return FALSE
}
```

FIG. 34D

```
PT SPLIT FLAG DETERMINATION ()
{
    // BT DEPTH IS LESS THAN MAXIMUM BT DEPTH OR TT DEPTH IS LESS
THAN MAXIMUM TT DEPTH
    if ( (height >= minPTSize*2 || width >= minPTSize*2 ) &&
         (width <= maxPTSize && height <= maxPTSize) &&
         (btDepth < maxBTDepth ||
          ttDepth < maxTTDepth) )
        return TRUE
    else
        return FALSE
}
```

FIG. 35A
```
SPLIT MODE SELECTION FLAG DETERMINATION ()
{
    if (BTAvailable && TTAvailable) {
        return TRUE
    return FALSE
}
```

FIG. 35B
```
PT SPLIT MODE SELECTION FLAG DETERMINATION ()
{
    // BT DEPTH IS LESS THAN MAXIMUM BT DEPTH AND TT DEPTH IS LESS
    THAN MAXIMUM TT DEPTH
    if ( (height >= minPTSize*4 || width >= minPTSize*4 ) &&
        (width <= maxPTSize && height <= maxPTSize) &&
        (btDepth < maxBTDepth && ttDepth < maxTTDepth))
        return TRUE
    else
        return FALSE
}
```

FIG. 36A

```
PT SPLIT FLAG DETERMINATION ()
{
    BTAvailable = BT SPLIT POSSIBILITY DETERMINATION ()
    TTAvailable = TT SPLIT POSSIBILITY DETERMINATION ()
    if (BTAvailable || TTAvailable)
        return TRUE
    else
        return FALSE
}
```

FIG. 36B

```
BT SPLIT POSSIBILITY DETERMINATION ()
{
    // BT DEPTH IS LESS THAN MAXIMUM BT DEPTH AND SUM OF BT DEPTH
    AND TT DEPTH IS LESS THAN MAXIMUM PT DEPTH
    if ( (height >= minPTSize*2 || width >= minPTSize*2 ) &&
         width <= maxPTSize && height <= maxPTSize &&
         btDepth < maxBTDepth && (btDepth+ttDepth) < maxPTDepth )
        return TRUE
    else
        return FALSE
}
```

FIG. 36C

```
TT SPLIT POSSIBILITY DETERMINATION ()
{
    // TT DEPTH IS LESS THAN MAXIMUM TT DEPTH AND SUM OF BT DEPTH
    AND TT DEPTH IS LESS THAN MUXIMUM PT DEPTH
    if ( (height >= minPTSize*4 || width >= minPTSize*4 ) &&
         width <= maxPTSize && height <= maxPTSize &&
         ttDepth < maxTTDepth && (btDepth+ttDepth) < maxPTDepth )
        return TRUE
    else
        return FALSE
}
```

FIG. 36D

```
PT SPLIT FLAG DETERMINATION ()
{
    // (BT DEPTH IS LESS THAN MAXIMUM BT DEPTH OR TT DEPTH IS
    LESS THAN MAXIMUM TT DEPTH AND TT DEPTH IS LESS THAN MAXIMUM PT
    DEPTH
    if ( (height >= minPTSize*2 || width >= minPTSize*2 ) &&
         width <= maxPTSize && height <= maxPTSize ) &&
         (btDepth < maxBTDepth ||
          ttDepth < maxTTDepth) &&
         (btDepth+ttDepth) < maxPTDepth )
        return TRUE
    else
        return FALSE
}
```

FIG. 37A

```
SPLIT MODE SLECTION FLAG DETERMINATION ()
{
    if (BTAvailable && TTAvailable) {
        return TRUE
    return FALSE
}
```

FIG. 37B

```
SPLIT MODE SELECTION FLAG DETEMINATION ()
{
    // BT DEPTH IS LESS THAN MAXIMUM BT DEPTH OR TT DEPTH IS LESS
THAN MAXIMUM TT DEPTH
    if ( (height >= minPTSize*4 || width >= minPTSize*4 ) &&
        (width <= maxPTSize && height <= maxPTSize) &&
        (btDepth < maxBTDepth && ttDepth < maxTTDepth) &&
        ((btDepth+ttDepth) < maxPTDepth ) )
        return TRUE
    else
        return FALSE
}
```

FIG. 38A

```
SPLIT MODE SELECTION FLAG DETERMINATION ()
{
    BTAvailable = BT SPLIT POSSIBILITY DETERMINATION ()
    TTAvailable = TT SPLIT POSSIBILITY DETERMINATION ()
    // NO BT AFTER TT
    if (ttDepth)
        BTAvailable = 0
    if (BTAvailable && TTAvailable)
        return TRUE
}
```

FIG. 38B

```
SPLIT MODE SELECTION FLAG DETERMINATION ()
{
    BTAvailable = BT SPLIT POSSIBILITY DETERMINATION ()
    TTAvailable = TT SPLIT POSSIBILITY DETERMINATION ()
    // NO TT AFTER BT
    if (btDepth)
        TTAvailable = 0
    if (BTAvailable && TTAvailable)
        return TRUE
}
```

FIG. 39A

```
SPLIT BASED ON SPLIT DIRECTION FLAG AND SPLIT MODE SELECTION
FLAG ()
{
    if (split_sel_flag[x0][y0] == 0) {              // BT
        if (split_dir_flag[x0][y0] == 0)            // HOR
            <HORIZONTAL BT SPLIT>
        else                                         // VER
            <VERTICAL BT SPLIT>
    } else {                                         // TT
        if (split_dir_flag[x0][y0] == 0)            // HOR
            <HORIZONTAL TT SPLIT>
        else                                         // VER
            <VERTICAL TT SPLIT>
    }
}
```

FIG. 39B

```
// RECURSIVE CALL OF BT/TT INFORMATION DECODING (WITHIN LOOP
CONCERNING partIdx)
{
    CONFIGURE VARIOUS ARAMETERS FOR DERIVATION BLOCK i
CONCERNING BLOCK i INDICATED BY partIdx

BT/TT INFORMATION DECODING ()
}
```

FIG. 41A
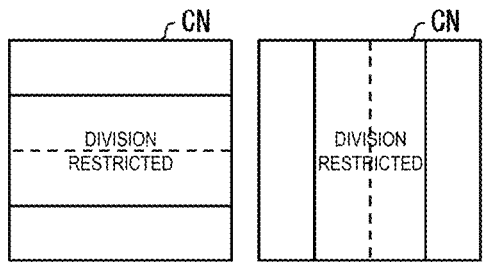
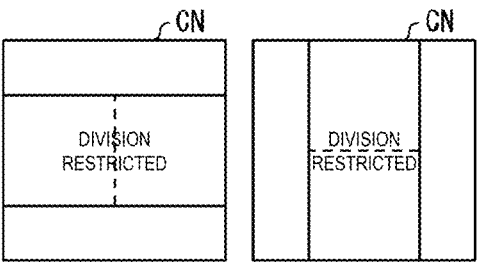
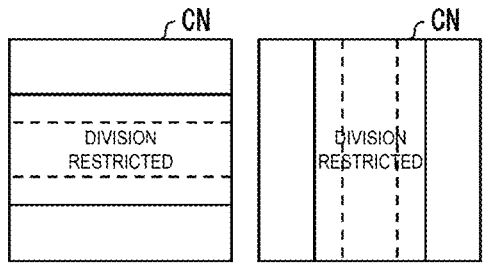
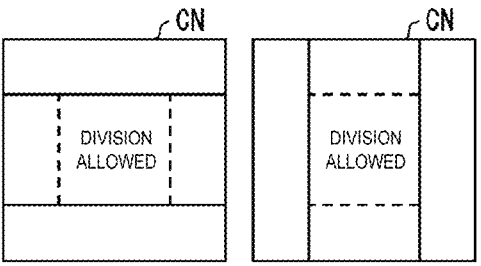
(B-d1)
FIG. 41B
(B-d1')
FIG. 41C
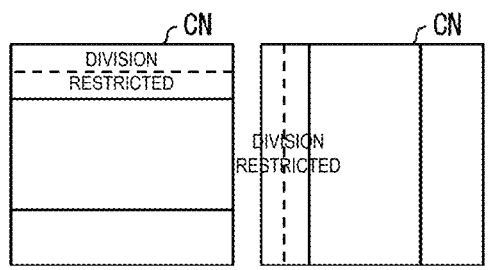
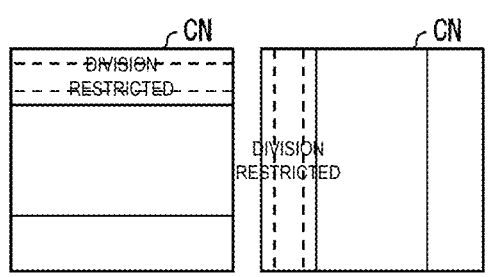
(B-d2)

```
SPLIT DIRECTION FLAG DETERMINATION_ADDITIONAL CONDITION ()
{
    // PROHIBIT SAME DIRECTION AS DIRECTION OF PARENT
    if (parentSplitMode == MODE_TT) {
        split_dir_flag[x0][y0] = 1 - parentSplitDir
        return FALSE
    }
    return TRUE
}
```

FIG. 42

```
SPLIT DIRECTION FLAG DETERMINATION_ADDITIONAL CONDITION ()
{
    // PARENT IS SPLIT BY TT AND TARGET IS MIDDLE BLOCK
    if (parentSplitMode == MODE_TT && partIdx == 1) {
        split_dir_flag[x0][y0] = 1 - parentSplitDir
        return FALSE
    }
    return TRUE
}
```

FIG. 43

```
SPLIT DIRECTION FLAG DETERMINATION_ADDITIONAL CONDITION ()
{
    // PARENT IS SPLIT BY TT AND TARGET IS BLOCK OTHER THAN MIDDLE
BLOCK
    if (parentSplitMode == MODE_TT && partIdx != 1) {
        split_dir_flag[x0][y0] = 1 - parentSplitDir
        return FALSE
    }
    return TRUE
}
```

FIG. 44

FIG. 45A
```
SPLIT DIRECTION FLAG DETERMINATION_ADDITIONAL CONDITION ()
{
    // PARENT IS SPLIT BY TT AND TARGET IS MIDDLE BLOCK
    if (parentSplitMode == MODE_TT && partIdx == 1) {
        split_dir_flag[x0][y0] = 1 - parentSplitDir
        return FALSE
    }
    return TRUE
}
```

FIG. 45B
```
BT SPLIT POSSIBILITY DETERMINATION_ADDITIONAL CONDITION ()
{
    // PARENT IS SPLIT BY TT AND TARGET IS MIDDLE BLOCK
    if (parentSplitMode == MODE_TT && partIdx == 1) {
        return FALSE
    }
    return TRUE
}
```

FIG. 45C

|  | BT | TT |
|---|---|---|
| SAME DIRECTION | DIVISION RESTRICTED | DIVISION RESTRICTED |
| DIFFERENT FIRECTION | DIVISION RESTRICTED | DIVISION ALLOWED |

FIG. 46A

```
SPLIT DIRECTION FLAG DETERMINATION_ADDITIONAL CONDITION ()
{
    // PROHIBIT DIRECTION SAME AS DIRECTION OF PARENT IF PARENT
IS SPLIT BY TT AND TARGET IS TO BE SPLIT BY TT SPLIT
    if (parentSplitMode == MODE_TT &&
        split_sel_flag[x0][y0] == MODE_TT) {
        split_dir_flag[x0][y0] = 1 - parentSplitDir
        return FALSE
    }
    return TRUE
}
```

FIG. 46B

|  | BT | TT |
|---|---|---|
| SAME DIRECTION | DIVISION ALLOWED | DEVISION RESTRICTED |
| DIFFERENT DIRECTION | DIVISION ALLOWED | DIVISION ALLOWED |

FIG. 47A 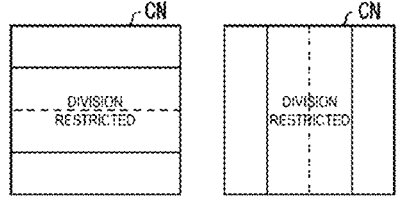 FIG. 47B
FIG. 47C 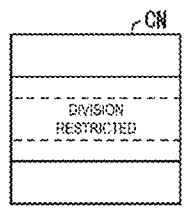 FIG. 47D 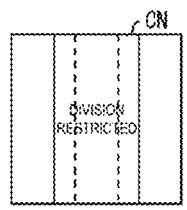
(B-e)
FIG. 47E 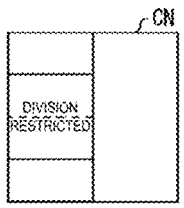 FIG. 47F 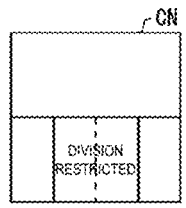 FIG. 47G 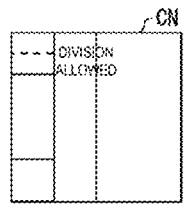 FIG. 47H 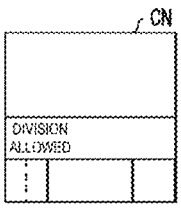
FIG. 47I 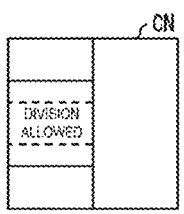 FIG. 47J 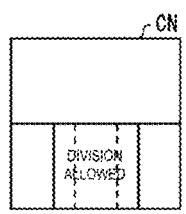 FIG. 47K 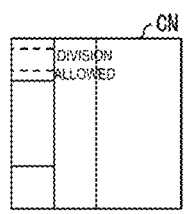 FIG. 47L 
(B-e)

```
SPLIT DIRECTION FLAG DETERMINATION_ADDITIONAL CONDITION ()
{
    // PARENT IS SPLIT BY TT AND TARGET HAS RECTANGULAR SHAPE
    if (parentSplitMode == MODE_TT && width != height) {
        split_dir_flag[x0][y0] = 1 - parentSplitDir
        return FALSE
    }
    return TRUE
}
```

FIG. 48

```
SPLIT MODE SELECTION FLAG DETERMINATION_ADDITIONAL CONDITION ()
{
    // PROHIBIT TT IN HOR DIRECTION IF HORIZONTALLY LONG width > M*height
    if (width > M*height &&
        split_dir_flag[x0][y0] == 0) {         // 0:HOR
        split_sel_flag[x0][y0] = MODE_BT
        return FALSE
    }
    // PROHIBIT TT IN VER DIRECTION IF VERTICALLY LONG height > M*width
    if (height > M*width &&
        split_dir_flag[x0][y0] == 1) {         // 1:VER
        split_sel_flag[x0][y0] = MODE_BT
        return FALSE
    }
    return TRUE
}
```

FIG. 51

```
SPLIT DIRECTION FLAG DETERMINATION ()
{
    // PROHIBIT TT IN HOR DIRECTION IF HORIZONTALLY LONG width > M*height
    if (width > M*height &&
        split_sel_flag[x0][y0] == MODE_TT) {
        split_dir_flag[x0][y0] = 1              // 1:VER
        return FALSE
    }
    // PROHIBIT TT IN VER DIRECTION IF VERTICALLY LONG height > M*width
    if (height > M*width &&
        split_sel_flag[x0][y0] == MODE_TT) {
        split_dir_flag[x0][y0] = 0              // 0:HOR
        return FALSE
    }
    return TRUE
}
```

FIG. 52

MNT(Multi Nine Tree)

MFT(Multi Five Tree)

MFT(Multi Five Tree)

DQT(Directional Quad Tree)

DQT(Directional Quad Tree)

DFT(Directional Five Tree)

DFT(Directional Five Tree)

DAQT (Directional Asymmetric Quad Tree)

DAQT (Directional Asymmetric Quad Tree)

DAQT (Directional Asymmetric Quad Tree)

DAQT (Directional Asymmetric Quad Tree)

FIG. 56A

```
MT SPLIT FLAG DETERMINATION ()
{
   if ( (height >= minPTSize*2 || width >= minPTSize*2 ) &&
       (width <= maxMTSize && height <= maxMTSize) &&
       (qtDepth < maxQTDepth || mntDepth < maxMNTDepth))
         return TRUE
     else
         return FALSE
}
```

FIG. 56B

```
MT SPLIT MODE SELECTION FLAG DETERMINATION()
{
   if ( (height >= minPTSize*4 && width >= minPTSize*4 ) &&
       (width <= maxMTSize && height <= maxMTSize) &&
       (qtDepth < maxQTDepth && mntDepth < maxMNTDepth))
         return TRUE
     else
         return FALSE
}
```

FIG. 58A

```
MT SPLIT FLAG DETERMINATION ()
{
  if ( (height >= minPTSize*2 || width >= minPTSize*2 ) &&
       (width <= maxMTSize && height <= maxMTSize) &&
       (qtDepth < maxQTDepth || mftDepth < maxMFTDepth))
         return TRUE
     else
         return FALSE
}
```

FIG. 58B

```
MT SPLIT MODE SELECTION FLAG DETERMINATION ()
{
  if ( (height >= minPTSize*4 && width >= minPTSize*4 ) &&
       (width <= maxMTSize && height <= maxMTSize) &&
       (qtDepth < maxQTDepth && mftDepth < maxMFTDepth))
         return TRUE
     else
         return FALSE
}
```

FIG. 58C

```
MT SPLIT DIRECTION FLAG DETERMINATION ()
{
  if ( mt_sel_flag == MODE_MFT &&
       (height >= minPTSize*4 && width >= minPTSize*4 ) &&
       (width <= maxMTSize && height <= maxMTSize) &&
       (qtDepth < maxQTDepth && mftDepth < maxMFTDepth))
         return TRUE
     else
         return FALSE
}
```

| MT SPLIT FLAG mt_split_flag | MT SPLIT MODE SELECTION FLAG mt_sel_flag | MT SPLIT MODE SELECTION FLAG mt_dir_flag | SHAPE |
|---|---|---|---|
| 1 (SPLIT) | 0 (QT) |  | QT |
| 1 (SPLIT) | 1 (MFT) | 0 (HOR) | MFTH |
| 1 (SPLIT) | 1 (MFT) | 1 (VER) | MFTV |

```
MT SPLIT FLAG DETERMINATION ()
{
    if ( (height >= minPTSize*2 || width >= minPTSize*2 ) &&
         (width <= maxMTSize && height <= maxMTSize) &&
         (qtDepth < maxQTDepth || dqtDepth < maxDQTDepth))
         return TRUE
      else
         return FALSE
}
```

FIG. 60B

```
MT SPLIT MODE SELECTION FLAG DETERMINATION ()
{
    if ( (height >= minPTSize*4 || width >= minPTSize*4 ) &&
         (width <= maxMTSize && height <= maxMTSize) &&
         (qtDepth < maxQTDepth && dqtDepth < maxDQTDepth))
         return TRUE
      else
         return FALSE
}
```

FIG. 60C

```
MT SPLIT DIRECTION FLAG DETERMINATION ()
{
    if ( mt_sel_flag == MODE_DQT &&
         (height >= minPTSize*4 || width >= minPTSize*4 ) &&
         (width <= maxMTSize && height <= maxMTSize) &&
         (qtDepth < maxQTDepth && dqtDepth < maxDQTDepth))
         return TRUE
      else
         return FALSE
}
```

| MT SPLIT FLAG mt_split_flag | MT SPLIT MODE SELECTION FLAG mt_sel_flag | MT SPLIT MODE SELECTION FLAG mt_dir_flag | SHAPE |
|---|---|---|---|
| 1 (SPLIT) | 0 (QT) | | QT |
| 1 (SPLIT) | 1 (DQT) | 0 (HOR) | DQTH |
| 1 (SPLIT) | 1 (DQT) | 1 (VER) | DQTV |

```
MT SPLIT FLAG DETERMINATION ()
{
  if ( (height >= minPTSize*2 || width >= minPTSize*2 ) &&
      (width <= maxMTSize && height <= maxMTSize) &&
      (qtDepth < maxQTDepth || dftDepth < maxDFTDepth))
        return TRUE
    else
        return FALSE
}
```

FIG. 62B

```
MT SPLIT MODE SELECTION FLAG DETERMINATION ()
{
  if ( (height >= minPTSize*8 || width >= minPTSize*8 ) &&
      (width <= maxMTSize && height <= maxMTSize) &&
      (qtDepth < maxQTDepth && dftDepth < maxDFTDepth))
        return TRUE
    else
        return FALSE
}
```

FIG. 62C

```
MT SPLIT DIRECTION FLAG DETERMINATION ()
{
  if ( mt_sel_flag == MODE_DQT &&
      (height >= minPTSize*8 || width >= minPTSize*8 ) &&
      (width <= maxMTSize && height <= maxMTSize) &&
      (qtDepth < maxQTDepth && dftDepth < maxDFTDepth))
        return TRUE
    else
        return FALSE
}
```

| MT SPLIT FLAG mt_split_flag | MT SPLIT MODE SELECTION FLAG mt_sel_flag | MT SPLIT MODE SELECTION FLAG mt_dir_flag | SHAPE |
|---|---|---|---|
| 1 (SPLIT) | 0 (QT) | | QT |
| 1 (SPLIT) | 1 (DQT) | 0 (HOR) | DFTH |
| 1 (SPLIT) | 1 (DQT) | 1 (VER) | DFTV |

```
MT SPLIT FLAG DETERMINATION ()
{
  if ( (height >= minPTSize*2 || width >= minPTSize*2 ) &&
       (width <= maxMTSize && height <= maxMTSize) &&
       (qtDepth < maxQTDepth || daqtDepth < maxDQATDepth))
          return TRUE
     else
          return FALSE
}
```

FIG. 65B

```
MT SPLIT MODE SELECTION FLAG DETERMINATION ()
{
  if ( (height >= minPTSize*8 || width >= minPTSize*8 ) &&
       (width <= maxMTSize && height <= maxMTSize) &&
       (qtDepth < maxQTDepth && daqtDepth < maxDAQTDepth))
          return TRUE
     else
          return FALSE
}
```

FIG. 65C

```
MT SPLIT DIRECTION FLAG DETERMINATION ()
{
  if ( mt_sel_flag == MODE_DAQT &&
       (height >= minPTSize*8 || width >= minPTSize*8 ) &&
       (width <= maxMTSize && height <= maxMTSize) &&
       (qtDepth < maxQTDepth && DAQTDepth < maxDAQTDepth))
          return TRUE
     else
          return FALSE
}
```

| MT SPLIT FLAG mt_split_flag | MT SPLIT MODE SELECTION FLAG mt_sel_flag | MT SPLIT DIRECTION FLAG mt_dir_flag | MT ASYMMETRIC FLAG mt_amt_flag | SHAPE |
|---|---|---|---|---|
| 1 (SPLIT) | 0 (QT) | | | QT |
| 1 (SPLIT) | 1 (DQT) | 0 (HOR) | 0 (AMT0) | DAQTH0 |
| 1 (SPLIT) | 1 (DQT) | 0 (HOR) | 1 (AMT1) | DAQTH1 |
| 1 (SPLIT) | 1 (DQT) | 1 (VER) | 0 (AMT0) | DAQTV0 |
| 1 (SPLIT) | 1 (DQT) | 1 (VER) | 1 (AMT1) | DAQTV1 |

```
PT SPLIT FLAG DETERMINATION ()
{
  if ( (height >= minPTSize*2 || width >= minPTSize*2 ) &&
      (width <= maxMTSize && height <= maxMTSize) &&
      (ptDepth < maxPTDepth || dqtDepth < maxDQTDepth))
        return TRUE
    else
        return FALSE
}
```

FIG. 68B

```
PT SPLIT MODE SELECTION FLAG DETERMINATION ()
{
  if ( (height >= minPTSize*4 || width >= minPTSize*4 ) &&
      (width <= maxMTSize && height <= maxMTSize) &&
      (ptDepth < maxPTDepth && dqtDepth < maxDQTDepth))
        return TRUE
    else
        return FALSE
}
```

FIG. 68C

```
PT SPLIT DIRECTION FLAG DETERMINATION ()
{
  if ( mt_sel_flag == MODE_DQT &&
      (height >= minPTSize*4 || width >= minPTSize*4 ) &&
      (width <= maxMTSize && height <= maxMTSize) &&
      (ptDepth < maxPTDepth && dqtDepth < maxDQTDepth))
        return TRUE
    else
        return FALSE
}
```

| PT SPLIT FLAG pt_split_flag | PT SPLIT DIRECTION FLAG pt_dir_flag | PT SPLIT MODE SELECTION FLAG pt_sel_flag | SHAPE |
|---|---|---|---|
| 1 (SPLIT) | 0 (HOR) | 0 (BT) | BTH |
| 1 (SPLIT) | 0 (HOR) | 1 (TT) | TTH |
| 1 (SPLIT) | 0 (HOR) | 2 (DQT) | DQTH |
| 1 (SPLIT) | 1 (VER) | 0 (BT) | BTV |
| 1 (SPLIT) | 1 (VER) | 1 (TT) | TTV |
| 1 (SPLIT) | 1 (VER) | 2 (DQT) | DQTV |

```
PT SPLIT FLAG DETERMINATION ()
{
  if ( (height >= minPTSize*2 || width >= minPTSize*2 ) &&
      (width <= maxMTSize && height <= maxMTSize) &&
      (ptDepth < maxPTDepth || dftDepth < maxDFTDepth))
        return TRUE
    else
        return FALSE
}
```

FIG. 70B

```
PT SPLIT MODE SELECTION FLAG DETERMINATION ()
{
  if ( (height >= minPTSize*8 || width >= minPTSize*8 ) &&
      (width <= maxMTSize && height <= maxMTSize) &&
      (ptDepth < maxPTDepth && dftDepth < maxDFTDepth))
        return TRUE
    else
        return FALSE
}
```

FIG. 70C

```
PT SPLIT DIRECTION FLAG DETERMINATION ()
{
  if ( mt_sel_flag == MODE_DFT &&
      (height >= minPTSize*8 || width >= minPTSize*8 ) &&
      (width <= maxMTSize && height <= maxMTSize) &&
      (ptDepth < maxPTDepth && dftDepth < maxDFTDepth))
        return TRUE
    else
        return FALSE
}
```

| PT SPLIT FLAG pt_split_flag | PT SPLIT DIRECTION FLAG pt_dir_flag | PT SPLIT MODE SELECTION FLAG pt_sel_flag | SHAPE |
|---|---|---|---|
| 1 (SPLIT) | 0 (HOR) | 0 (BT) | BTH |
| 1 (SPLIT) | 0 (HOR) | 1 (TT) | TTH |
| 1 (SPLIT) | 0 (HOR) | 2 (DFT) | DFTH |
| 1 (SPLIT) | 1 (VER) | 0 (BT) | BTV |
| 1 (SPLIT) | 1 (VER) | 1 (TT) | TTV |
| 1 (SPLIT) | 1 (VER) | 2 (DFT) | DFTV |

```
PT SPLIT FLAG DETERMINATION ()
{
  if ( (height >= minPTSize*2 || width >= minPTSize*2 ) &&
       (width <= maxMTSize && height <= maxMTSize) &&
       (ptDepth < maxPTDepth  || daqtDepth < maxDAQTDepth))
       return TRUE
    else
       return FALSE
}
```

FIG. 73B

```
PT SPLIT MODE SELECTION FLAG DETERMINATION ()
{
  if ( (height >= minPTSize*8 || width >= minPTSize*8 ) &&
       (width <= maxMTSize && height <= maxMTSize) &&
       (ptDepth < maxPTDepth && daqtDepth < maxDAQTDepth))
       return TRUE
    else
       return FALSE
}
```

FIG. 73C

```
PT SPLIT DIRECTION FLAG DETERMINATION ()
{
  if ( mt_sel_flag == MODE_DAQT &&
       (height >= minPTSize*8 || width >= minPTSize*8 ) &&
       (width <= maxMTSize && height <= maxMTSize) &&
       (ptDepth < maxPTDepth && daqtDepth < maxDAQTDepth))
       return TRUE
    else
       return FALSE
}
```

| PT SPLIT FLAG pt_split_flag | PT SPLIT DIRECTION FLAG pt_dir_flag | PT SPLIT MODE SELECTION FLAG pt_sel_flag | PT ASYMMETRIC FLAG pt_amt_flag | SHAPE |
|---|---|---|---|---|
| 1 (SPLIT) | 0 (HOR) | 0 (BT) | | BTH |
| 1 (SPLIT) | 0 (HOR) | 1 (TT) | | TTH |
| 1 (SPLIT) | 0 (HOR) | 2 (DAQT) | 0 | DAQTH0 |
| 1 (SPLIT) | 0 (HOR) | 2 (DAQT) | 1 | DAQTH1 |
| 1 (SPLIT) | 1 (VER) | 0 (BT) | | BTV |
| 1 (SPLIT) | 1 (VER) | 1 (TT) | | TTV |
| 1 (SPLIT) | 1 (VER) | 2 (DAQT) | 0 | DAQTV0 |
| 1 (SPLIT) | 1 (VER) | 2 (DAQT) | 1 | DAQTV1 |

FIG. 74

IMAGE CODER/DECODER RESTRICTING BINARY TREE SPLITTING OF TARGET NODE OBTAINED BY TERNARY TREE SPLIT

TECHNICAL FIELD

The embodiments of the present invention relate to a prediction image generation apparatus, a video decoding apparatus, and a video coding apparatus.

BACKGROUND ART

A video coding apparatus which generates coded data by coding a video, and a video decoding apparatus which generates decoded images by decoding the coded data are used to transmit or record a video efficiently.

For example, specific video coding schemes include methods suggested in H.264/AVC and High-Efficiency Video Coding (HEVC).

In such a video coding scheme, images (pictures) constituting a video are managed by a hierarchy structure including slices obtained by splitting images, coding units (also sometimes referred to as Coding Units (CUs)) obtained by splitting slices, Prediction Units (PUs) which are blocks obtained by splitting coding units, and Transform Units (TUs), and are coded/decoded for each CU.

In such a video coding scheme, usually, a prediction image is generated based on local decoded images obtained by coding/decoding input images, and prediction residual (also sometimes referred to as "difference images" or "residual images") obtained by subtracting the prediction images from input images (original image) are coded. Generation methods of prediction images include an inter-screen prediction (an inter prediction) and an intra-screen prediction (intra prediction).

Examples of a technique of recent video coding and decoding are described in NPL 1 and NPL 2.

CITATION LIST

Non Patent Literature

NPL 1: "Algorithm Description of Joint Exploration Test Model 4", JVET-D1001, Joint Video Exploration Team (JVET) of ITU-T SG 16 WP 3 and ISO/IEC JTC 1/SC 29/WG 11, 15-21 Oct. 2016

NPL 2: "Multi-Type-Tree", JVET-D0117, Joint Video Exploration Team (JVET) of ITU-T SG 16 WP 3 and ISO/IEC JTC 1/SC 29/WG 11, 15-21 Oct. 2016

SUMMARY OF INVENTION

Technical Problem

As a method of splitting a Coding Node (CN), NPL 2 introduces Binary Tree (BT) split and Ternary Tree (TT) split, in addition to Quad Tree (QT) split. Accordingly, there are more split patterns of a CU, which makes coding/decoding more complex. Implementation of complex split patterns has still been uneasy, and therefore there has been a demand for further improvement in terms of enhancement in coding efficiency.

The present invention is achieved in view of the problem described above, and has an object to provide an image decoding apparatus and an image coding apparatus that are capable of reducing complexity of coding/decoding of a video. The present invention has another object to provide an image decoding apparatus and an image coding apparatus that are capable of implementing complex split patterns with less split depth.

Solution to Problem

To solve the problem described above, an image decoding apparatus according to one aspect of the present invention is an image decoding apparatus for decoding a picture for each of coding tree units, the image decoding apparatus including a split unit configured to hierarchically split a coding node of the coding tree units by at least any of binary tree split and ternary tree split, wherein the split unit refers to a method of splitting an immediately higher node, which is a node one generation higher than a target node, to restrict a method of splitting the target node.

An image decoding apparatus according to one aspect of the present invention is an image decoding apparatus for decoding a picture for each of coding tree units, the image decoding apparatus including a split unit configured to hierarchically split a coding node of the coding tree units, wherein in a case that a target node has a rectangular shape with an aspect ratio of a prescribed value or greater, the split unit restricts split of the target node by ternary tree split that generates boundaries along a longitudinal direction of the target node.

An image decoding apparatus according to one aspect of the present invention is an image decoding apparatus for decoding a picture for each of coding tree units, the image decoding apparatus including a split unit configured to hierarchically split a coding node of the coding tree units by at least any of binary tree split and ternary tree split, wherein the split unit refers to a depth variable common to binary tree split and ternary tree split to restrict split of a target node.

An image coding apparatus according to one aspect of the present invention is an image coding apparatus for splitting a picture into coding tree units to code the picture, the image coding apparatus including a split unit configured to hierarchically split a coding node of the coding tree units by at least any of binary tree split and ternary tree split, wherein the split unit refers to a method of splitting an immediately higher node, which is a node one generation higher than a target node, to restrict a method of splitting the target node.

An image coding apparatus according to one aspect of the present invention is an image coding apparatus for splitting a picture into coding tree units to code the picture, the image coding apparatus including a split unit configured to hierarchically split a coding node of the coding tree units, wherein in a case that a target node has a rectangular shape with an aspect ratio of a prescribed value or greater, the split unit restricts split of the target node by ternary tree split that generates boundaries along a longitudinal direction of the target node.

An image coding apparatus according to one aspect of the present invention is an image coding apparatus for splitting a picture into coding tree units to code the picture, the image coding apparatus including a split unit configured to hierarchically split a coding node of the coding tree units by at least any of binary tree split and ternary tree split, wherein the split unit refers to a depth variable common to binary tree split and ternary tree split to restrict split of a target node.

An image coding apparatus according to one aspect of the present invention is an image decoding apparatus for decoding a picture for each of coding tree units, the image decoding apparatus including a split unit configured to split a coding node of the coding tree units, wherein the split unit refers to a first flag, a second flag, and a third flag, and in a case that the first flag indicates that split is to be performed by a first split type group, the first split type group including a split type for splitting a target node into nodes in 1:1:1:1 in a first direction to split the target node into four nodes, and quad tree split, and that the second flag indicates that split is to be performed by a split type for splitting into the four nodes, the split unit employs a direction indicated by the third flag as the first direction to split the target node into the four nodes.

Advantageous Effects of Invention

According to one aspect of the present invention, complexity of coding/decoding of a video can be reduced. An image decoding apparatus and an image coding apparatus that are capable of implementing complex split patterns with less split depth can be provided.

BRIEF DESCRIPTION OF DRAWINGS

FIGS. 2A to 2H illustrate partition shapes in cases that PU split modes are 2N×2N, 2N×N, 2N×nU, 2N×nD, N×2N, nL×2N, nR×2N, and N×N, respectively.

FIG. 12 is a diagram illustrating a configuration example of a syntax table of QT information according to the present embodiment.

FIGS. 17A and 17B are configuration diagrams of pseudocodes according to the present embodiment.

FIGS. 18A and 18B are configuration diagrams of pseudocodes according to the present embodiment.

FIGS. 19A and 19B are configuration diagrams of pseudocodes according to the present embodiment.

FIG. 20 is a configuration diagram of a pseudocode according to the present embodiment.

FIG. 21 is a configuration diagram of a pseudocode according to the present embodiment.

FIG. 22 is a configuration diagram of a pseudocode according to the present embodiment.

FIG. 23 is a configuration diagram of a pseudocode according to the present embodiment.

FIG. 24 is a configuration diagram of a pseudocode according to the present embodiment.

FIG. 25 is a configuration diagram of a pseudocode according to the present embodiment.

FIG. 26 is a configuration diagram of a pseudocode according to the present embodiment.

FIGS. 27A to 27C are configuration diagrams of pseudocodes according to the present embodiment.

FIG. 28 is a configuration diagram of a pseudocode according to the present embodiment.

FIG. 29 is a configuration diagram of a pseudocode according to the present embodiment.

FIG. 30 is a configuration diagram of a pseudocode according to the present embodiment.

FIG. 31 is a configuration diagram of a pseudocode according to the present embodiment.

FIG. 32 is a configuration diagram of a pseudocode according to the present embodiment.

FIGS. 33A and 33B are configuration diagrams of pseudocodes according to the present embodiment.

FIGS. 34A to 34D are configuration diagrams of pseudocodes according to the present embodiment.

FIGS. 35A and 35B are configuration diagrams of pseudocodes according to the present embodiment.

FIGS. 36A to 36D are configuration diagrams of pseudocodes according to the present embodiment.

FIGS. 37A and 37B are configuration diagrams of pseudocodes according to the present embodiment.

FIGS. 38A and 38B are configuration diagrams of pseudocodes according to the present embodiment.

FIGS. 39A and 39B are configuration diagrams of pseudocodes according to the present embodiment.

FIGS. 41A to 41C are diagrams illustrating examples of split patterns of the image decoding apparatus according to the present embodiment.

FIG. 42 is a configuration diagram of a pseudocode according to the present embodiment.

FIG. 43 is a configuration diagram of a pseudocode according to the present embodiment.

FIG. 44 is a configuration diagram of a pseudocode according to the present embodiment.

FIGS. 45A and 45B are configuration diagrams of pseudocodes according to the present embodiment. FIG. 45C is a diagram illustrating block splits according to the present embodiment.

FIG. 46A is a configuration diagram of a pseudocode according to the present embodiment. FIG. 46B is a diagram illustrating block splits according to the present embodiment.

FIGS. 47A to 47L are diagrams illustrating examples of split patterns of the image decoding apparatus according to the present embodiment.

FIG. 48 is a configuration diagram of a pseudocode according to the present embodiment.

FIG. 51 is a configuration diagram of a pseudocode according to the present embodiment.

FIG. 52 is a configuration diagram of a pseudocode according to the present embodiment.

FIGS. 56A and 56B are configuration diagrams of pseudocodes according to the present embodiment.

FIGS. 58A to 58C are configuration diagrams of pseudocodes according to the present embodiment.

FIG. 59 is a diagram illustrating examples of flags and shapes of a coding node according to the present embodiment.

FIGS. 60A to 60C are configuration diagrams of pseudocodes according to the present embodiment.

FIG. 61 is a table illustrating examples of flags and shapes of a coding node according to the present embodiment.

FIGS. 62A to 62C are configuration diagrams of pseudocodes according to the present embodiment.

FIG. 63 is a diagram illustrating examples of flags and shapes of a coding node according to the present embodiment.

FIGS. 65A to 65C are configuration diagrams of pseudocodes according to the present embodiment.

FIG. 66 is a diagram illustrating examples of flags and shapes of a coding node according to the present embodiment.

FIGS. 68A to 68C are configuration diagrams of pseudocodes according to the present embodiment.

FIG. 69 is a diagram illustrating examples of flags and shapes of a coding node according to the present embodiment.

FIGS. 70A to 70C are configuration diagrams of pseudocodes according to the present embodiment.

FIG. 71 is a diagram illustrating examples of flags and shapes of a coding node according to the present embodiment.

FIGS. 73A to 73C are configuration diagrams of pseudocodes according to the present embodiment.

FIG. 74 is a diagram illustrating examples of flags and shapes of a coding node according to the present embodiment.

FIG. 75A illustrates the transmitting apparatus equipped with the image coding apparatus, and FIG. 75B illustrates the receiving apparatus equipped with the image decoding apparatus.

FIG. 76A illustrates the recording apparatus equipped with the image coding apparatus, and FIG. 76B illustrates the regeneration apparatus equipped with the image decoding apparatus.

DESCRIPTION OF EMBODIMENTS

First Embodiment

Hereinafter, embodiments of the present invention are described with reference to the drawings.

Figure 77:
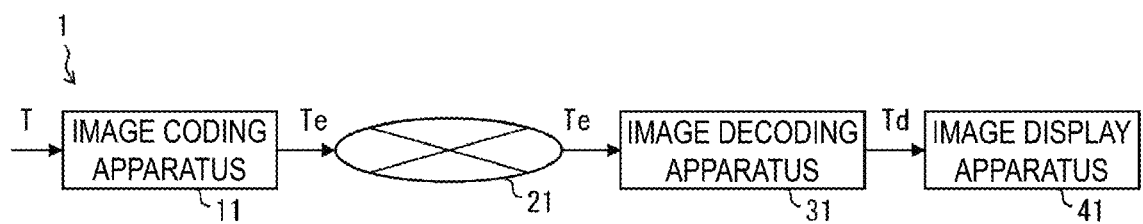
FIG. 77 is a schematic diagram illustrating a configuration of an image transmission system according to the present embodiment.

FIG. 77 is a schematic diagram illustrating a configuration of an image transmission system 1 according to the present embodiment.

The image transmission system 1 is a system configured to transmit codes of a coding target image having been coded, decode the transmitted codes, and display an image. The image transmission system 1 includes an image coding apparatus (video coding apparatus) 11, a network 21, an image decoding apparatus (video decoding apparatus) 31, and an image display apparatus 41.

An image T indicating an image of a single layer or multiple layers is input to the image coding apparatus 11. A layer is a concept used to distinguish multiple pictures in a case that there are one or more pictures to configure a certain time. For example, coding an identical picture in multiple layers having different image qualities and resolutions is scalable coding, and coding pictures having different viewpoints in multiple layers is view scalable coding. In a case of performing a prediction (an inter-layer prediction, an inter-view prediction) between pictures in multiple layers, coding efficiency greatly improves. In a case of not performing a prediction, in a case of (simulcast), coded data can be compiled.

The network 21 transmits a coding stream Te generated by the image coding apparatus 11 to the image decoding apparatus 31. The network 21 is the Internet (internet), Wide Area Network (WAN), Local Area Network (LAN), or combinations thereof. The network 21 is not necessarily a bidirectional communication network, but may be a unidirectional communication network configured to transmit broadcast wave such as digital terrestrial television broadcasting and satellite broadcasting. The network 21 may be substituted by a storage medium that records the coding stream Te, such as Digital Versatile Disc (DVD) and Blue-ray Disc (BD).

The image decoding apparatus 31 decodes each of the coding streams Te transmitted by the network 21, and generates one or multiple decoded images Td.

The image display apparatus 41 displays all or part of one or multiple decoded images Td generated by the image decoding apparatus 31. For example, the image display apparatus 41 includes a display device such as a liquid crystal display and an organic Electro-luminescence (EL) display. In spacial scalable coding and SNR scalable coding, in a case that the image decoding apparatus 31 has high processing capability, an enhanced layer image having high image quality is displayed. In a case that the image decoding apparatus 31 only has lower processing capability, a base layer image which does not require as high processing capability and display capability as an enhanced layer is displayed.

Operator

Operators used herein will be described below.

>> is a right bit shift, << is a left bit shift, & is a bitwise AND, | is a bitwise OR, and |= is a sum operation (OR) with another condition.

x? y: z is a ternary operator to take y in a case that x is true (other than 0), and take z in a case that x is false (0).

Clip3 (a, b, c) is a function to clip c in a value equal to or greater than a and equal to or less than b, and a function to return a in a case that c is less than a (c<a), return b in a case that c is greater than b (c>b), and return c otherwise (however, a is equal to or less than b (a<=b)).

Structure of Coding Stream Te

Prior to the detailed description of the image coding apparatus 11 and the image decoding apparatus 31 according to the present embodiment, the data structure of the coding stream Te generated by the image coding apparatus 11 and decoded by the image decoding apparatus 31 will be described.

FIGS. 1A to 1F are diagrams illustrating a hierarchy structure of data in the coding stream Te. The coding stream Te includes a sequence and multiple pictures constituting a sequence illustratively. FIGS. 1A to 1F are diagrams illustrating a coding video sequence prescribing a sequence SEQ, a coding picture prescribing a picture PICT, a coding slice prescribing a slice S, a coding slice data prescribing slice data, a coding tree unit included in coding slice data, and Coding Units (CUs) included in a coding tree unit, respectively.

Coding Video Sequence

In the coding video sequence, a set of data referred to by the image decoding apparatus 31 to decode the sequence SEQ of a processing target is prescribed. As illustrated in part (a) of FIG. 1, the sequence SEQ includes a Video Parameter Set, a Sequence Parameter Set SPS, a Picture Parameter Set PPS, a picture PICT, and Supplemental Enhancement Information SEI. Here, a value indicated after # indicates a layer ID. In FIGS. 1A to 1F, although an example is illustrated where coded data of #0 and #1, in other words, layer 0 and layer 1 exist, types of layers and the number of layers do not depend on this.

In the video parameter set VPS, in a video including multiple layers, a set of coding parameters common to multiple videos and a set of coding parameters associated with multiple layers and an individual layer included in a video are prescribed.

In the sequence parameter set SPS, a set of coding parameters referred to by the image decoding apparatus 31 to decode a target sequence is prescribed. For example, width and height of a picture are prescribed. Note that multiple SPSs may exist. In that case, any of multiple SPSs is selected from the PPS.

In the picture parameter set PPS, a set of coding parameters referred to by the image decoding apparatus 31 to decode each picture in a target sequence is prescribed. For example, a reference value (pic_init_qp_minus26) of a quantization step size used for decoding of a picture and a flag (weighted_pred_flag) indicating an application of a weighted prediction are included. Note that multiple PPSs may exist. In that case, any of multiple PPSs is selected from each picture in a target sequence.

Coding Picture

In the coding picture, a set of data referred to by the image decoding apparatus 31 to decode the picture PICT of a processing target is prescribed. As illustrated in part (b) of FIG. 1, the picture PICT includes slices S0 to $S_{NS-1}$ (NS is the total number of slices included in the picture PICT).

Note that in a case not necessary to distinguish the slices S0 to $S_{NS-1}$ below, subscripts of reference signs may be omitted and described. The same applies to other data included in the coding stream Te described below and described with an added subscript.

Coding Slice

In the coding slice, a set of data referred to by the image decoding apparatus 31 to decode the slice S of a processing target is prescribed. As illustrated in part (c) of FIG. 1, the slice S includes a slice header SH and a slice data SDATA.

The slice header SH includes a coding parameter group referred to by the image decoding apparatus 31 to determine a decoding method of a target slice. Slice type specification information (slice_type) to specify a slice type is one example of a coding parameter included in the slice header SH.

Examples of slice types that can be specified by the slice type specification information include (1) I slice using only an intra prediction in coding, (2) P slice using a unidirectional prediction or an intra prediction in coding, and (3) B slice using a unidirectional prediction, a bidirectional prediction, or an intra prediction in coding, and the like.

Note that, the slice header SH may include a reference (pic_parameter_set_id) to the picture parameter set PPS included in the coding video sequence.

Coding Slice Data

In the coding slice data, a set of data referred to by the image decoding apparatus 31 to decode the slice data SDATA of a processing target is prescribed. As illustrated in part (d) of FIG. 1, the slice data SDATA includes Coding Tree Units (CTUs). The CTU is a block of a fixed size (for example, 64×64) constituting a slice, and may be referred to as a Largest Coding Unit (LCU).

Coding Tree Unit

Figure 1:
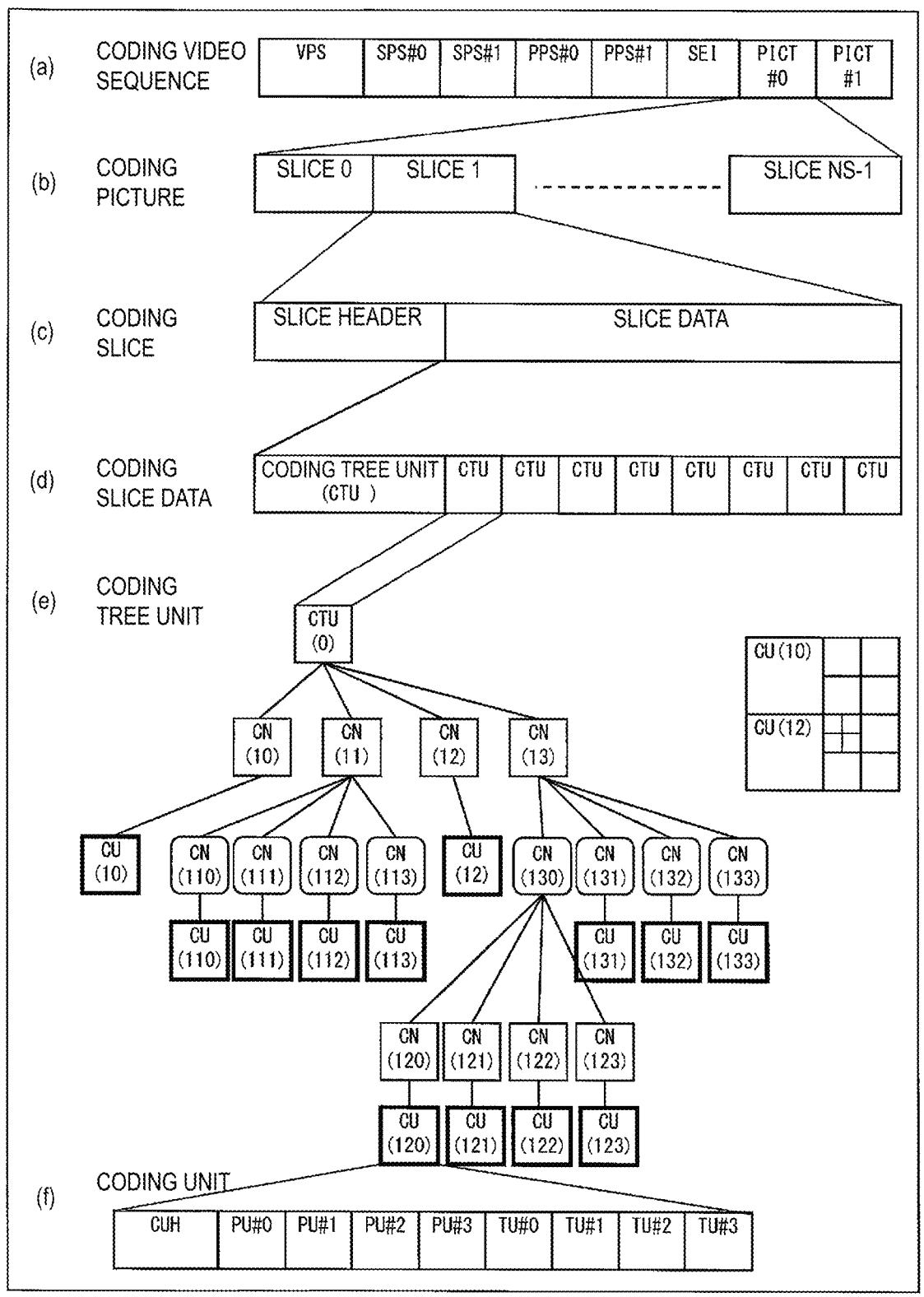
FIG. 1 is a diagram illustrating a hierarchy structure of data of a coding stream according to the present embodiment.

As illustrated in part (e) of FIG. 1, a set of data referred to by the image decoding apparatus 31 to decode a coding tree unit of a processing target is prescribed. The coding tree unit is split by recursive quad tree splits. Nodes of a tree structure obtained by recursive quad tree splits are referred to as Coding Nodes (CNs). Intermediate nodes of a quad tree are coding nodes, and the coding tree unit itself is also prescribed as the highest coding node. The CTU includes a split flag (cu_split_flag), and in a case that cu_split_flag is 1, the CTU is split into four coding node CNs. In a case that cu_split_flag is 0, the coding node CN is not split, and has one Coding Unit (CU) as a node. The coding unit CU is an end node of the coding nodes, and is not split anymore. The coding unit CU is a basic unit of coding processing.

In a case that the size of the coding tree unit CTU is 64×64 pixels, the size of the coding unit may be any of 64×64 pixels, 32×32 pixels, 16×16 pixels, and 8×8 pixels.

Coding Unit

As illustrated in part (f) of FIG. 1, a set of data referred to by the image decoding apparatus 31 to decode the coding unit of a processing target is prescribed. Specifically, the coding unit includes a prediction tree, a transform tree, and a CU header CUH. In the CU header, a prediction mode, a split method (PU split mode), and the like are prescribed.

In the prediction tree, prediction information (a reference picture index, a motion vector, and the like) of each prediction unit (PU) where the coding unit is split into one or multiple is prescribed. In another expression, the prediction unit is one or multiple non-overlapping regions constituting the coding unit. The prediction tree includes one or multiple prediction units obtained by the above-mentioned split. Note that, in the following, a unit of prediction where the prediction unit is further split is referred to as a "subblock". The subblock includes multiple pixels. In a case that the sizes of the prediction unit and the subblock are the same, there is one subblock in the prediction unit. In a case that the prediction unit is larger than the size of the subblock, the prediction unit is split into subblocks. For example, in a case that the prediction unit is 8×8, and the subblock is 4×4, the prediction unit is split into four subblocks formed by horizontal split into two and vertical split into two.

The prediction processing may be performed for each of these prediction units (subblocks).

Generally speaking, there are two types of splits in the prediction tree, including a case of an intra prediction and a case of an inter prediction. The intra prediction is a prediction in an identical picture, and the inter prediction refers to a prediction processing performed between mutually different pictures (for example, between display times, and between layer images).

In a case of an intra prediction, the split method has 2N×2N (the same size as the coding unit) and N×N.

In a case of an inter prediction, the split method includes coding by a PU split mode (part_mode) of the coded data, and includes 2N×2N (the same size as the coding unit), 2N×N, 2N×nU, 2N×nD, N×2N, nL×2N, nR×2N and N×N, and the like. Note that 2N×N and N×2N indicate a symmetric split of 1:1, and 2N×nU, 2N×nD and nL×2N, nR×2N indicate an asymmetry split of 1:3 and 3:1. The PUs included in the CU are expressed as PU0, PU1, PU2, and PU3 sequentially.

Figures 2A, 2B, 2C, 2D:
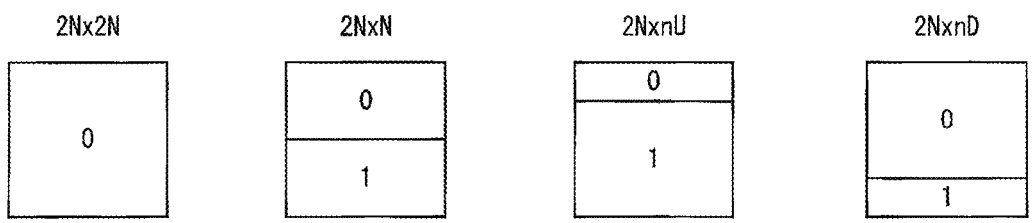
FIGS. 2A to 2H are diagrams illustrating patterns of PU split modes.
Figures 2E, 2F, 2G, 2H:
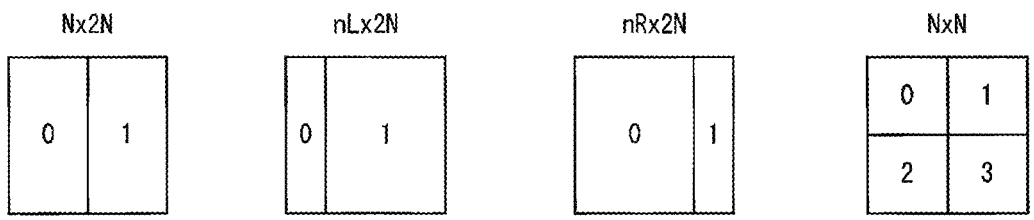
Figure 3A:
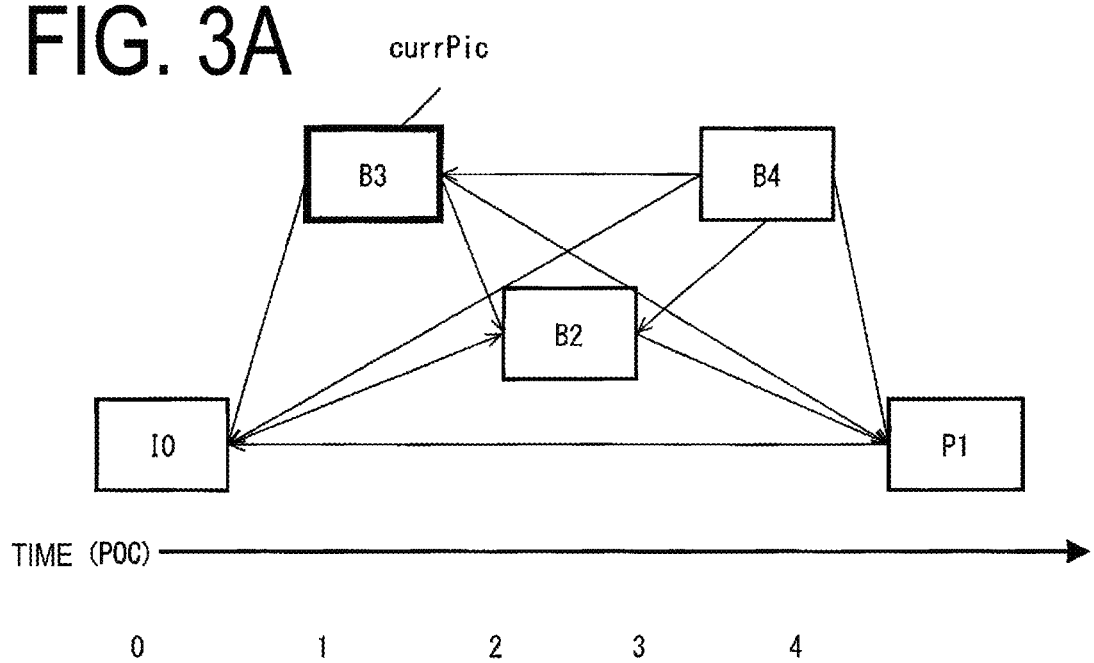
FIGS. 3A and 3B are conceptual diagrams illustrating an example of reference pictures and reference picture lists.
Figure 3B:
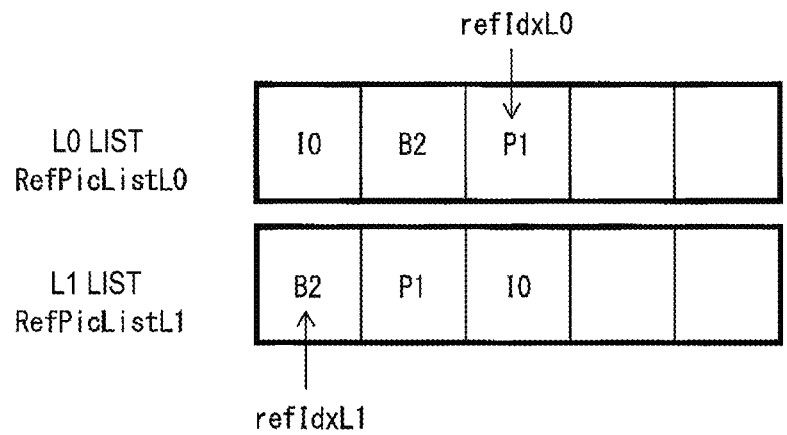

FIGS. 2A to 2H illustrate shapes of partitions in respective PU split modes (positions of boundaries of PU split) specifically. FIG. 2A illustrates a partition of 2N×2N, and FIGS. 2B to 2D illustrate partitions (horizontally long partitions) of 2N×N, 2N×nU, and 2N×nD, respectively. FIGS. 2E to 2G illustrate partitions (vertically long partitions) in cases of N×2N, nL×2N, and nR×2N, respectively, and FIG. 2H illustrates a partition of N×N. Note that horizontally long partitions and vertically long partitions are collectively referred to as rectangular partitions, and 2N×2N and N×N are collectively referred to as square partitions.

In the transform tree, the coding unit is split into one or multiple transform units, and a position and a size of each transform unit are prescribed. In another expression, the transform unit is one or multiple non-overlapping regions constituting the coding unit. The transform tree includes one or multiple transform units obtained by the above-mentioned split.

Splits in the transform tree include those to allocate a region that is the same size as the coding unit as a transform unit, and those by recursive quad tree splits similar to the above-mentioned split of CUs.

A transform processing is performed for each of these transform units.

Configuration of Image Decoding Apparatus

Figure 5:
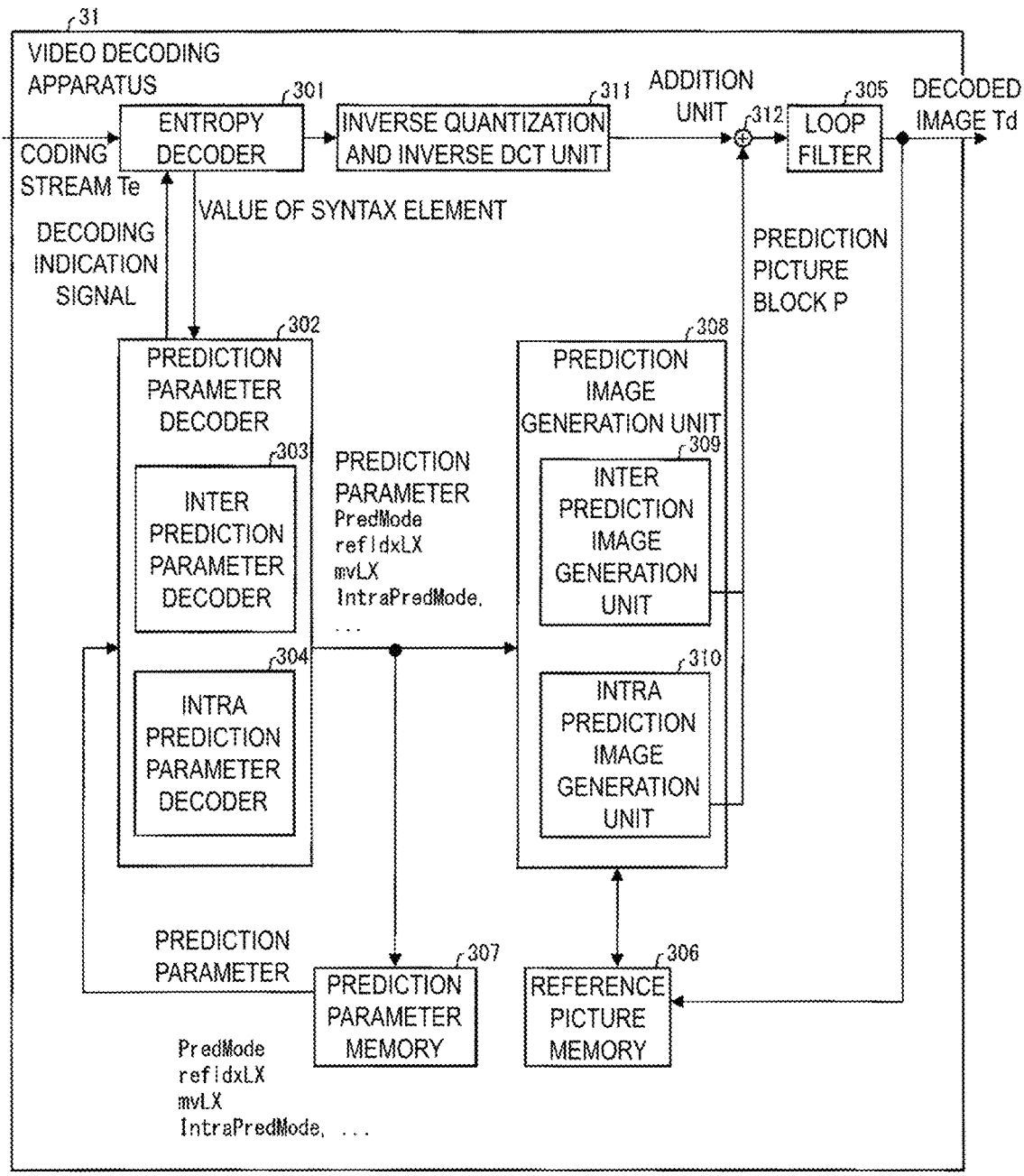
FIG. 5 is a schematic diagram illustrating a configuration of an image decoding apparatus according to the present embodiment.

A configuration of the image decoding apparatus 31 according to the present embodiment will now be described. FIG. 5 is a schematic diagram illustrating a configuration of the image decoding apparatus 31 according to the present embodiment. The image decoding apparatus 31 includes an entropy decoder 301, a prediction parameter decoder (a prediction image decoding apparatus) 302, a loop filter 305, a reference picture memory 306, a prediction parameter memory 307, a prediction image generation unit (prediction image generation apparatus) 308, an inverse quantization and inverse DCT unit 311, and an addition unit 312.

The prediction parameter decoder 302 includes an inter prediction parameter decoder 303 and an intra prediction parameter decoder 304. The prediction image generation unit 308 includes an inter prediction image generation unit 309 and an intra prediction image generation unit 310.

The entropy decoder 301 performs entropy decoding on the coding stream Te input from the outside, and separates and decodes individual codes (syntax elements). Separated codes include prediction information to generate a prediction image and residual information to generate a difference image and the like.

The entropy decoder 301 outputs a part of the separated codes to the prediction parameter decoder 302. For example, a part of the separated codes includes a prediction mode predMode, a PU split mode part_mode, a merge flag merge_flag, a merge index merge_idx, an inter prediction indicator inter_pred_idc, a reference picture index refIdxLX, a prediction vector index mvp_LX_idx, and a difference vector mvdLX. The control of which code to decode is performed based on an indication of the prediction parameter decoder 302. The entropy decoder 301 outputs quantization coefficients to the inverse quantization and inverse DCT unit 311. These quantization coefficients are coefficients obtained by performing Discrete Cosine Transform (DCT) on residual signal to quantize in coding processing.

The inter prediction parameter decoder 303 decodes an inter prediction parameter with reference to a prediction parameter stored in the prediction parameter memory 307, based on a code input from the entropy decoder 301.

The inter prediction parameter decoder 303 outputs a decoded inter prediction parameter to the prediction image generation unit 308, and also stores the decoded inter prediction parameter in the prediction parameter memory 307. Details of the inter prediction parameter decoder 303 will be described later.

The intra prediction parameter decoder 304 decodes an intra prediction parameter with reference to a prediction parameter stored in the prediction parameter memory 307, based on a code input from the entropy decoder 301. The intra prediction parameter is a parameter used in a processing to predict a CU in one picture, for example, an intra prediction mode IntraPredMode. The intra prediction parameter decoder 304 outputs a decoded intra prediction parameter to the prediction image generation unit 308, and also stores the decoded intra prediction parameter in the prediction parameter memory 307.

The intra prediction parameter decoder 304 may derive different intra prediction modes depending on luminance and chrominance. In this case, the intra prediction parameter decoder 304 decodes a luminance prediction mode IntraPredModeY as a prediction parameter of luminance, and decodes a chrominance prediction mode IntraPredModeC as a prediction parameter of chrominance. The luminance prediction mode IntraPredModeY includes 35 modes, and corresponds to a planar prediction (0), a DC prediction (1), and directional predictions (2 to 34). The chrominance prediction mode IntraPredModeC uses any of a planar prediction (0), a DC prediction (1), directional predictions (2 to 34), and an LM mode (35). The intra prediction parameter decoder 304 may decode a flag indicating whether IntraPredModeC is a mode identical to the luminance mode, assign IntraPredModeY to IntraPredModeC in a case of indicating that the flag is the mode identical to the luminance mode, and decode a planar prediction (0), a DC prediction (1), directional predictions (2 to 34), and an LM mode (35) as IntraPredModeC in a case of indicating that the flag is a mode different from the luminance mode.

The loop filter 305 applies a filter such as a deblocking filter, a sample adaptive offset (SAO), and an adaptive loop filter (ALF) on a decoded image of a CU generated by the addition unit 312.

The reference picture memory 306 stores a decoded image of a CU generated by the addition unit 312 in a prescribed position for each picture and CU of a decoding target.

The prediction parameter memory 307 stores a prediction parameter in a prescribed position for each picture and prediction unit (or a subblock, a fixed size block, and a pixel) of a decoding target. Specifically, the prediction parameter memory 307 stores an inter prediction parameter decoded by the inter prediction parameter decoder 303, an intra prediction parameter decoded by the intra prediction parameter decoder 304 and a prediction mode predMode separated by the entropy decoder 301. For example, inter prediction parameters stored include a prediction list utilization flag predFlagLX (the inter prediction indicator inter_pred_idc), a reference picture index refIdxLX, and a motion vector mvLX.

To the prediction image generation unit 308, a prediction mode predMode input from the entropy decoder 301 is input, and a prediction parameter is input from the prediction parameter decoder 302. The prediction image generation unit 308 reads a reference picture from the reference picture memory 306. The prediction image generation unit 308 generates a prediction image of a PU by using a prediction parameter input and a reference picture read, with a prediction mode indicated by the prediction mode predMode.

Here, in a case that the prediction mode predMode indicates an inter prediction mode, the inter prediction image generation unit 309 generates a prediction image of a PU by an inter prediction by using an inter prediction parameter input from the inter prediction parameter decoder 303 and a read reference picture.

For a reference picture list (an L0 list or an L1 list) where a prediction list utilization flag predFlagLX is 1, the inter prediction image generation unit 309 reads a reference picture block from the reference picture memory 306 in a position indicated by a motion vector mvLX, based on a decoding target PU from reference pictures indicated by the reference picture index refIdxLX. The inter prediction image generation unit 309 performs a prediction based on a read reference picture block and generates a prediction image of a PU. The inter prediction image generation unit 309 outputs the generated prediction image of the PU to the addition unit 312.

In a case that the prediction mode predMode indicates an intra prediction mode, the intra prediction image generation unit 310 performs an intra prediction by using an intra prediction parameter input from the intra prediction parameter decoder 304 and a read reference picture. Specifically, the intra prediction image generation unit 310 reads an adjacent PU, which is a picture of a decoding target, in a prescribed range from a decoding target PU among PUs already decoded, from the reference picture memory 306. The prescribed range is, for example, any of adjacent PUs in left, top left, top, and top right in a case that a decoding target PU moves in order of so-called raster scan sequentially, and varies according to intra prediction modes. The order of the raster scan is an order to move sequentially from the left edge to the right edge in each picture for each row from the top edge to the bottom edge.

The intra prediction image generation unit 310 performs a prediction in a prediction mode indicated by the intra prediction mode IntraPredMode for a read adjacent PU, and generates a prediction image of a PU. The intra prediction image generation unit 310 outputs the generated prediction image of the PU to the addition unit 312.

In a case that the intra prediction parameter decoder 304 derives different intra prediction modes depending on luminance and chrominance, the intra prediction image generation unit 310 generates a prediction image of a PU of luminance by any of a planar prediction (0), a DC prediction (1), and directional predictions (2 to 34) depending on a luminance prediction mode IntraPredModeY, and generates a prediction image of a PU of chrominance by any of a planar prediction (0), a DC prediction (1), directional predictions (2 to 34), and LM mode (35) depending on a chrominance prediction mode IntraPredModeC.

The inverse quantization and inverse DCT unit 311 performs inverse quantization on quantization coefficients input from the entropy decoder 301 and calculates DCT coefficients. The inverse quantization and inverse DCT unit 311 performs an Inverse Discrete Cosine Transform (an inverse DCT, an inverse discrete cosine transform) for the calculated DCT coefficients, and calculates a residual signal. The inverse quantization and inverse DCT unit 311 outputs the calculated residual signal to the addition unit 312.

The addition unit 312 adds a prediction image of a PU input from the inter prediction image generation unit 309 or the intra prediction image generation unit 310 and a residual signal input from the inverse quantization and inverse DCT unit 311 for each pixel, and generates a decoded image of a PU. The addition unit 312 stores the generated decoded image of a PU in the reference picture memory 306, and outputs a decoded image Td where the generated decoded image of the PU is integrated for each picture to the outside.

Configuration of Image Coding Apparatus

Figure 4:
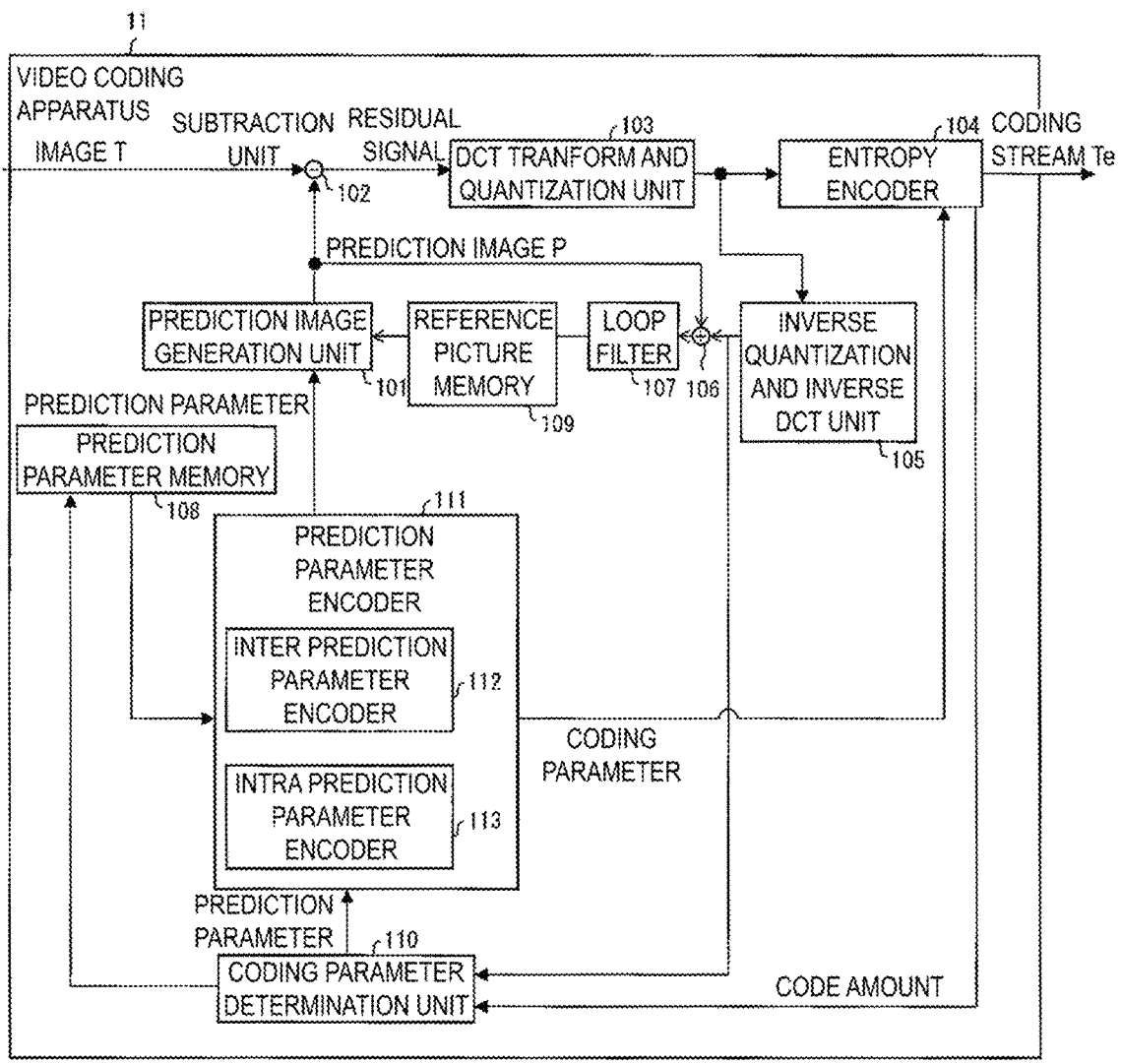
FIG. 4 is block diagram illustrating a configuration of an image coding apparatus according to the present embodiment.

A configuration of the image coding apparatus 11 according to the present embodiment will now be described. FIG. 4 is a block diagram illustrating a configuration of the image coding apparatus 11 according to the present embodiment. The image coding apparatus 11 is configured to include a prediction image generation unit 101, a subtraction unit 102, a DCT and quantization unit 103, an entropy encoder 104, an inverse quantization and inverse DCT unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, and a prediction parameter encoder 111. The prediction parameter encoder 111 is configured to include an inter prediction parameter encoder 112 and an intra prediction parameter encoder 113.

For each picture of an image T, the prediction image generation unit 101 generates a prediction image P of a prediction unit PU for each coding unit CU that is a region where the picture is split. Here, the prediction image generation unit 101 reads a block that has been decoded from the reference picture memory 109, based on a prediction parameter input from the prediction parameter encoder 111. For example, in a case of an inter prediction, the prediction parameter input from the prediction parameter encoder 111 is a motion vector. The prediction image generation unit 101 reads a block in a position in a reference image indicated by a motion vector starting from a target PU. In a case of an intra prediction, the prediction parameter is, for example, an intra prediction mode. The prediction image generation unit 101 reads a pixel value of an adjacent PU used in an intra prediction mode from the reference picture memory 109, and generates the prediction image P of a PU. The prediction image generation unit 101 generates the prediction image P of a PU by using one prediction scheme among multiple prediction schemes for the read reference picture block. The prediction image generation unit 101 outputs the generated prediction image P of a PU to the subtraction unit 102.

Figure 6:
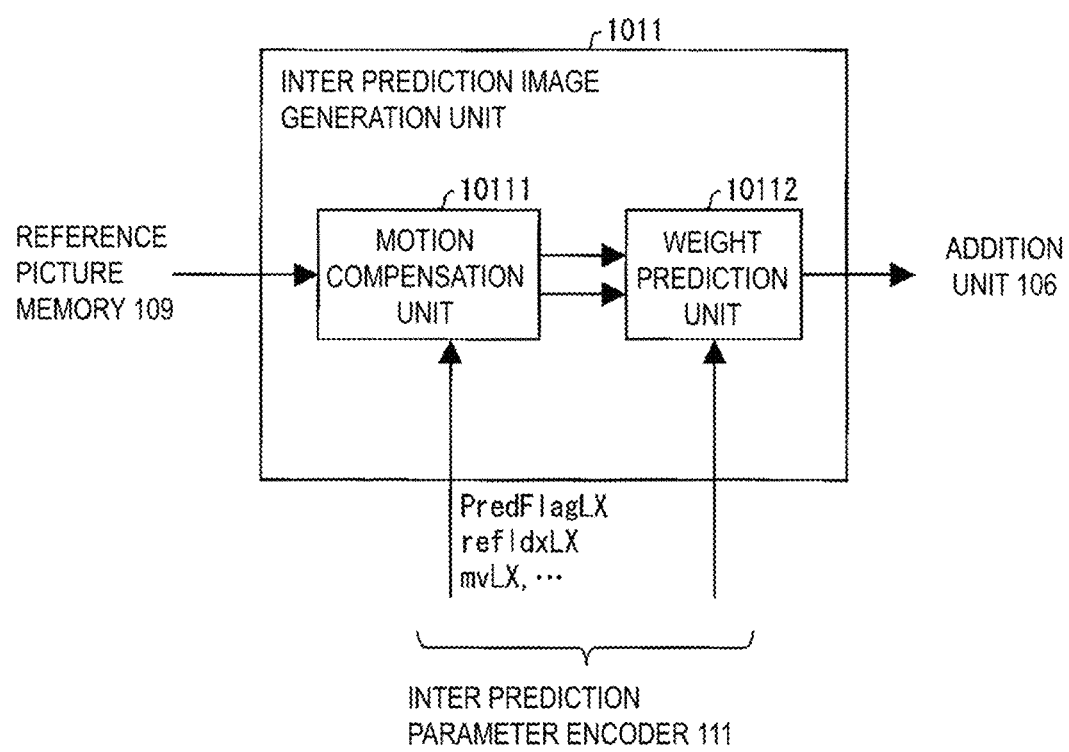
FIG. 6 is a schematic diagram illustrating a configuration of an inter prediction image generation unit of the image coding apparatus according to the present embodiment.

Note that the operation of the prediction image generation unit 101 is the same as the operation of the prediction image generation unit 308 already described. For example, FIG. 6 is a schematic diagram illustrating a configuration of an inter prediction image generation unit 1011 included in the prediction image generation unit 101. The inter prediction image generation unit 1011 is configured to include a motion compensation unit 10111 and a weight prediction unit 10112. Descriptions about the motion compensation unit 10111 and the weight prediction unit 10112 are omitted since the motion compensation unit 10111 and the weight prediction unit 10112 have configurations similar to each of the above-mentioned motion compensation unit 3091 and weight prediction unit 3094, respectively.

The prediction image generation unit 101 generates the prediction image P of a PU, based on a pixel value of a reference block read from the reference picture memory, by using a parameter input by the prediction parameter encoder. The prediction image generated by the prediction image generation unit 101 is output to the subtraction unit 102 and the addition unit 106.

The subtraction unit 102 subtracts a signal value of the prediction image P of a PU input from the prediction image generation unit 101 from a pixel value of a corresponding PU of the image T, and generates a residual signal. The subtraction unit 102 outputs the generated residual signal to the DCT and quantization unit 103.

The DCT and quantization unit 103 performs a DCT for the residual signal input from the subtraction unit 102, and calculates DCT coefficients. The DCT and quantization unit 103 quantizes the calculated DCT coefficients to calculate quantization coefficients. The DCT and quantization unit 103 outputs the calculated quantization coefficients to the entropy encoder 104 and the inverse quantization and inverse DCT unit 105.

To the entropy encoder 104, quantization coefficients are input from the DCT and quantization unit 103, and coding parameters are input from the prediction parameter encoder 111. For example, input coding parameters include codes such as a reference picture index refIdxLX, a prediction vector index mvp_LX_idx, a difference vector mvdLX, a prediction mode predMode, and a merge index merge_idx.

The entropy encoder 104 performs entropy coding on the input quantization coefficients and coding parameters to generate the coding stream Te, and outputs the generated coding stream Te to the outside.

The inverse quantization and inverse DCT unit 105 performs inverse quantization on the quantization coefficients input from the DCT and quantization unit 103 to calculate DCT coefficients. The inverse quantization and inverse DCT unit 105 performs inverse DCT on the calculated DCT coefficient to calculate residual signals. The inverse quantization and inverse DCT unit 105 outputs the calculated residual signals to the addition unit 106.

The addition unit 106 adds signal values of the prediction image P of the PUs input from the prediction image generation unit 101 and signal values of the residual signals input from the inverse quantization and inverse DCT unit 105 for each pixel, and generates the decoded image. The addition unit 106 stores the generated decoded image in the reference picture memory 109.

The loop filter 107 performs a deblocking filter, a sample adaptive offset (SAO), and an adaptive loop filter (ALF) to the decoded image generated by the addition unit 106.

The prediction parameter memory 108 stores the prediction parameters generated by the coding parameter determination unit 110 for each picture and CU of the coding target in a prescribed position.

The reference picture memory 109 stores the decoded image generated by the loop filter 107 for each picture and CU of the coding target in a prescribed position.

The coding parameter determination unit 110 selects one set among multiple sets of coding parameters. A coding parameter is the above-mentioned prediction parameter or a parameter to be a target of coding generated associated with the prediction parameter. The prediction image generation unit 101 generates the prediction image P of the PUs by using each of the sets of these coding parameters.

The coding parameter determination unit 110 calculates cost values indicating a volume of an information quantity and coding errors for each of the multiple sets. For example, a cost value is a sum of a code amount and a value of multiplying a coefficient λ by a square error. The code amount is an information quantity of the coding stream Te obtained by performing entropy coding on a quantization error and a coding parameter. The square error is a sum of pixels for square values of residual values of residual signals calculated in the subtraction unit 102. The coefficient λ is a real number that is larger than a pre-configured zero. The coding parameter determination unit 110 selects a set of coding parameters by which the calculated cost value is minimized. With this configuration, the entropy encoder 104 outputs the selected set of coding parameters as the coding stream Te to the outside, and does not output sets of coding parameters that are not selected. The coding parameter determination unit 110 stores the determined coding parameters in the prediction parameter memory 108.

The prediction parameter encoder 111 derives a format for coding from parameters input from the coding parameter determination unit 110, and outputs the format to the entropy encoder 104. A derivation of a format for coding is, for example, to derive a difference vector from a motion vector and a prediction vector. The prediction parameter encoder 111 derives parameters necessary to generate a prediction image from parameters input from the coding parameter determination unit 110, and outputs the parameters to the prediction image generation unit 101. For example, parameters necessary to generate a prediction image are a motion vector of a subblock unit.

The inter prediction parameter encoder 112 derives inter prediction parameters such as a difference vector, based on prediction parameters input from the coding parameter determination unit 110. The inter prediction parameter encoder 112 includes a partly identical configuration to a configuration by which the inter prediction parameter decoder 303 (see FIG. 5 and the like) derives inter prediction parameters, as a configuration to derive parameters necessary for generation of a prediction image output to the prediction image generation unit 101. A configuration of the inter prediction parameter encoder 112 will be described later.

The intra prediction parameter encoder 113 derives a format for coding (for example, MPM_idx, rem_intra_luma_pred_mode, and the like) from the intra prediction mode IntraPredMode input from the coding parameter determination unit 110.

Second Embodiment

Types of Block Splits

Figure 7A:
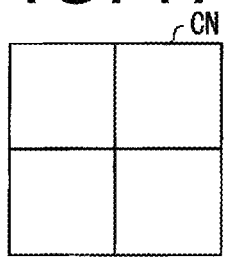
FIGS. 7A to 7F are diagrams illustrating splits of a coding node in the image decoding apparatus according to the present embodiment.
Figure 7B:
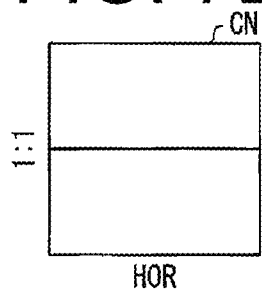
Figure 7C:
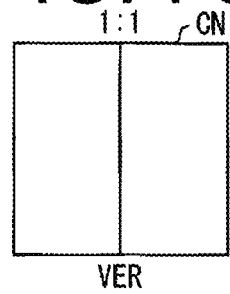
Figure 7D:
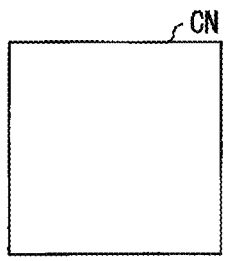
Figure 7E:
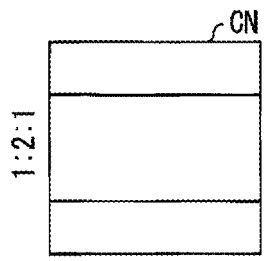
Figure 7F:
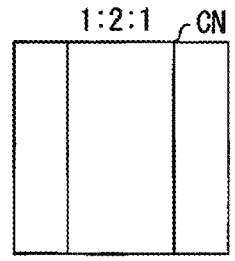

First, splits of the Coding Node (CN) according to the present embodiment will be described. FIGS. 7A to 7F are diagrams illustrating splits of a coding node (CN, block) in the image decoding apparatus 31. In the present embodiment, the image decoding apparatus 31 splits a coding tree unit or a CN by quad tree split (QT split), binary tree split (BT split), or ternary tree split (TT split). In this manner, the image decoding apparatus 31 splits the coding tree unit or the CN into Coding Units (CUs), each of which is a basic unit of coding processing. FIG. 7A illustrates QT split of a block. FIG. 7B illustrates an example in which a block is split by BT split in the horizontal direction (HOR). FIG. 7C illustrates an example in which a block is split by BT split in the vertical direction (VER). As illustrated in FIGS. 7B and 7C, according to BT split, a side of a block to be split is split in 1:1. FIG. 7D illustrates an example in which a block is not split. FIG. 7E illustrates an example in which a block is split by TT split in the horizontal direction (HOR). FIG. 7F illustrates an example in which a block is split by TT split in the vertical direction (VER). According to TT split, a side of a block to be split is split in 1:2:1.

Note that the terms "horizontal" and "vertical" used herein with regard to splitting refer to directions of split lines. Therefore, "horizontal split," "split in the horizontal direction (HOR)," and "to split horizontally" refer to splitting with respect to a horizontal boundary line, i.e., splitting into two blocks adjoining in the vertical direction. "Vertical split," "split in the vertical direction (VER)," and "to split vertically" refer to splitting with respect to a vertical boundary line, i.e., splitting into two blocks adjoining in the horizontal direction.

Note that, although not illustrated herein, there is another usage of the terms as well. Specifically, the horizontal split used herein may be referred to as vertical split (split vertically) because one block is split into two or more blocks adjoining in the vertical direction. The vertical split used herein may be referred to as horizontal split (split horizontally) because one block is split into two or more blocks adjoining in the horizontal direction. Note that description of vertical split used as in the above-mentioned another usage of the terms may mean horizontal split used herein (or vice versa). In this case, the terms should be interpreted as appropriate so that the terms carry their intended meaning.

Figure 8:
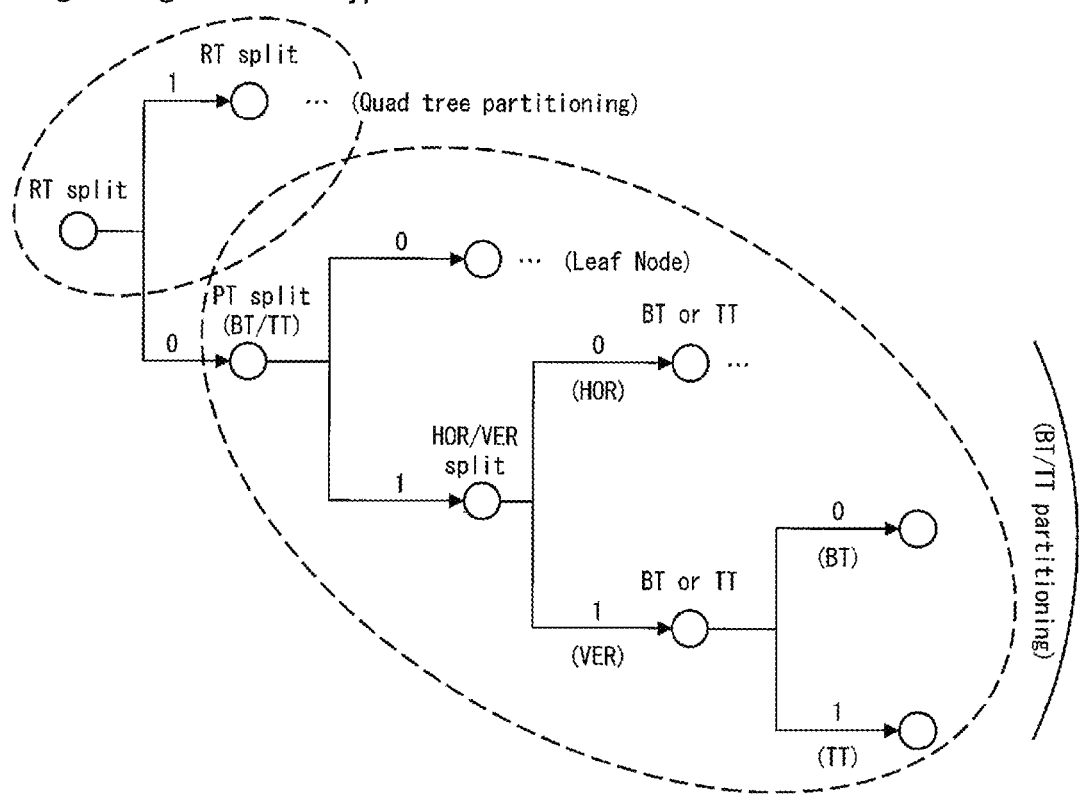
FIG. 8 is a diagram illustrating signaling of tree types performed by the image decoding apparatus according to the present embodiment.

FIG. 8 is a diagram illustrating signaling of tree types performed by the image decoding apparatus 31. As illustrated in FIG. 8, the image decoding apparatus 31 repeats quad tree (Quad-tree) split on a CTU or a CN to perform region-tree (RT) split. After that, in a case that the image decoding apparatus 31 detects a flag of Partition Tree (PT) split (BT split or TT split), the image decoding apparatus 31 determines whether to horizontally split a block or to vertically split a block. After that, the image decoding apparatus 31 determines whether the split is BT split or TT split, and then splits the block.

FIGS. 53A to 53G and FIGS. 54A to 54D are diagrams illustrating other examples of splits of a coding node (CN, block) in the image decoding apparatus 31. In the present embodiment, as one example, the image decoding apparatus 31 splits a coding tree unit or a CN by Multi Nine Tree split (MNT split), Multi Five Tree split (MFT split), Directional Quad Tree split (Derectional Quad Tree split, DQT split), Directional Five Tree split (DFT split), or Directional Asymmetric Quad Tree split (DAQT split). In this manner, the image decoding apparatus 31 splits the coding tree unit or the CN into Coding Units (CUs), each of which is a basic unit of coding processing.

Figure 53A:
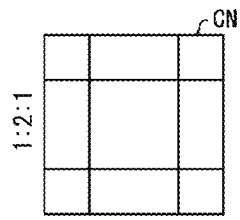
FIGS. 53A to 53G are diagrams illustrating other examples of splits of a coding node in the image decoding apparatus according to the present embodiment.
Figure 53B:
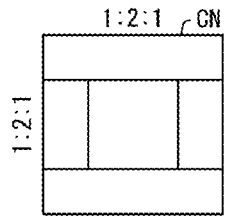
Figure 53C:
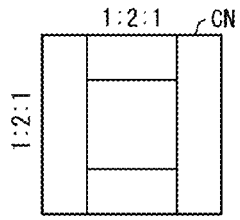
Figure 53D:
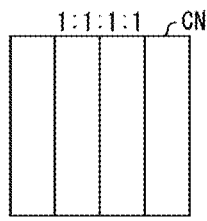
Figure 53E:
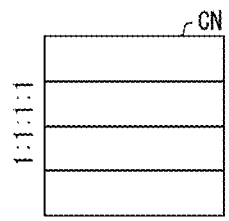
Figure 53F:
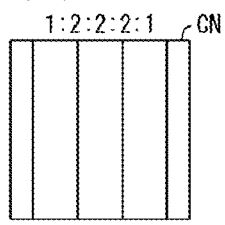
Figure 53G:
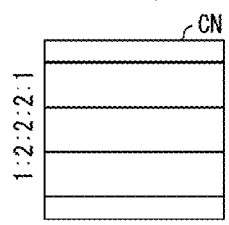

FIG. 53A illustrates MNT split of a block. FIG. 53B illustrates an example of MFT split of a block, and FIG. 53C illustrates another example of MFT split of a block. FIG. 53D illustrates an example of DQT split of a block, and FIG. 53E illustrates another example of DQT split of a block. FIG. 53F illustrates an example of DFT split of a block, and FIG. 53G illustrates another example of DFT split of a block.

Figure 54A:
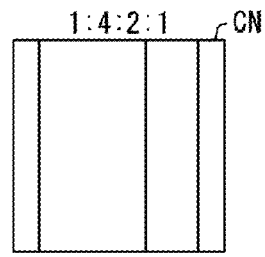
FIGS. 54A to 54D are diagrams illustrating yet other examples of splits of a coding node in the image decoding apparatus according to the present embodiment.
Figure 54B:
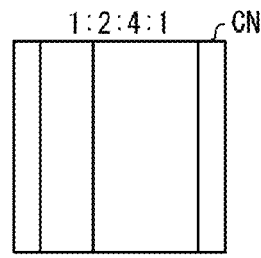
Figure 54C:
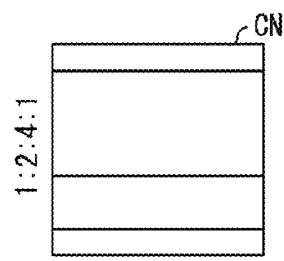
Figure 54D:
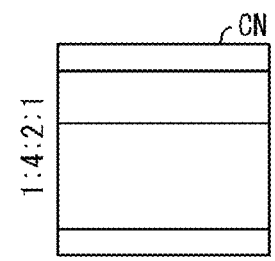

FIG. 54A illustrates a first example of DAQT split of a block, FIG. 54B illustrates a second example of DAQT split of a block, FIG. 54C illustrates a third example of DAQT split of a block, and FIG. 54D illustrates a fourth example of DAQT split of a block.

MT Split Mode Group and PT Split Mode Group

In the present embodiment, the various split modes described above are classified into an MT split mode group (MT split) and a PT split mode group (PT split).

Here, MT split includes at least QT split, and PT split includes at least BT split.

In the present embodiment, split in which the number of partitions is four or more is classified into MT split, and split in which the number of partitions is three or less is classified into PT split.

More specifically, in the present embodiment, MT split includes at least any of MNT split, MFT split, DQT split, DFT split, and DAQT split, besides QT split, and PT split includes BT split. PT split may include TT split.

Specifically, the present embodiment employs the following configuration. That is, there are two or more splits in each of which the number of partitions is four or more, and in addition, one of the above-mentioned splits in each of which the number of partitions is four or more is QT split.

In other words, an image decoding apparatus according to one aspect of the present invention is an image decoding apparatus that decodes a picture for each coding tree unit. The image decoding apparatus includes a split unit configured to split a coding node of the coding tree unit. The split unit includes, as a split method of splitting a target node into four or more nodes (in a case that a target node is a square), a split mode of splitting a target node into square nodes, and a split mode of splitting a target node into nodes including a rectangular node. The split unit splits a target node into four or more nodes including a rectangular node.

Note that the above description "splitting a target node into square nodes" refers to splitting in which a target node is split into nodes consisting only of square nodes, in a case that an immediately higher node is a square. For example, QT split falls under this case. QT split may be referred to as non-directional split, because a square is not directional. The above description "splitting a target node into nodes including a rectangular node" refers to splitting in which a target node is split into nodes including a rectangular node, in a case that an immediately higher node is a square. The split nodes may include a square node, on a condition that the split nodes include a rectangular node. For example, MNT split, MFT split, DQT split, DFT split, and DAQT split fall under this example. DQT split, DFT split, and DAQT split are referred to as directional split, because long sides of rectangles split by DQT split, DFT split, and DAQT split all have the same direction.

The image decoding apparatus 31 decodes MT information indicating MT split and PT information indicating PT split to specify which split mode is to be applied to a split target CN.

Examples of Redundant Split

Figure 9:
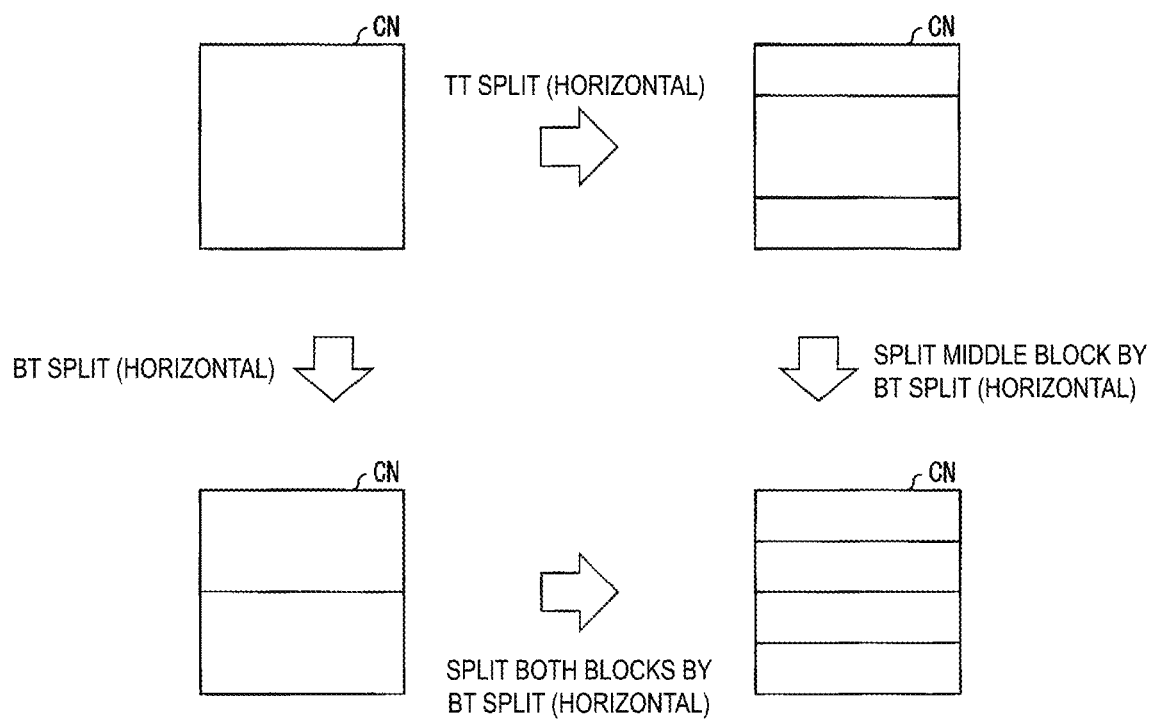
FIG. 9 is a diagram illustrating an example in which the same split pattern is obtained through split processes of a block.

A configuration capable of TT split as in the present embodiment has more split patterns of a block, which is achieved by combinations of splits. Therefore, more time is required to determine a split pattern of a block in the image coding apparatus 11. For example, to obtain the same split pattern, multiple split processes may occur. FIG. 9 illustrates an example in which the same split pattern is obtained through different split processes (example of redundant split). As illustrated in FIG. 9, a split pattern obtained in a manner in which a block (for example, a CTU) is horizontally split by TT split and then the middle block obtained by the TT split is further horizontally split by BT split, and a split pattern obtained in a manner in which a block is horizontally split by BT split and then each of two blocks obtained by the BT split is further horizontally split by BT split, have the same split pattern.

The image coding apparatus 11 and the image decoding apparatus 31 according to the present embodiment restrict redundant split of a block. According to the configuration described above, the image coding apparatus 11 no longer needs to evaluate the same split pattern multiple times. Because redundant split is prohibited, coded data, such as a flag related to the split, is no longer required. Therefore, coding efficiency of the image coding apparatus 11 is enhanced.

Configuration of Image Decoding Apparatus

Figure 10:
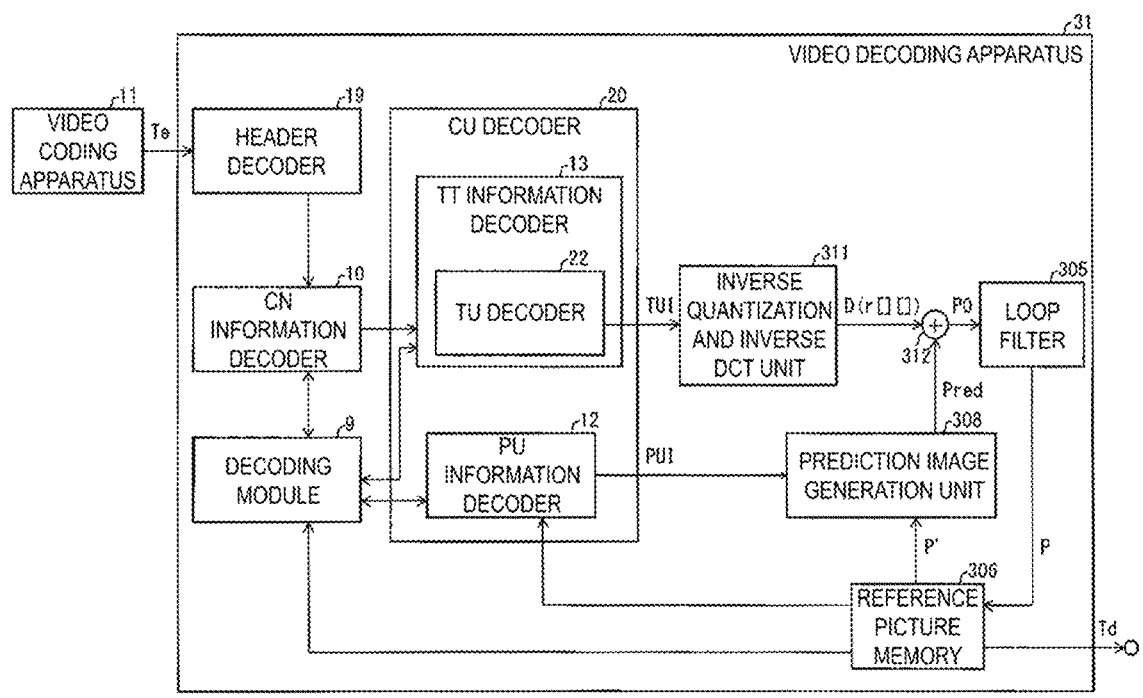
FIG. 10 is a block diagram illustrating a configuration of the image decoding apparatus according to the present embodiment.

FIG. 10 illustrates a block diagram illustrating a configuration of the image decoding apparatus 31 according to the present embodiment. In FIG. 10, for the sake of simplifying the drawing, some members included in the block diagram illustrated in FIG. 10 are omitted. For the sake of convenience of description, members having the same function as the members illustrated in FIG. 5 are denoted by the same reference signs, and descriptions thereof will be omitted.

As illustrated in FIG. 10, the image decoding apparatus 31 includes a decoding module 9, a CN information decoder 10 (split information decoder, split unit), a prediction image generation unit 308, an inverse quantization and inverse DCT unit 311, a reference picture memory 306, an addition unit 312, a loop filter 305, a header decoder 19, and a CU decoder 20. The CU decoder 20 further includes a PU information decoder 12 and a Transform Tree (TT) information decoder 13. The TT information decoder 13 further includes a TU decoder 22.

Decoding Module

General operation of each module will now be described. The decoding module 9 performs decoding processing of decoding syntax values from binary data. More specifically, the decoding module 9 decodes syntax values coded by an entropy coding scheme such as CABAC, based on coded data and a syntax type supplied from sources of supply. Then, the decoding module 9 returns decoded syntax values to the sources of supply.

In the examples given below, sources of supply of coded data and a syntax type are the CN information decoder 10 and the CU decoder 20 (the PU information decoder 12 and the TT information decoder 13).

Header Decoder

The header decoder 19 decodes a video parameter set (VPS), an SPS, a PPS, and a slice header of coded data input from the image coding apparatus 11.

CN Information Decoder

The CN information decoder 10 uses the decoding module 9 to perform decoding processing of a coding tree unit (for each coding tree unit) and coding nodes, for coded data input from the image coding apparatus 11. Specifically, the CN information decoder 10 decodes CTU information and CN information from coded data, according to the following procedure.

First, the CN information decoder 10 uses the decoding module 9 to decode a tree unit header CTUH from CTU information included in a CTU. Next, the CN information decoder 10 decodes, from CN information included in a CN, a QT split flag indicating whether or not a target CN is to be split by QT split, a PT split flag indicating whether or not a target CN is to be split by BT split or TT split, a split direction flag indicating a split direction of the BT split or the TT split, and a split mode selection flag indicating a split method of PT split (BT split or TT split). The CN information decoder 10 recursively splits and decodes a target CN until a QT split flag and a PT split flag no longer notify of further split. Alternatively, instead of the QT split flag, the CN information decoder 10 decodes an MT split flag indicating whether or not a target CN is to be split by MT split, a PT split flag indicating whether or not a target CN is to be split by PT split, and a split direction flag indicating a split direction of the MT split or the PT split. The CN information decoder 10 recursively splits and decodes a target CN until an MT split flag and a PT split flag no longer notify of further split. Finally, the CN information decoder 10 decodes a tree unit footer CTUF from the CTU information.

The tree unit header CTUH and the tree unit footer CTUF include coding parameters referred to by the image decoding apparatus 31 to determine a decoding method of a target coding tree unit. The CN information may include parameters applied to a target CN and to a lower or higher coding node, besides a QT split flag, a PT split flag, a split direction flag, a split mode selection flag indicating a split method of PT split (BT split or TT split), and an MT split mode selection flag indicating a split method of MT split.

CU Decoder

The CU decoder 20 includes the PU information decoder 12 and the TT information decoder 13, and decodes PUI information and TTI information of the lowest coding node CN (i.e., CU).

PU Information Decoder

The PU information decoder 12 uses the decoding module 9 to decode PU information (such as a merge flag (merge_flag), a merge index (merge_idx), a prediction motion vector index (mvp_idx), a reference image index (ref_idx), an inter prediction indicator (inter_pred_flag), and a difference vector (mvd)) of each PU.

TT Information Decoder

The TT information decoder 13 uses the decoding module 9 to decode each TTI (such as TU split flag SP_TU (split_transform_flag) and a CU residual flag CBP_TU (cbf_cb, cbf_cr, cbf_luma), and a TU).

The TT information decoder 13 includes the TU decoder 22. In a case that a TU includes a residual, the TU decoder 22 decodes QP update information (quantization correction value). Note that the QP update information is a value indicating a difference value from a quantization parameter prediction value qPpred, which is a prediction value of a quantization parameter QP. The TU decoder 22 decodes a quantization prediction residual (residual_coding).

QT Information Decoding Processing

Figure 11:
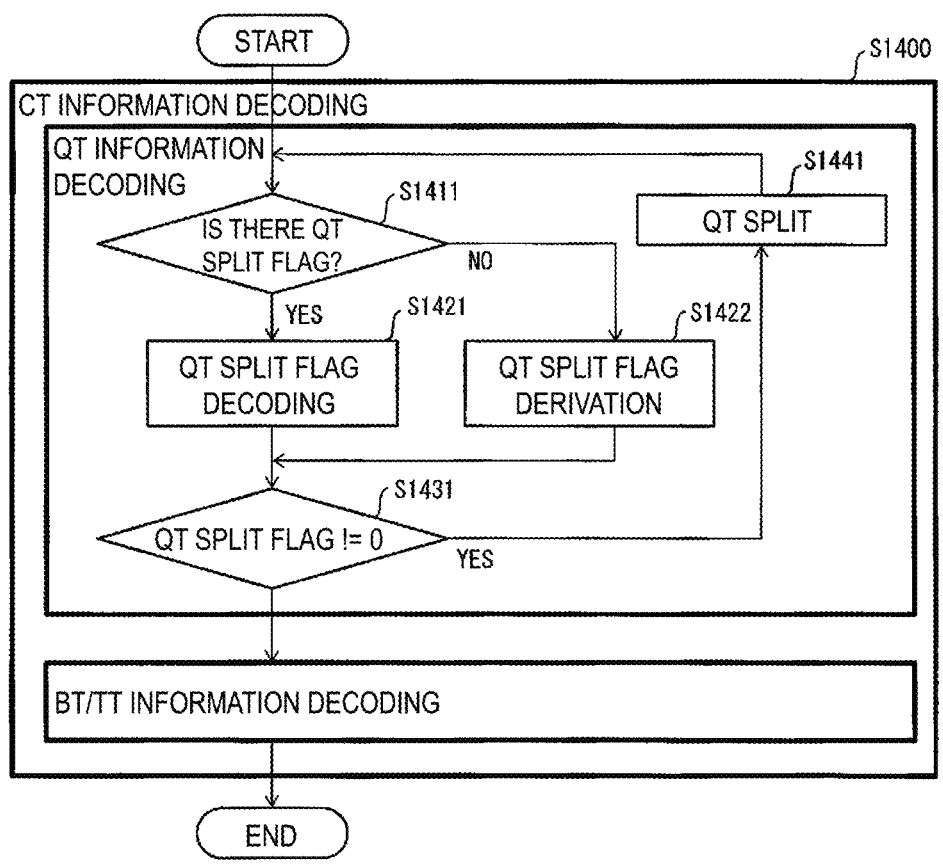
FIG. 11 is a flowchart illustrating decoding processing according to the present embodiment.

Operation of CN information decoding performed by the CN information decoder 10 will be described with reference to FIG. 11 and FIG. 12. FIG. 11 is a flowchart illustrating QT information decoding processing of the CN information decoder 10 according to one embodiment of the present invention. FIG. 12 is a diagram illustrating a configuration example of a syntax table of QT information according to one embodiment of the present invention.

In CN information decoding S1400 performed by the CN information decoder 10, QT information decoding and BT information or TT information (BT/TT information) decoding are performed. The QT information decoding performed by the CN information decoder 10 will be described below in sequence.

First, the CN information decoder 10 decodes CN information from coded data, and recursively decodes Coding Nodes (CNs). Specifically, the CN information decoder 10 decodes QT information, and decodes a target coding tree coding_quadtree(x0, y0, log 2CbSize, cqtDepth). Note that x0, y0 represent top left coordinates of a target coding node. log 2CbSize represents a logarithm CN size (for example, 6, 7, and 8 in a case that a CN size is 64, 128, and 256, respectively). The logarithm CN size is the logarithm of a CN size, which is a size of a coding node, to base 2. The logarithm of a size X to base 2 is referred to as a "logarithm X size." cqtDepth represents a CN hierarchy level (QT depth) indicating a level of hierarchy of a coding node.

(S1411) The CN information decoder 10 determines whether or not decoded CN information includes a QT split flag. Specifically, the CN information decoder 10 determines whether or not the logarithm CN size log 2CbSize is larger than a logarithm value MinCbLog2SizeY of a prescribed minimum CN size. In a case that the logarithm CN size log 2CbSize is larger than MinCbLog2SizeY, the CN information decoder 10 determines that there is a QT split flag, and the processing proceeds to S1421. In other cases, the processing proceeds to S1422.

(S1421) In a case that the CN information decoder 10 determines that the logarithm CN size log 2CbSize is larger than MinCbLog2SizeY, the CN information decoder 10 decodes the QT split flag (split_cu_flag), which is a syntax element.

(S1422) In other cases (the logarithm CN size log 2CbSize is equal to or less than MinCbLog2SizeY), i.e., in a case that a QT split flag split_cu_flag is not found in coded data does, the CN information decoder 10 omits decoding of a QT split flag split_cu_flag from the coded data, and derives a QT split flag split_cu_flag as 0.

(S1431) In a case that the QT split flag split_cu_flag is other than 0 (=1), the CN information decoder 10 performs (S1441) described below, and transitions to an immediately lower level of hierarchy to repeat processing of (S1411) and subsequent processing. In other cases (in a case that the QT split flag split_cu_flag is 0), the processing proceeds to BT/TT information decoding processing.

(S1441) The CN information decoder 10 performs QT split. Specifically, the CN information decoder 10 decodes four coding nodes CN of a logarithm CN size log 2CbSize—1, at positions of a CN hierarchy level cqtDepth+1 (x0, y0), (x1, y0), (x0, y1), (x1, y1).

coding_quadtree(x0, y0, log 2CbSize-1, cqtDepth+1)
coding_quadtree(x1, y0, log 2CbSize-1, cqtDepth+1)
coding_quadtree(x0, y1, log 2CbSize-1, cqtDepth+1)
coding_quadtree(x1, y1, log 2CbSize-1, cqtDepth+1)

Here, x0, y0 represent top left coordinates of a target coding node. x1, y1 are derived by adding ½ of a CN size (1<<log 2CbSize) to (x0, y0), as in the following equations.

$$x1=x0+(1<<(\log 2CbSize-1))$$

$$y1=y0+(1<<(\log 2CbSize-1))$$

Note that << indicates a left shift. 1<<N has the same value as 2 to the power of N (the same holds true hereinafter). Similarly, >> indicates a right shift.

Then, the CN information decoder 10 adds 1 to the CN hierarchy level cqtDepth indicating a level of hierarchy of a coding node to update the CN hierarchy level cqtDepth, and subtracts 1 from the logarithm CN size log 2CbSize, which is a logarithm value of a coding unit size, (divides the CN size by two) to update the logarithm CN size log 2CbSize.

cqtDepth=cqtDepth+1
log 2CbSize=log 2CbSize-1

Also in lower coding nodes, the CN information decoder 10 continues QT information decoding starting from S1411, by using updated top left coordinates, logarithm CN size, and CN hierarchy level.

Examples of Restricted Split Patterns

Here, examples of split patterns of a CN restricted by the CN information decoder 10 according to the present embodiment will be described with reference to FIG. 13A to FIG. 15D.

The CN information decoder 10 refers to a method of splitting an immediately higher node, which is a node one generation higher than a target node, to restrict a method of splitting the target node.

Note that, in the description below, a block (CN) as a split target is referred to as a split target block or a target block, and an immediately higher block of the split target block is referred to as a higher block. The description below illustrates an example in which the CN information decoder 10 refers to a higher block to restrict a split pattern of a split target block. However, the CN information decoder 10 may refer to a split target block to restrict a split pattern of an immediately lower block. FIG. 13A to FIG. 15D illustrate examples of split patterns restricted by the CN information decoder 10. Note that the solid line in FIG. 13A to FIG. 15D denotes a boundary between coding nodes (blocks) generated by splitting a higher coding node or a coding tree unit (higher block). The term "DIVISION ALLOWED" means that split indicated by the straight dotted line is possible in a split target block. The term "DIVISION RESTRICTED" means that split indicated by the straight dotted line is restricted (prohibited) in a split target block.

Restricted Split Pattern: A-a1

Figure 13A:
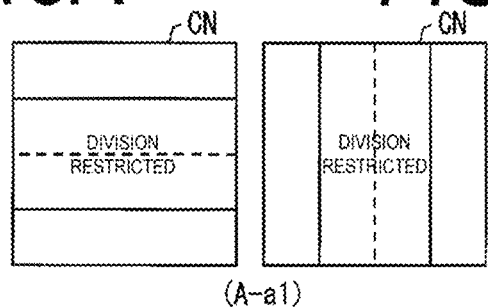
FIGS. 13A to 13F are diagrams illustrating examples of split patterns of the image decoding apparatus according to the present embodiment.
Figure 13B:
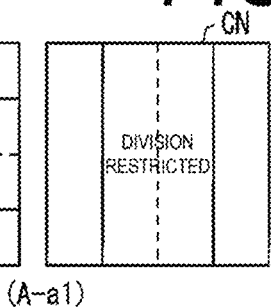

In the examples illustrated in FIGS. 13A and 13B, the CN information decoder 10 restricts (prohibits) split of the middle split target block, which is generated by splitting a higher block by TT split, by BT split in a direction the same as a split direction of the higher block.

In other words, in a case that a target block is the middle block out of three blocks obtained by performing ternary tree split on a higher block, the CN information decoder 10 restricts split of the target block by binary tree split in a direction the same as a direction of the ternary tree split performed on the higher block.

Restricted Split Pattern: A-a2

Figure 13C:
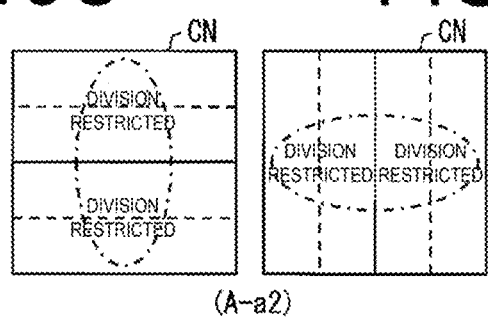
Figure 13D:
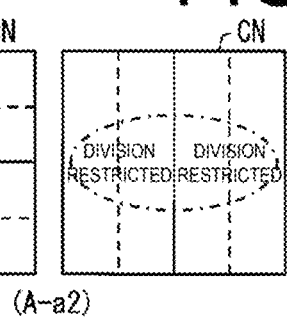

In the examples illustrated in FIGS. 13C and 13D, the CN information decoder 10 restricts (prohibits) split of both blocks, which are generated by splitting a higher block by BT split, by BT split in a direction the same as a split direction of the higher block. In other words, in only one of blocks generated by splitting a higher block, BT split in a direction the same as a split direction of the higher block is possible.

The restriction described above is not applied at the time point of processing a block to be processed first. Therefore, at the time point of processing a block to be processed later, the CN information decoder 10 refers to a split direction of the block processed first, and determines whether or not split of the block to be processed later is subject to restriction.

The restriction described above may also be expressed as follows. In a case that a target block is one of two blocks obtained by performing binary tree split on a higher target block and that the other block out of the two blocks is split by binary tree split in a direction the same as a direction of the binary tree split performed on the higher block, the CN information decoder 10 restricts split of the target block by binary tree split in a direction the same as the direction of the binary tree split performed on the higher block.

Restricted Split Pattern: A-a2'

Figure 13E:
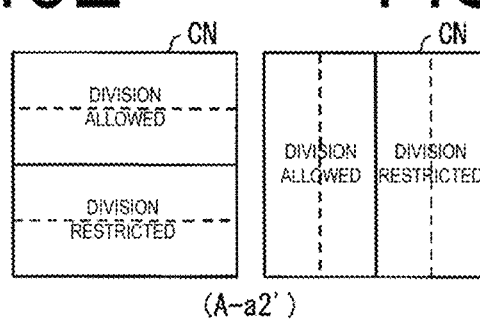
Figure 13F:
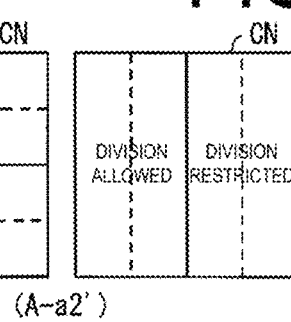

In the examples illustrated in FIGS. 13E and 13F, the CN information decoder 10 restricts (prohibits) split of any one of blocks, which are generated by splitting a higher block by BT split, by BT split in a direction the same as a split direction of the higher block. For example, a block subject to restriction of split may be a block on which split processing is to be performed later, out of two blocks generated by splitting a higher block. However, there are no particular limitations as to a block subject to restriction of split.

In other words, in a case that a target block is one of two blocks obtained by performing binary tree split on a higher block, the CN information decoder 10 restricts split of the target block by binary tree split in a direction the same as a direction of the binary tree split performed on the higher block.

Restricted Split Pattern: A-b1

Figure 14A:
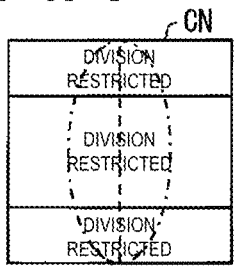
FIGS. 14A to 14H are diagrams illustrating examples of split patterns of the image decoding apparatus according to the present embodiment.
Figure 14B:
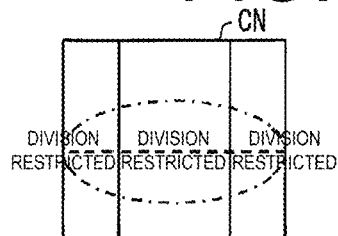

In the examples illustrated in FIGS. 14A and 14B, the CN information decoder 10 restricts (prohibits) split of all blocks, which are generated by splitting a higher block by TT split, by BT split in a direction different from a direction of the higher block. In other words, in two blocks out of three blocks generated by splitting a higher block, BT split in a direction different from a split direction of the higher block is possible. In the present example, at the time point of performing split processing of a block generated by splitting a higher block on which split processing is to be performed last, split directions of other blocks generated by the split of the higher block are referred to, and whether or not split of the block on which split processing is to be performed last is subject to restriction is determined.

The present restriction may also be expressed as follows. In a case that a target block is one of three blocks obtained by performing ternary tree split on a higher block and that the other two blocks out of the three blocks are split by binary tree split in a direction different from a direction of the ternary tree split performed on the higher block, the CN information decoder 10 restricts split of the target block by binary tree split in a direction different from the direction of the ternary tree split performed on the higher block.

Restricted Split Pattern: A-b1'

Figure 14C:
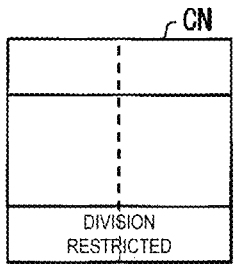
Figure 14D:
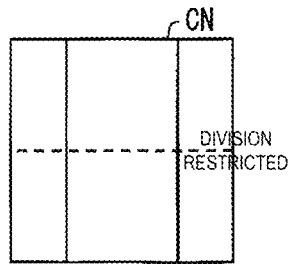

In the examples illustrated in FIGS. 14C and 14D, the CN information decoder 10 restricts (prohibits) split of any one of blocks, which are generated by splitting a higher block by TT split, by BT split in a direction different from a split direction of the higher block. For example, a block subject to restriction of split may be a block on which split processing is to be performed last, out of blocks generated by splitting a higher block. However, there are no particular limitations as to a block subject to restriction of split.

In other words, in a case that a target block is one of three blocks obtained by performing ternary tree split on a higher block, the CN information decoder 10 restricts split of the target block by binary tree split in a direction different from a direction of the ternary tree split performed on the higher block.

Figure 14E:
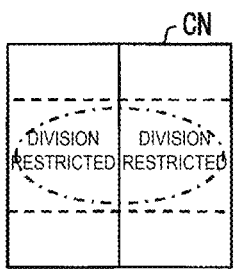
Figure 14F:
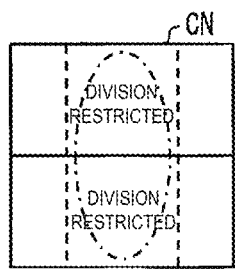

In the examples illustrated in FIGS. 14E and 14F, the CN information decoder 10 restricts (prohibits) split of both blocks, which are generated by splitting a higher block by BT split, by TT split in a direction different from a split direction of the higher block. In other words, in only one of blocks generated by splitting a higher block, TT split in a direction different from a split direction of the higher block is possible.

The present restriction may also be expressed as follows. In a case that a target block is one of two blocks obtained by performing binary tree split on a higher block and that the other block out of the two blocks is split by ternary tree split in a direction different from a direction of the binary tree split performed on the higher block, the CN information decoder 10 restricts split of the target block by ternary tree split in a direction different from the direction of the binary tree split performed on the higher block.

Restricted Split Pattern: A-b2'

Figure 14G:
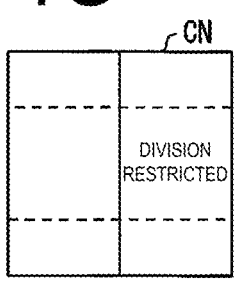
Figure 14H:
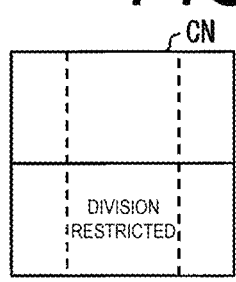

In the examples illustrated in FIGS. 14G and 14H, the CN information decoder 10 restricts (prohibits) split of any one of blocks, which are generated by splitting a higher block by BT split, by TT split in a direction different from a split direction of the higher block. For example, a block subject to restriction of split may be a block on which split processing is to be performed later, out of two blocks generated by splitting a higher block. However, there are no particular limitations as to a block subject to restriction of split.

In other words, in a case that a target block is one of two blocks obtained by performing binary tree split on a higher block, the CN information decoder 10 restricts split of the target block by ternary tree split in a direction different from a direction of the binary tree split performed on the higher block.

Restricted Split Pattern: A-c

Figures 15A, 15B:
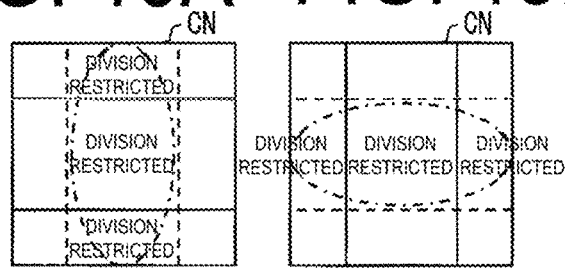
FIGS. 15A to 15D are diagrams illustrating examples of split patterns of the image decoding apparatus according to the present embodiment.

In the examples illustrated in FIGS. 15A and 15B, the CN information decoder 10 restricts (prohibits) split of all blocks, which are generated by splitting a higher block by TT split, by TT split in a direction different from a split direction of the higher block. In other words, in two blocks out of three blocks generated by splitting a higher block, TT split in a direction different from a split direction of the higher block is possible.

Note that, in the present example, in a case that both horizontal TT split and vertical TT split of blocks generated by splitting a higher block are restricted (prohibited), a nine-split split pattern cannot be formed. Therefore, the CN information decoder 10 may restrict (prohibit) the split in only either the horizontal direction or the vertical direction.

The present restriction may also be expressed as follows. In a case that a target block is one of three blocks obtained by performing ternary tree split on a higher block and that the other two blocks out of the three blocks are split by ternary tree split in a direction different from a direction of the ternary tree split performed on the higher block, the CN information decoder 10 restricts split of the target block by ternary tree split in a direction different from the direction of the ternary tree split performed on the higher block.

Restricted Split Pattern: A-c'

Figures 15C, 15D:
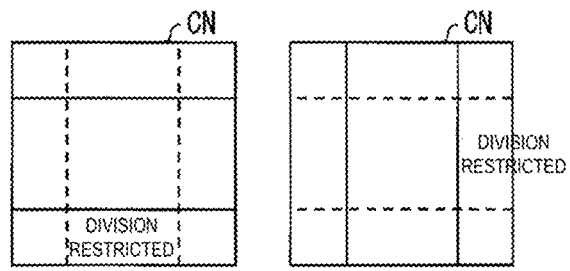

In the examples illustrated in FIGS. 15C and 15D, the CN information decoder 10 restricts (prohibits) split of any one of blocks, which are generated by splitting a higher block by TT split, by TT split in a direction different from a split direction of the higher block. For example, a block subject to restriction of split may be a block on which split processing is to be performed last, out of blocks generated by splitting a higher block. However, there are no particular limitations as to a block subject to restriction of split.

In other words, in a case that a target block is one of three blocks obtained by performing ternary tree split on a higher block, the CN information decoder 10 restricts split of the target block by ternary tree split in a direction different from a direction of the ternary tree split performed on the higher block.

Overview of Flow of BT/TT Information Decoding Processing

Figure 16:
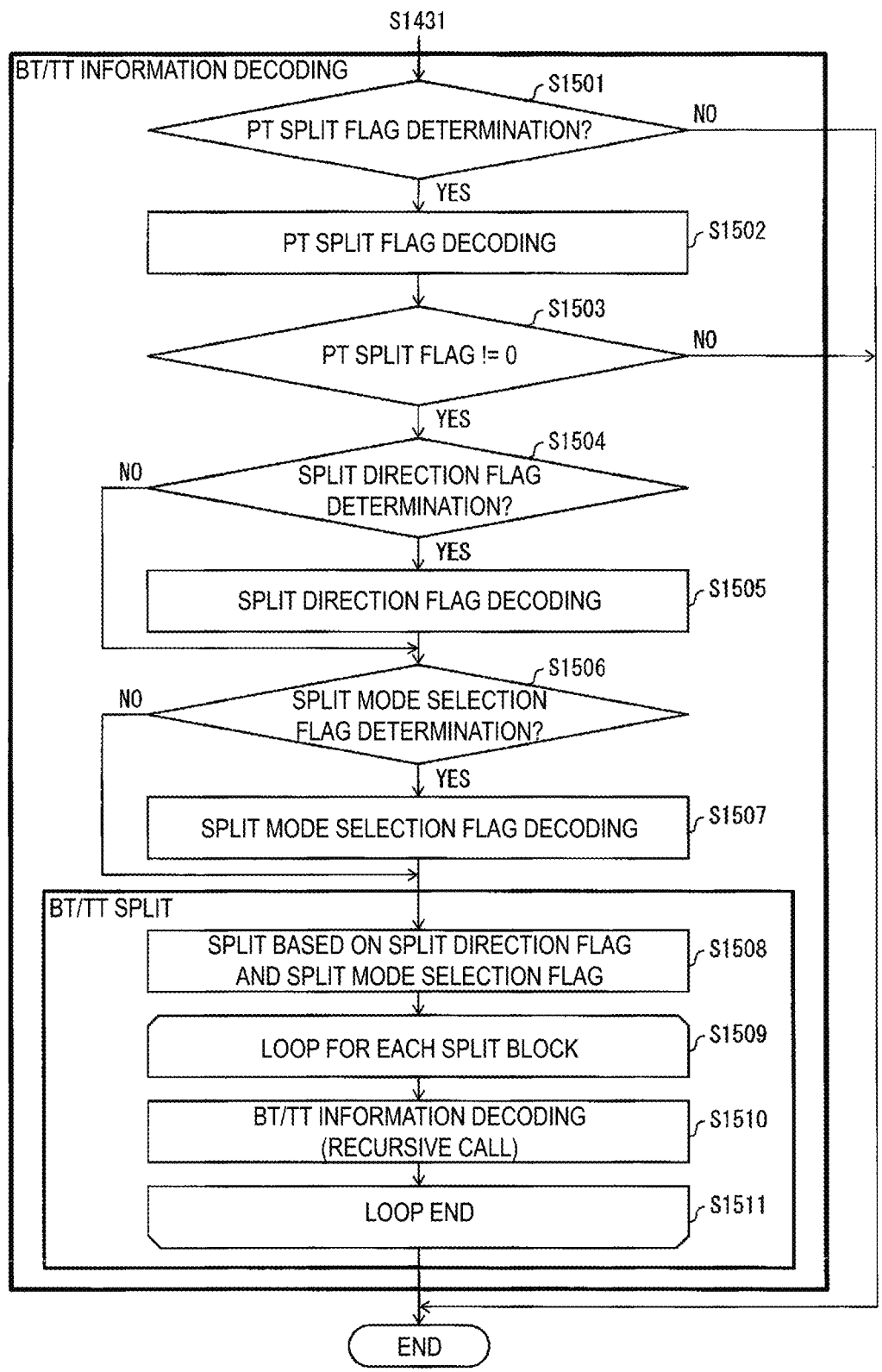
FIG. 16 is a flowchart illustrating decoding processing according to the present embodiment.

An overview of BT/TT information decoding processing performed by the CN information decoder 10 will now be described with reference to FIG. 16. FIG. 16 is a flowchart illustrating an overview of an example of a flow of BT/TT information decoding processing of the CN information decoder 10.

In S1431 described above, in a case that the QT split flag split_cu_flag is 0, the CN information decoder 10 determines whether or not a target block can be split by PT split, based on a size of the target block or the like, and then determines whether or not decoding of a PT split flag is required (S1501: PT split flag determination). In a case that decoding of a PT split flag is "required" (YES in S1501), the CN information decoder 10 decodes the PT split flag (S1502). Subsequently, the CN information decoder 10 determines whether or not the decoded PT split flag is 0 (S1503). In a case that the PT split flag is 0 (NO in S1503), the processing ends. In a case that the PT split flag is other than 0 (YES in S1503), the CN information decoder 10 determines whether or not a split direction is uniquely determined based on restriction on split of a block that has a configured split direction of a split target block, for example, and performs determination as to whether or not decoding of a split direction flag is required (S1504: split direction flag determination). In a case that decoding of a split direction flag is "required" (in a case that a split direction is not uniquely determined, for example) (YES in S1504), the CN information decoder 10 decodes the split direction flag (S1505), and determines a split direction. The processing proceeds to S1506. In a case that decoding of a split direction flag is "not required" (in a case that a split direction is uniquely determined, for example) (NO in S1504), the CN information decoder 10 does not decode the split direction flag. The processing proceeds to S1506. In S1506, the CN information decoder 10 determines whether or not a split mode of a split target block (TT split, BT split) is uniquely determined based on restriction on split of a block that has a configured split mode, for example, and determines whether or not decoding of a split mode selection flag is required (S1506: split mode selection flag determination). In a case that decoding of a split mode selection flag is "required" (in a case that a split mode is not uniquely determined, for example) (YES in S1506), the CN information decoder 10 decodes the split mode selection flag (S1507), and determines a split mode. The processing proceeds to S1508. In a case that decoding of a split mode selection flag is "not required" (in a case that a split mode is uniquely determined, for example) (NO in S1506), the CN information decoder 10 does not decode the split mode selection flag. The processing proceeds to S1508. Subsequently, in S1508, the CN information decoder 10 splits the split target block according to the determined direction and the determined split mode (S1508). Subsequently, the CN information decoder 10 performs loop processing of repeatedly performing BT/TT information decoding processing on blocks generated by the split (S1509, S1510, S1511). The processing ends after the loop processing ends.

Details of BT/TT Information Decoding Processing

Details of each processing included in BT/TT information decoding processing will now be described with reference to FIG. 17A to FIG. 39B.

PT Split Flag Determination, Decoding of PT Split Flag, Determination as to Whether or Not Split Is Required Based on PT Split Flag First, with reference to FIGS. 17A and 17B, details of PT split flag determination processing will be described. FIG. 17A is a diagram illustrating an example of a pseudocode representing PT split flag determination processing, and FIG. 17B is a diagram illustrating an example of a pseudocode representing decoding processing of a PT split flag. As illustrated in FIG. 17A, in a case that split by either BT split or TT split is possible, the CN information decoder 10 determines that PT split is possible, and determines that decoding of a PT split flag split_pt_flag is "required" (TRUE). Subsequently, as illustrated in FIG. 17B, the CN information decoder 10 decodes the PT split flag split_pt_flag, and determines whether or not PT split is required based on the split_pt_flag. In a case that split is not possible in either BT split or TT split, the CN information decoder 10 determines that decoding of a PT split flag split_pt_flag is "not required" (FALSE). BT split possibility determination and TT split possibility determination will be described later in detail. Note that, in this processing, BTAvailable or TTAvailable to be configured may be called from another subroutine in BT/TT split information decoding processing, and may be able to be referred to.

BT Split Possibility Determination

Details of BT split possibility determination processing of FIG. 17A will now be described with reference to FIGS. 18A and 18B. FIG. 18A is a diagram illustrating an example of a pseudocode representing BT split possibility determination processing in a case that there are no restricted split patterns described above. As illustrated in FIG. 18A, the CN information decoder 10 derives minPTSize (unit size) indicating a minimum value of a size of a CU. The CN information decoder 10 performs BT split possibility determination, with reference to condition 1 to condition 3 described below.

Condition 1: The height of a split target block is equal to or greater than minPTSize×2, or the width of a split target block is equal to or greater than minPTSize×2 (height>=minPTSize*2||width>=minPTSize*2).

Condition 2: The width and the height of a split target block are equal to or less than maxPTSize indicating a maximum value of a size of a CU (width<=maxPTSize && height<=maxPTSize).

Condition 3: cptDepth indicating a level of hierarchy of a split target block is less than maxPTDepth (cptDepth<maxPTDepth). Note that a value of Depth in each block may be d=log 2((maxPTSize^2)/(width*height)), based on an area ratio of a block. Alternatively, another method may be used in which one is added to a value of Depth of a higher block.

In a case that all of conditions 1 to 3 described above are satisfied, the CN information decoder 10 determines that BT split is possible (TRUE). In a case that not all of conditions 1 to 3 described above are satisfied, the CN information decoder 10 determines that BT split is not possible (FALSE).

BT split possibility determination processing in a case that there is a restricted split pattern described above will now be described. FIG. 18B is a diagram illustrating an example of a pseudocode representing BT split possibility determination processing in a case that there is a restricted split pattern described above. As illustrated in FIG. 18B, in a case that there is a restricted split pattern, the CN information decoder 10 determines that BT split is possible (TRUE) in a case that BT split possibility determination_additional condition is satisfied in addition to conditions 1 to 3 described above. The BT split possibility determination_additional condition differs depending on a restricted split pattern. Details of the BT split possibility determination_additional condition will be described later.

TT Split Possibility Determination

Details of TT split possibility determination processing will now be described with reference to FIGS. 19A and 19B. FIG. 19A is a diagram illustrating an example of a pseudocode representing TT split possibility determination processing in a case that there are no restricted split patterns described above. The CN information decoder 10 derives minPTSize (unit size) indicating a minimum value of a size of a CU. The CN information decoder 10 performs TT split possibility determination, with reference to condition 1 to condition 3 described below.

Condition 1: According to TT split, a side of a split target block is split in 1:2:1. Therefore, the height of a split target block is equal to or greater than minPTSize×4, or the width of a split target block is equal to or greater than minPTSize×4 ((height>=minPTSize*4||width>=minPTSize*4).

Condition 2: The width and the height of a split target block are equal to or less than maxPTSize indicating a maximum value of a size of a CU (width<=maxPTSize && height<=maxPTSize).

Condition 3: cptDepth indicating a level of hierarchy of a split target block is less than maxPTDepth (cptDepth<maxPTDepth).

In a case that all of conditions 1 to 3 described above are satisfied, the CN information decoder 10 determines that TT split is possible (TRUE). In a case that not all of conditions 1 to 3 described above are satisfied, the CN information decoder 10 determines that TT split is not possible (FALSE).

TT split possibility determination processing in a case that there is a restricted split pattern described above will now be described. FIG. 19B is a diagram illustrating an example of a pseudocode representing TT split possibility determination processing in a case that there is a restricted split pattern described above. As illustrated in FIG. 19B, in a case that there is a restricted split pattern, the CN information decoder 10 determines that TT split is possible (TRUE) in a case that TT split possibility determination_additional condition is satisfied in addition to conditions 1 to 3 described above. The TT split possibility determination_additional condition differs depending on a restricted split pattern. Details of the BT split possibility determination_additional condition will be described later.

Note that the CN information decoder 10 may use a doubled value of the value of the minimum size (=minPTSize*2), as minPTSize*4, that is used to determine whether or not BT split is possible to determine whether or not TT split is possible.

In other words, the CN information decoder 10 refers to a doubled size of a minimum size that is referred to for determining whether or not a target block can be split by binary tree split to determine whether or not the target block can be split by ternary tree split.

According to the configuration described above, in a case that a block generated by TT split has a size that cannot be predicted or transformed, i.e., in a case that TT split cannot be used, a code amount of a PT split flag and a split mode selection flag can be reduced. Therefore, coding efficiency is improved. In determination of TT split, using a doubled size of a value that is used to determine BT split allows a minimum size of a block after splitting to be the same size in both BT split and TT split. Therefore, the processing can be shared by BT split and TT split.

First Example of Derivation Method of cptDepth

As described above, the CN information decoder 10 is configured to use a common depth variable cptDepth (temporary variable) in BT split possibility determination and TT split possibility determination to restrict a level of hierarchy of a block that can be split. Specifically, the CN information decoder 10 uses whether or not a common depth is less than a threshold value maxPTDepth to determine whether or not PT (BT or TT) split is possible.

In other words, the CN information decoder 10 refers to a depth variable common to binary tree split and ternary tree split to restrict split of a target block. According to the configuration described above, a level of hierarchy of a block that can be split is restricted, and thus the number of combinations of BT split and TT split can be reduced. Therefore, complexity of coding and decoding can be reduced. Specifically, a problem in complexity of coding and decoding due to a vast number of combinations of BT split and TT split can be solved. cptDepth may be derived from the sum of a split depth btDepth of BT split and a split depth ttDepth of TT split. Specifically, the following equation is obtained.

cptDepth=btDepth+ttDepth

To derive cptDepth, for example, an initial value of cptDepth may be configured to be 0, and a value of cptDepth of a block generated by splitting a higher block may be configured to be {value of cptDepth of higher block}+1 in a case of performing BT split or TT split on a block. Then, CU information decoding processing of a block in an immediately lower level of hierarchy may be continued recursively.

Also in a case that a split depth btDepth of BT split and a split depth ttDepth of TT split are derived, similarly, an initial value of btDepth may be configured to be 0, and a value of btDepth of a block generated by splitting a higher block in a case of performing BT split on a block may be configured to be {value of btDepth of higher block}+1. An initial value of ttDepth may be configured to be 0, and a value of ttDepth of a block generated by splitting a higher block in a case of performing TT split on a block may be configured to be {value of btDepth of higher block}+1.

Second Example of Derivation Method of cptDepth

Another derivation method of cptDepth will be described. For example, an initial value of a depth cptDepth is configured to be 0, and a value of cptDepth of a block generated by split in a case of performing BT split on a block is cptDepth+1. In a case that a block generated by split in a case of performing TT split on a block is the middle portion of the TT split (partIdx==1), a value of cptDepth is configured to be {value of cptDepth of higher block}+1. In a case that a block generated by split in a case of performing TT split on a block is other than the middle portion of the TT split (partIdx==0 or partIdx==2), a value of cptDepth may be configured to be {value of cptDepth of higher block}+2. Then, CU information decoding processing of a block in an immediately lower level of hierarchy may be continued recursively.

Also in a case that a split depth btDepth of BT split and a split depth ttDepth of TT split are derived, similarly, an initial value of btDepth may be configured to be 0, and in a case of performing BT split on a block, a value of btDepth of a block generated by splitting a higher block may be configured to be {value of btDepth of higher block}+1. An initial value of ttDepth is configured to be 0, and in a case that a block generated by split in a case of performing TT split on a block is the middle portion of the TT split (partIdx==1), a value of ttDepth is configured to be {value of tttDepth of higher block}+1. In a case that a block generated by split in a case of performing TT split on a block is other than the middle portion of the TT split (partIdx==0 or partIdx==2), a value of ttDepth may be configured to be {value of ttDepth of higher block}+2.

BT/TT Split Possibility Determination (Additional Condition of A-a1)

An additional condition of BT split possibility determination for the restricted split pattern illustrated in FIGS. 13A and 13B (A-a1: the CN information decoder 10 restricts (prohibits) split of the middle block, which is generated by splitting a higher block by TT split, by BT split in a direction the same as a split direction of the higher block) will now be described with reference to FIG. 20.

FIG. 20 to FIG. 25 are diagrams illustrating examples of additional conditions of BT/TT split possibility determination. As illustrated in FIG. 20, in a case that a split mode of a higher block is not TT split, or that a split target block is not the middle block of TT split (parentSplitMode !=MODE_TT||partIdx!=1), the CN information decoder 10 determines that BT split is possible (TRUE). For example, MODE_TT=1, MODE_BT=0 may be employed.

In a case that a split direction of a higher block is the horizontal direction and the width of a split target block is less than minPTSize×2 (parentSplitDir==0 && width<minPTSize*2), or in a case that a split direction of a higher block is the vertical direction and the height of a split target block is less than minPTSize×2 (parentSplitDir==1 && height<minPTSize*2), the CN information decoder 10 determines that BT split is not possible (FALSE).

Note that, in the restricted split pattern (A-a1), a subroutine of TT split possibility determination_additional condition( ) is unnecessary. Therefore, the CN information decoder 10 may be configured not to call TT split possibility determination_additional condition, or may be configured to always return TRUE to TT split possibility determination_additional condition.

BT/TT Split Possibility Determination (Additional Condition of A-a2)

An additional condition of BT split possibility determination for the restricted split pattern illustrated in FIGS. 13C and 13F (A-a2: the CN information decoder 10 restricts (prohibits) split of both blocks, which are generated by splitting a higher block by BT split, by BT split in a direction the same as a split direction of the higher block (prohibits split of a block to be processed last in the BT split by BT split in a direction the same as a split direction of the higher block)) will now be described with reference to FIG. 21.

As illustrated in FIG. 21, in a case that a split mode of a higher block is not BT split, or that partIdx of a target block is not 1 (parentSplitMode !=MODE_BT||partIdx!=1), the CN information decoder 10 determines that BT split is possible (TRUE).

In a case that a split mode for a split target block is BT split, and that partIdx of the split target block is 1 (MODE_BT && partIdx==1), the following procedure is employed.

In a case that a split direction of a higher block is the horizontal direction (parentSplitDir==0), the CN information decoder 10 derives siblingHorBTCount indicating the number of times horizontal BT split is used in a block generated by split of the same higher block. In a case that the other block generated by split of the higher block is horizontally split by BT split, and that the width of a split target block is less than minPTSize×2 (siblingHorBTCount==1 && width<minPTSize*2)), the CN information decoder 10 determines that the split target block cannot be split by BT split (FALSE).

In a case that a split direction of a higher block is the vertical direction (parentSplitDir==1), the CN information decoder 10 derives siblingVerBTCount indicating the number of times vertical BT split is used in a block generated by split of the same higher block. In a case that the other block generated by split of the higher block is vertically split by BT split, and that the height of a split target block is less than minPTSize×2 (siblingVerBTCount==1 && height<minPTSize*2), the CN information decoder 10 determines that the split target block cannot be split by BT split (FALSE).

In a case that a split target block does not satisfy the above-mentioned condition that BT split is not possible, the CN information decoder 10 determines that BT split is possible (TRUE). Note that, in the restricted split pattern (A-a2), a subroutine of TT split possibility determination_additional condition( ) is unnecessary.

BT split possibility determination_additional condition in the restricted split pattern (A-a2': the CN information decoder 10 restricts (prohibits) split of any one of blocks, which are generated by splitting a higher block by BT split, by BT split in a direction the same as a split direction of the higher block) is implemented by partly changing the BT split possibility determination_additional condition of the restricted split pattern (A-a2). Specifically, the CN information decoder 10 does not derive siblingHorBTCount/siblingVerBTCount. The CN information decoder 10 does not perform determination regarding a condition using siblingHorBTCount/siblingVerBTCount (determines TRUE). In a case that a block subject to restriction of split is other than a block on which split processing is to be performed last, an additional condition can be implemented by changing a value of partIdx in the additional condition to a value indicating a block as a target of restriction.

BT/TT Split Possibility Determination (Additional Condition of A-b1)

An additional condition of BT split possibility determination for the restricted split pattern illustrated in FIGS. 14A to 14D (A-b1: the CN information decoder 10 restricts (prohibits) split of all blocks, which are generated by splitting a higher block by TT split, by BT split in a direction different from a direction of the higher block) will now be described with reference to FIG. 22. In the present restriction, the CN information decoder 10 performs restriction on a block on which split processing is to be performed last, out of blocks generated by TT split.

As illustrated in FIG. 22, in a case that a split mode of a higher block is not TT split, or that partIdx of a target block is not 2 (parentSplitMode!=MODE_TT||partIdx!=2), the CN information decoder 10 determines that BT split is possible (TRUE).

In a case that a split mode of a higher block is TT split, and that partIdx of a split target block is 2 (MODE_TT && partIdx==2), the following procedure is employed.

In a case that a split direction of a higher block is the horizontal direction (parentSplitDir==0), the CN information decoder 10 derives siblingVerBTCount. In a case that the other two blocks generated by split of the higher block are vertically split by BT split (that is to say, vertical BT split is restricted and thus impossible), and that horizontal BT split is also impossible because the height of a split target block is less than minPTSize×2 (siblingVerBTCount==2

&& height<minPTSize*2), the CN information decoder 10 determines that the split target block cannot be split by BT split (FALSE).

In a case that a split direction of a higher block is the vertical direction (parentSplitDir==1), the CN information decoder 10 derives siblingHorBTCount. In a case that the other two blocks generated by split of the higher block are horizontally split by BT split (that is to say, horizontal BT split is restricted and thus impossible), and that vertical BT split is also impossible because the width of a split target block is less than minPTSize×2 (siblingHorBTCount==2 && width<minPTSize*2), the CN information decoder 10 determines that the split target block cannot be split by BT split (FALSE).

In a case that a split target block does not satisfy the above-mentioned condition that BT split is not possible, the CN information decoder 10 determines that BT split is possible (TRUE). Note that, in the restricted split pattern (A-b1), a subroutine of TT split possibility determination_additional condition( ) is unnecessary.

BT split possibility determination_additional condition in the restricted split pattern (A-b1': the CN information decoder 10 restricts (prohibits) split of any one block of blocks, which are generated by splitting a higher block by TT split, by BT split in a direction different from a split direction of the higher block) is implemented by partly changing the BT split possibility determination_additional condition of the restricted split pattern (A-b1). Specifically, the CN information decoder 10 does not derive siblingHorBTCount/siblingVerBTCount. The CN information decoder 10 does not perform determination regarding a condition using siblingHorBTCount/siblingVerBTCount (determines TRUE). In a case that a block subject to restriction of split is other than a block on which split processing is to be performed last, an additional condition can be implemented by changing a value of partIdx in the additional condition.

BT/TT Split Possibility Determination (Additional Condition of A-b2)

An additional condition of TT split possibility determination for the restricted split pattern illustrated in FIGS. 14E to 14H (A-b2: the CN information decoder 10 restricts (prohibits) split of both blocks, which are generated by splitting a higher block by BT split, by TT split in a direction different from a split direction of the higher block) will now be described with reference to FIG. 24. In the present restriction, the CN information decoder 10 performs restriction on a block on which split processing is to be performed last, out of blocks generated by BT split.

As illustrated in FIG. 24, in a case that a split mode of a higher block is not BT split, or that partIdx of a target block is not 1 (parentSplitMode!=MODE_BT||partIdx!=1), the CN information decoder 10 determines that TT split is possible (TRUE).

In a case that a split mode of a higher block is BT split, and that partIdx of a split target block is 1 (MODE_BT && partIdx==1), the following procedure is employed.

In a case that a split direction of a higher block is the horizontal direction (parentSplitDir==0), the CN information decoder 10 derives siblingVerTTCount indicating the number of times vertical TT split is used in a block generated by split of the same higher block. In a case that the other block generated by split of the higher block is vertically split by TT split (that is to say, vertical TT split in a split target block is restricted and thus impossible), and that horizontal TT split is also impossible because the height of a split target block is less than minPTSize×4 (siblingVerTTCount==1 && height<minPTSize*4), the CN information decoder 10 determines that the split target block cannot be split by TT split (FALSE).

In a case that a split direction of a higher block is the vertical direction (parentSplitDir==1), the CN information decoder 10 derives siblingHorTTCount indicating the number of times horizontal TT split is used in a block generated by split of the same higher block. In a case that the other block generated by split of the higher block is horizontally split by TT split (that is to say, horizontal TT split in a split target block is restricted and thus impossible), and that vertical TT split is also impossible because the width of a split target block is less than minPTSize×4 siblingHorTTCount==1 && width<minPTSize*4), the CN information decoder 10 determines that the split target block cannot be split by TT split (FALSE).

In a case that a split target block does not satisfy the above-mentioned condition that TT split is not possible, the CN information decoder 10 determines that TT split is possible (TRUE). Note that, in the restricted split pattern (A-b2), a subroutine of BT split possibility determination_additional condition( ) is unnecessary.

TT split possibility determination_additional condition in the restricted split pattern (A-b2': the CN information decoder 10 restricts (prohibits) split of any one of blocks, which are generated by splitting a higher block by BT split, by TT split in a direction different from a split direction of the higher block) is implemented by partly changing the TT split possibility determination_additional condition of the restricted split pattern (A-b2). Specifically, the CN information decoder 10 does not derive siblingHorBTCount/siblingVerBTCount. The CN information decoder 10 does not perform determination regarding a condition using siblingHorBTCount/siblingVerBTCount (determines TRUE). In a case that a block subject to restriction of split is other than a block on which split processing is to be performed last, an additional condition can be implemented by changing a value of partIdx in the additional condition to a value indicating a block as a target of restriction.

BT/TT Split Possibility Determination (Additional Condition of A-c)

An additional condition of TT split possibility determination for the restricted split pattern illustrated in FIGS. 15A to 15D (A-c: the CN information decoder 10 restricts (prohibits) split of all blocks, which are generated by splitting a higher block by TT split, by TT split in a direction different from a split direction of the higher block) will now be described with reference to FIG. 25. In the present restriction, the CN information decoder 10 performs restriction on a block on which split processing is to be performed last, out of blocks generated by splitting a higher block by TT split.

As illustrated in FIG. 25, in a case that a split mode of a higher block is not TT split, that a split direction of the higher block is not the horizontal direction, or that partIdx is not 2 (parentSplitMode!=MODE_TT||parentSplitDir!=0||partIdx!=2), the CN information decoder 10 determines that TT split is possible (TRUE).

In a case that a split mode of a higher block is TT split, that a direction of the split is the horizontal direction, and that partIdx of a split target block is 2, the following procedure is employed.

The CN information decoder 10 derives siblingVerTTCount. In a case that the other two blocks generated by split of the higher block are vertically split by TT split (that is to say, vertical TT split in a split target block is restricted and thus impossible), and that horizontal TT split is also impossible because the height of a split target block is less than minPTSize×4 (siblingVerTTCount==2 && height<minPTSize*4), the CN information decoder 10 determines that the split target block cannot be split by TT split (FALSE).

Note that, as described above, in this case, if restriction is not performed in a case that a split mode of a higher block is TT split and that a direction of the split is the vertical direction, a nine-split split pattern using TT split in two levels of hierarchy can be used.

In a case that a split target block does not satisfy the above-mentioned condition that TT split is not possible, the CN information decoder 10 determines that TT split is possible (TRUE). Note that, in the restricted split pattern (A-c), a subroutine of BT split possibility determination_additional condition( ) is unnecessary.

TT split possibility determination_additional condition in the restricted split pattern (A-c': the CN information decoder 10 restricts (prohibits) split of any one block of blocks, which are generated by splitting a higher block by TT split, by TT split in a direction different from a split direction of the higher block) is implemented by partly changing the TT split possibility determination_additional condition of the restricted split pattern (A-c). Specifically, the CN information decoder 10 does not derive siblingVerBTCount. The CN information decoder 10 does not perform determination regarding a condition using siblingVerBTCount (determines TRUE). In a case that a block subject to restriction of split is other than a block on which split processing is to be performed last, an additional condition can be implemented by changing a value of partIdx in the additional condition to a value indicating a block as a target of restriction.

FIG. 23 is another pseudocode representing TT split possibility determination processing performed by the CN information decoder 10.

As illustrated in FIG. 23, in a case that a split mode parentSplitMode of a higher block is not TT split, or that a split index partIdx of a target block is not 2 (if (parentSplitMode!=MODE_TT||partIdx!=2)), the CN information decoder 10 determines that TT split is possible (TRUE).

In a case that a split mode for a split target block is TT split, and that partIdx of the split target block is 2 (MODE_TT && partIdx==2), the following procedure is employed.

In a case that a split direction parentSplitDir of a higher block is the horizontal direction (if (parentSplitDir==HOR)), the CN information decoder 10 derives siblingVerTTCount indicating the number of times vertical TT split is used in blocks generated by split of the same higher block. In a case that the other two blocks generated by split of the higher block are vertically split by TT split, and that the height of a split target block is less than minPTSize×4 (siblingVerTTCount==2 && height<minPTSize*4), the CN information decoder 10 determines that the split target block cannot be split by TT split (FALSE).

In other words, in a case that a higher block is horizontally split by TT split, if both of the first two split target blocks (blocks of partIdx=0, 1) are vertically split by TT split, vertical TT split of the last block (block of partIdx=2) is restricted. At this time, in a case that the height is not sufficient enough to allow further horizontal TT split, it is determined that TT split itself is not possible.

In a case that a split direction of a higher block is the vertical direction (if (parentSplitDir==VER)), the CN information decoder 10 derives siblingHorTTCount indicating the number of times horizontal TT split is used in blocks generated by split of the same higher block. In a case that the other two blocks generated by split of the higher block are horizontally split by TT split, and that the height of a split target block is less than minPTSize×4 (siblingHorTTCount==2 && width<minPTSize*4), the CN information decoder 10 determines that the split target block cannot be split by TT split (FALSE).

In other words, in a case that a higher block is vertically split by TT split, if both of the other two split target blocks are horizontally split by TT split, horizontal TT split of a block of partIdx=2 is restricted. In a case that the width is not sufficient enough to allow further vertical TT split, it is determined that TT split is not possible.

Note that TRUE is returned in a case that a condition of FALSE does not hold true.

Subsequently, with reference to FIG. 26, another example of restriction of a block split performed by the CN information decoder 10 will be described. In the example of FIG. 26, in a case that a split mode of a higher block is TT split and that a target block is the middle block (partIdx==1), the CN information decoder 10 restricts split by TT split in a direction different from a direction of the higher block. In other words, the CN information decoder 10 prohibits such TT split that generates split the same as MFT split. Specifically, in a second example of MT information decoding processing, in a case that a target node is one of three nodes obtained by performing TT split on an immediately higher node, which is a node one generation higher than the target node, and that the target node is the middle node (partIdx==1) out of the three nodes, the CN information decoder 10 restricts split of the target node by TT split in a direction different from a direction of the TT split performed on the immediately higher node. For example, TT split after TT split is prohibited. Particularly, TT split in the middle block of TT split is prohibited.

As illustrated in FIG. 26, in a case that a split mode of a higher block is not TT split, or that partIdx of a target block is not 1 (if (parentSplitMode!=MODE_TT||partIdx!=1)), the CN information decoder 10 determines that TT split is possible (TRUE).

Otherwise, i.e., in a case that a split mode for a split target block is TT split, and that partIdx of the split target block is 1 (MODE_TT && partIdx==1), the following procedure is employed.

In a case that a split direction of a higher block is the horizontal direction (HOR) and that the height of a split target block is less than minPTSize×4, or in a case that a split direction parentSplitDir of a higher block is the vertical direction (VER) and that the width of a split target block is less than minPTSize×4 (parentSplitDir==HOR && height<minPTSize*4)||(parentSplitDir==VER && width<minPTSize*4), the CN information decoder 10 determines that the split target block cannot be split by TT split (FALSE).

In other words, in a case that a side free from prohibition of TT split has a length that is shorter than a length allowing TT split, the CN information decoder 10 determines that TT split is not possible.

Note that TRUE is returned in a case that a condition of FALSE does not hold true.

Split Direction Flag Determination

Details of split direction flag determination processing will now be described with reference to FIGS. 27A to 27C. FIG. 27A is a diagram illustrating an example of a pseudocode representing split direction flag determination processing in a case that there are no restricted split patterns described above. As illustrated in FIG. 27A, the CN information decoder 10 derives minPTSize (unit size) indicating a minimum value of a size of a CU. In a case that the width of a split target block is the minimum size (width==minPTSize), vertical split of the block is not possible. Therefore, split_dir_flag[x0][y0] indicating that a split direction of the split target block is the horizontal direction is configured (split_dir_flag[x0][y0]=0). Then, it is determined that decoding of a split direction flag is unnecessary (FALSE). Here, (x0, y0) represents top left coordinates of the split target block.

In a case that the height of a split target block is the minimum size (height==minPTSize), horizontal split of the block is not possible. Therefore, the CN information decoder 10 sets split_dir_flag[x0][y0] indicating that a split direction is the vertical direction. (split_dir_flag[x0][y0]=1). Then, the CN information decoder 10 determines that decoding of a split direction flag is unnecessary (FALSE).

In a case that neither the width nor the height of a split target block is the minimum size, split is possible in any direction of the horizontal direction and the vertical direction. Therefore, the CN information decoder 10 determines that decoding of a split direction flag is necessary (TRUE).

Split direction flag determination processing in a case that there is a restricted split pattern described above will now be described. FIG. 27B is a diagram illustrating an example of a pseudocode representing split direction flag determination processing in a case that there is a restricted split pattern described above. As illustrated in FIG. 27B, based on additional conditions differing depending on restricted split patterns described above, the CN information decoder 10 determines that a split direction is specified or determines that decoding of a split direction flag is necessary. The additional conditions differing depending on restricted split patterns will be described later with reference to FIG. 28 to FIG. 31.

In a case that the CN information decoder 10 determines that decoding of a split direction flag is necessary, the CN information decoder 10 decodes the split direction flag. FIG. 27C is a diagram illustrating an example of a pseudocode representing decoding processing of a split direction flag.

Details of split direction flag determination processing will now be described. FIG. 28 to FIG. 31 are diagrams illustrating examples of pseudocodes representing additional conditions of split direction flag determination for restricted split patterns.

Split Direction Flag Determination (Additional Condition of A-a1)

First, an additional condition of split direction flag determination for the restricted split pattern illustrated in FIGS. 13A and 13B (A-a1: the CN information decoder 10 restricts (prohibits) split of the middle block, which is generated by splitting a higher block by TT split, by BT split in a direction the same as a split direction of the higher block) will now be described with reference to FIG. 28.

As illustrated in FIG. 28, the CN information decoder 10 sets an initial value of horSplitAvailable and verSplitAvailable to be TRUE.

In a case that split of a higher block is not TT split, or that a split target block is not the middle block generated by TT split (parentSplitMode!=MODE_TT||partIdx!=1), the CN information decoder 10 determines that decoding of a split direction flag is necessary.

In a case that split of a higher block is TT split, and that a split target block is the middle block generated by TT split (parentSplitMode==MODE_TT && partIdx==1), horizontal BT split of the split target block is prohibited, in accordance with the restriction of (A-a1). In addition, in a case that the height of the split target block is less than minPTSize*4 (height<minPTSize*4), horizontal TT split is also impossible. Thus, in the horizontal direction, neither BT split nor TT split can be used. Therefore, it is determined that horizontal split of the split target block is impossible (horSplitAvailable=FALSE).

Similarly, in a case that a higher block is vertically split by TT split, vertical BT split of a split target block is prohibited. In addition, in a case that the width of the split block is less than minPTSize*4 (width<minPTSize*4), vertical TT split is also impossible. Thus, in the vertical direction, neither BT split nor TT split can be used. Therefore, vertical split of the split target block is impossible (verSplitAvailable=FALSE).

Post-Processing

In a case of horSplitAvailable and verSplitAvailable, the CN information decoder 10 determines that decoding of a split direction flag split_dir_flag is necessary. In a case that one of horSplitAvailable and verSplitAvailable is TRUE, the CN information decoder 10 configures split_dir_flag, and determines that decoding of the split_dir_flag is unnecessary (FALSE).

Split Direction Flag Determination (Additional Condition of A-a2)

An additional condition of split direction flag determination for the restricted split pattern illustrated in FIGS. 13C and 13D (A-a2: the CN information decoder 10 restricts (prohibits) split of both blocks, which are generated by splitting a higher block by BT split, by BT split in a direction the same as a split direction of the higher block) will now be described with reference to FIG. 29.

As illustrated in FIG. 29, the CN information decoder 10 sets an initial value of horSplitAvailable and verSplitAvailable to be TRUE.

In a case that split of a higher block is not BT split, or that a split target block is not a block on which split processing is to be performed last out of blocks generated by splitting the higher block (parentSplitMode !=MODE_BT-||partIdx!=1), the CN information decoder 10 determines that decoding of a split direction flag is necessary.

In a case that split of a higher block is horizontal BT split, and that partIdx of a split target block==1 (parentSplitMode==MODE_BT && partIdx==1 && parentSplitDir==0), the CN information decoder 10 derives siblingHorBTCount. In a case that a block corresponding to partIdx=0 is split by horizontal BT split, horizontal BT split of the split target block is prohibited. In addition, in a case that the height of the split target block is less than minPTSize*4 (siblingVerBTCount==1 && height<minPTSize*4), horizontal TT split is also impossible. Thus, in the horizontal direction, both of BT split and TT split are impossible. Therefore, it is determined that horizontal split of the split target block is impossible (horSplitAvailable=FALSE).

In a case that split of a higher block is vertical BT split, and that partIdx of a split target block==1 (parentSplitMode==MODE_BT && partIdx==1 && parentSplitDir==1), the CN information decoder 10 derives siblingVerBTCount. In a case that a block corresponding to partIdx=0 is split by vertical BT split, vertical BT split of a split target block is prohibited. In addition, in a case that the width of the split block is less than minPTSize*4 (siblingVerBTCount==1 && width<minPTSize*4), vertical TT split is also impossible. Thus, in the vertical direction, both of BT split and TT split are impossible. Therefore, vertical split of the split target block is impossible (verSplitAvailable=FALSE). Subsequent processing of the CN information decoder 10 is similar to Post-processing described above, and thus description of the subsequent processing is herein omitted.

Processing of the decoder 10 is similar to Post-processing described above, and thus description of the processing is herein omitted.

Split Direction Flag Determination (Additional Condition of A-b1)

An additional condition of split direction flag determination for the restricted split pattern illustrated in FIGS. 14A to 14D (A-b1: the CN information decoder 10 restricts (prohibits) split of all blocks, which are generated by splitting a higher block by TT split, by BT split in a direction different from a direction of the higher block) will now be described with reference to FIG. 30.

As illustrated in FIG. 30, the CN information decoder 10 sets an initial value of horSplitAvailable and verSplitAvailable to be TRUE.

In a case that split of a higher block is not TT split, or that a split target block is not a block on which split processing is to be performed last out of blocks generated by splitting the higher block (parentSplitMode!=MODE_TT||partIdx!=2), the CN information decoder 10 determines that decoding of a split direction flag is necessary.

In a case that split of a higher block is horizontal TT split, and that partIdx of a split target block==2 (parentSplitMode==MODE_TT && partIdx==2 && parentSplitDir==0), the CN information decoder 10 derives siblingVerBTCount. In a case that the other two blocks generated by splitting the higher block are split by vertical BT split, vertical BT split of the split target block is prohibited. In addition, in a case that the width of the split target block is less than minPTSize*4 (siblingVerBTCount==2 && width<minPTSize*4), it is determined that vertical split of the split target block is impossible (verSplitAvailable=FALSE).

In a case that split of a higher block is horizontal TT split, and that partIdx of a split target block==2 (parentSplitMode==MODE_TT && partIdx==2 && parentSplitDir==1), the CN information decoder 10 derives siblingHorBTCount. In a case that the other two blocks generated by splitting the higher block are split by horizontal BT split, horizontal BT split of the split target block is prohibited. In addition, in a case that the height of the split block is less than minPTSize*4 (siblingHorBTCount==2 && height<minPTSize*4), the CN information decoder 10 determines that horizontal split of the split target block is impossible (horSplitAvailable=FALSE). Subsequent processing of the CN information decoder 10 is similar to Post-processing described above, and thus description of subsequent processing is herein omitted.

Split Direction Flag Determination (Additional Condition of A-b2 and A-c)

In an additional condition of TT split possibility determination for the restricted split pattern illustrated in FIGS. 14E to 14H (A-b2: the CN information decoder 10 restricts (prohibits) split of both blocks, which are generated by splitting a higher block by BT split, by TT split in a direction different from a split direction of the higher block) and for the restricted split pattern illustrated in FIGS. 15A to 15D (A-c: the CN information decoder 10 restricts (prohibits) split of all blocks, which are generated by splitting a higher block by TT split, by TT split in a direction different from a split direction of the higher block), the CN information decoder 10 returns TRUE without performing anything as illustrated in FIG. 31. This subroutine is called in a case that neither the width nor the height of a split target block is minPTSize. Therefore, even in a case that TT split of a split target block is restricted, BT split remains possible, and thus options of a split direction are not limited. Note that the same holds true for an additional condition of split direction flag determination in A-b2' and A-c'.

FIG. 32 illustrates an example of another pseudocode representing split direction flag determination processing.

A case that a target block is not the middle block of TT split is not subject to restriction of a split direction. In a case that a split mode of a higher block is not TT split, or that partIdx is not 1 (if (parentSplitMode!=MODE_TT||partIdx!=1)), the CN information decoder 10 determines that TT split is possible (TRUE).

A case that a target block is the middle block of TT split is subject to restriction so that the middle block can be split only in a direction the same as a direction of a higher block. Specifically, the CN information decoder 10 configures such that a split direction of the middle block of TT split is a direction the same as the direction of the higher block. In a case that a split mode of a higher block is TT split, and that partIdx is 1 (if (parentSplitMode==MODE_TT && partIdx==1)), the CN information decoder 10 configures a split direction of a split target block to be a direction the same as a split direction of the higher block (split_dir_flag [x0][y0]=parentSplitDir).

Split Mode Selection Flag Determination

Details of split mode selection flag determination processing will now be described with reference to FIGS. 33A and 33B. FIG. 33A is a diagram illustrating an example of a pseudocode representing split mode selection flag processing. As illustrated in FIGS. 33A and 33B, the CN information decoder 10 derives BTAvailable and TTAvailable. BTAvailable and TTAvailable are derived earlier in the PT split flag determination processing, and therefore the derived BTAvailable and TTAvailable may be referred to and reused in the present processing. Changing the values of BTAvailable and TTAvailable during and after this subroutine affects a result of PT split flag determination, and is thus not allowed.

In a case of BTAvailable and TTAvailable, the CN information decoder 10 determines as to whether or not decoding of a split mode selection flag is required, in a split mode selection flag determination_additional condition. In a case that only any one of BT split and TT split is possible, the CN information decoder 10 configures a value of a split mode selection flag, and determines that decoding is unnecessary.

Note that split mode selection flag determination processing and split mode selection flag decoding processing are dependent solely on the PT split flag determination processing. Therefore, after the processing proceeds to YES due to a value of a PT split flag being true, split mode selection flag determination processing and split mode selection flag decoding processing may be performed before the split direction flag determination processing.

In a case that either TT split possibility that is derived through minimum value determination using a prescribed threshold value Th_TT (=minPTSize*4) in TT split possibility determination or BT split possibility that is derived through minimum value determination using a prescribed threshold value Th_BT (=minPTSize*2) in BT split possibility determination is true (PT split flag determination), the CN information decoder 10 decodes a PT split flag (common flag) indicating BT split and TT split.

In a case that both of BT split possibility and TT split possibility are true (split mode selection flag determination), the CN information decoder 10 decodes a split mode selection flag indicating either BT split or TT split. In a case that a split mode selection flag is not present, the CN information decoder 10 uses TT split possibility as a value of a split mode selection flag.

In other words, in a case that the CN information decoder 10 determines that any one of binary tree split for a target block and ternary tree split for a target block is possible, the CN information decoder 10 decodes a common flag indicating binary tree split and ternary tree split.

In a case that the CN information decoder 10 determines that both of binary tree split for a target block and ternary tree split for a target block are possible, the CN information decoder 10 decodes a split mode selection flag indicating either binary tree split or ternary tree split.

According to the configuration described above, in a case that a block generated by TT split has a size that cannot be predicted or transformed, i.e., in a case that TT split cannot be used, a PT split flag and a split mode selection flag are not decoded. Thus, a code amount of those flags can be reduced.

Fourth Embodiment

In FIGS. 18A and 18B and FIGS. 19A and 19B described above, the CN information decoder 10 refers to a depth variable common to binary tree split and ternary tree split to restrict split of a target block. However, a split depth variable btDepth of binary tree split and a split depth variable ttDepth of ternary tree split may be individually derived to restrict split of a target block.

Details of BT/TT Information Decoding Processing

Details of each processing included in BT/TT information decoding processing will be described with reference to FIG. 34A to FIG. 38B.

First, details of each processing in a case that a split depth variable btDepth of binary tree split and a split depth variable ttDepth of ternary tree split are individually restricted will be described with reference to FIGS. 34A to 35B.

First Example of Determination
PT Split Flag Determination

First, with reference to FIG. 34A, details of PT split flag determination processing will be described. FIG. 34A is a diagram illustrating an example of a pseudocode representing PT split flag determination processing. As illustrated in FIG. 34A, in a case that split by either BT split or TT split is possible, the CN information decoder 10 determines that PT split is possible, and determines that decoding of a PT split flag split_pt_flag is "required" (TRUE).

BT Split Possibility Determination

Details of BT split possibility determination processing will now be described with reference to FIG. 34B. FIG. 34B is a diagram illustrating an example of a pseudocode representing BT split possibility determination processing in a case that there are no restricted split patterns described above with reference to FIG. 13A to FIG. 15D. The CN information decoder 10 performs BT split possibility determination, with reference to condition 1 to condition 3 described below.

Condition 1: The height of a split target block is equal to or greater than minPTSize (unit size)×2 indicating a minimum value of a size of a CU, or the width of a split target block is equal to or greater than minPTSize×2 (height>=minPTSize*2||width>=minPTSize*2).

Condition 2: The width and the height of a split target block are equal to or less than maxPTSize indicating a maximum value of a size of a CU (width<=maxPTSize && height<=maxPTSize).

Condition 3: btDepth indicating a level of hierarchy of a split target block is less than maxBTDepth (btDepth<maxBTDepth).

In a case that all of conditions 1 to 3 described above are satisfied, the CN information decoder 10 determines that BT split is possible (TRUE). In a case that not all of conditions 1 to 3 described above are satisfied, the CN information decoder 10 determines that BT split is not possible (FALSE).

TT Split Possibility Determination

Details of TT split possibility determination processing will now be described with reference to FIG. 34C. FIG. 34C is a diagram illustrating an example of a pseudocode representing TT split possibility determination processing in a case that there are no restricted split patterns described above with reference to FIG. 13A to FIG. 15D. The CN information decoder 10 performs TT split possibility determination, with reference to condition 1 to condition 3 described below.

Condition 1: The height of a split target block is equal to or greater than minPTSize (unit size)×4 indicating a minimum value of a size of a CU, or the width of a split target block is equal to or greater than minPTSize×4 (height>=minPTSize*4||width>=minPTSize*4).

Condition 2: The width and the height of a split target block are equal to or less than maxPTSize indicating a maximum value of a size of a CU (width<=maxPTSize && height<=maxPTSize).

Condition 3: ttDepth indicating a level of hierarchy of a split target block is less than maxTTDepth (ttDepth<maxTTDepth).

In a case that all of conditions 1 to 3 described above are satisfied, the CN information decoder 10 determines that TT split is possible (TRUE). In a case that not all of conditions 1 to 3 described above are satisfied, the CN information decoder 10 determines that TT split is not possible (FALSE).

Determination illustrated in FIG. 34D is the same as determinations illustrated in FIGS. 34A to 34C. Determination illustrated in FIG. 34D is obtained by combining three determinations illustrated in FIGS. 34A to 34C.

Split Mode Selection Flag Determination

Details of split mode selection flag determination processing will now be described with reference to FIGS. 35A and 35B. FIG. 35A is a diagram illustrating an example of a pseudocode representing split mode selection flag determination processing. BTAvailable and TTAvailable are derived earlier in the PT split flag determination processing, and therefore the derived BTAvailable and TTAvailable may be referred to and reused in the present processing. Changing the values of BTAvailable and TTAvailable during and after this subroutine affects a result of PT split flag determination, and is thus not allowed.

In a case of BTAvailable and TTAvailable, the CN information decoder 10 determines TRUE.

FIG. 35B is a diagram illustrating an example of a pseudocode representing PT split mode selection flag determination processing. The CN information decoder 10 performs PT split mode selection flag determination, with reference to condition 1 to condition 3 described below.

Condition 1: The height of a split target block is equal to or greater than minPTSize (unit size)×4 indicating a minimum value of a size of a CU, or the width of a split target block is equal to or greater than minPTSize×4 (height>=minPTSize*4||width>=minPTSize*4).

Condition 2: The width and the height of a split target block are equal to or less than maxPTSize indicating a maximum value of a size of a CU (width<=maxPTSize && heigh<=maxPTSize).

Condition 3: btDepth indicating a level of hierarchy of a split target block is less than maxBTDepth, and ttDepth indicating a level of hierarchy of a split target block is less than maxTTDepth (btDepth<maxBTDepth && ttDepth<maxTTDepth).

In a case that all of conditions 1 to 3 described above are satisfied, the CN information decoder 10 determines TRUE. In a case that not all of conditions 1 to 3 described above are satisfied, the CN information decoder 10 determines FALSE.

In a case that a split depth variable btDepth of binary tree split and a split depth variable ttDepth of ternary tree split are individually restricted, configuration of maximum split depths maxBTDepth and maxTTDepth may be configured as follows. Three types of restriction examples of maximum split depths are given below.

Restriction Example a of Maximum Split Depths

A prescribed value (maximum number of times) is configured for a maximum binary tree split depth maxBTDepth and a maximum ternary tree split depth maxTTDepth. In this manner, the number of times of binary tree splits and the number of times of ternary tree splits can be restricted independently of each other. For example, in a case that the number of times of binary tree splits is restricted to twice, it is sufficient that maxBTDepth be configured to be 2. In a case that the number of times of ternary tree splits is restricted to once, it is sufficient that maxTTDepth be configured to be 1. Specifically, the following equations are obtained.

maxBTDepth=2, maxTTDepth=1

Alternatively, a maximum number of times may be configured as follows.

maxBTDepth=4, maxTTDepth=2

In a case that binary tree split and ternary tree split are compared, there is a difference in efficiency with the same processing time spent. In a case that each maximum split depth is individually configured as described above, a highly efficient case, such as in a case that binary tree split is performed deeper and ternary tree split is performed shallower, can be used.

Restriction Example b of Maximum Split Depths

A relationship between a maximum binary tree split depth maxBTDepth and a maximum ternary tree split depth maxTTDepth is configured. In this manner, a relationship between the number of times of binary tree splits and the number of times of ternary tree splits can be maintained. For example, in a case that it is intended that the number of times of ternary tree splits is reduced to be less than the number of times of binary tree splits, it is sufficient that a relationship be configured to be maxBTDepth>maxTTDepth.

Note that a relationship may be configured to be maxBTDepth>=maxTTDepth, or may be configured to be maxBTDepth>=maxTTDepth*2.

In a case that binary tree split and ternary tree split are compared, coding efficiency is higher in a case that binary tree split is performed deeper and ternary tree split is performed shallower. According to the configuration described above, an inefficient case, such as in a case that a maximum binary tree split depth maxBTDepth relating to binary tree split is small and a maximum ternary tree split depth maxTTDepth relating to ternary tree split is large, can be avoided.

Restriction Example c of Maximum Split Depths

A maximum value of the sum of a maximum binary tree split depth maxBTDepth and a maximum ternary tree split depth maxTTDepth is configured. In this manner, a maximum number of times of binary tree splits can be restricted, depending on whether ternary tree split is made effective (in a case ternary tree split is made effective, until how deep a maximum ternary tree depth is made effective).

maxBTDepth+maxTTDepth<sumMaxPTDepth

For example, the sum of a maximum binary tree split depth and a maximum ternary tree split depth is restricted to 3 or less (sumMaxPTDepth=3) (maxBTDepth+maxTTDepth<=3). In a case that ternary tree split is not effective (maxTTDepth=0), a maximum number of times maxTTDepth of binary tree split can be configured to be 3. In a case that ternary tree split is effective (maxTTDepth>0), a maximum number of times maxTTDepth of binary tree split can be configured to be a value less than 3. Specifically, the configuration can be as follows.

maxBTDepth=3, maxTTDepth=0 (in a case that ternary tree split is not effective) &p maxBTDepth=2, maxTTDepth=2 (in a case that ternary tree split is effective) In this case, a maximum binary tree split depth is restricted to 2 or less. Thus, in a case that ternary tree split is present, three consecutive binary tree splits can be prohibited. In a case that ternary tree split is made effective, a maximum number of times of binary tree splits can be configured to be even smaller. Thus, a highly complex combination, in which both binary tree split and ternary tree split are used many times, can be avoided. Therefore, prohibition of continuous binary tree splits leads to reduction in complexity of coding/decoding of a video. On the other hand, in a case that there are no ternary tree splits, the configuration can be maxBTDepth=3 and maxTTDepth=0, and binary tree split can be consecutively performed three times.

A TT split flag occurs highly frequently. In the first example of determination, a split depth variable btDepth of binary tree split and a split depth variable ttDepth of ternary tree split are individually restricted. Consequently, occurrence of TT split flags can be reduced, and coding of a TT split flag can be reduced.

Second Example of Determination

Details of each processing in a case of restricting a variable obtained by combining together a split depth variable btDepth of binary tree split and a split depth variable ttDepth of ternary tree split will now be described.

In PT split flag determination of the second example of determination, determination the same as the determination of the first example of determination described above is performed.

In BT split possibility determination of the second example of determination, condition 3 is different from condition 3 of the first example of determination described above. In the second example of determination, BT split possibility determination is performed, with reference to condition 3 described below.

Condition 3 of BT Split Possibility Determination: (btDepth+ttDepth) indicating a level of hierarchy of a split target block is less than maxPTDepth ((btDepth+ttDepth)<maxPTDepth).

In TT split possibility determination of the second example of determination, condition 3 is different from condition 3 of the first example of determination described above. In the second example of determination, TT split possibility determination is performed, with reference to condition 3 described below.

Condition 3 of TT Split Possibility Determination: (bt-Depth+ttDepth) indicating a level of hierarchy of a split target block is less than maxPTDepth ((btDepth+ttDepth)<maxPTDepth).

In split mode selection flag determination of the second example of determination, condition 3 is different from condition 3 of the first example of determination described above. In the second example of determination, split mode selection flag determination is performed, with reference to condition 3 described below.

Condition 3 of Split Mode Selection Flag Determination: (btDepth+ttDepth) indicating a level of hierarchy of a split target block is less than maxPTDepth (btDepth+ttDepth)<maxPTDepth.

Note that, as described above in the first example of a derivation method of cptDepth and the second example of a derivation method of cptDepth, btDepth+ttDepth may be expressed by one temporary variable cptDepth.

Third Example of Determination

Details of each processing in a case of individually restricting a split depth variable btDepth of binary tree split and a split depth variable ttDepth of ternary tree split, and of restricting a variable obtained by combining together the split depth variable btDepth of binary tree split and the split depth variable ttDepth of ternary tree split will now be described with reference to FIGS. 36A to 37B.

Note that, also in the third example of determination, as described above in the first example of a derivation method of cptDepth and the second example of a derivation method of cptDepth, btDepth+ttDepth may be expressed by one temporary variable cptDepth.

As illustrated in FIG. 36A, PT split flag determination of the third example of determination can be derived from the sum (OR) of BT split possibility determination and TT split possibility determination, similarly to the first example of determination described above. BT split possibility determination and TT split possibility determination are as illustrated in FIGS. 36B and 36C, respectively. PT split flag determination, which is the sum of the BT split possibility determination and the TT split possibility determination, can be described as in FIG. 36D. Specifically, in a case that (btDepth indicating a level of hierarchy of a split target block is less than maxBTDepth, or ttDepth is maxTTDepth), and that (btDepth+ttDepth)<maxPTDepth, it is determined that a PT split flag is present (TRUE), and a PT split flag as a flag indicating whether or not BT split or TT split is to be performed is decoded. Note that, as illustrated in FIG. 36D, restriction concerning "width" and "height" of a target block may further be added, in addition to the restriction concerning a level of hierarchy.

As illustrated in FIG. 36B, in BT split possibility determination of the third example of determination, condition 3 is different from condition 3 of the first example of determination described above. In the third example of determination, BT split possibility determination is performed, with reference to condition 3 described below.

Condition 3 of BT Split Possibility Determination: btDepth indicating a level of hierarchy of a split target block is less than maxBTDepth, and (btDepth+ttDepth) indicating a level of hierarchy of a split target block is less than maxPTDepth (btDepth<maxBTDepth && (btDepth+ttDepth)<maxPTDepth).

As illustrated in FIG. 36C, in TT split possibility determination of the third example of determination, condition 3 is different from condition 3 of the first example of determination described above. In the third example of determination, TT split possibility determination is performed, with reference to condition 3 described below.

Condition 3 of TT Split Possibility Determination: ttDepth indicating a level of hierarchy of a split target block is less than maxTTDepth, and (btDepth+ttDepth) indicating a level of hierarchy of a split target block is less than maxPTDepth (ttDepth<maxTTDepth && (btDepth+ttDepth)<maxPTDepth).

As illustrated in FIG. 37A, split mode selection flag determination of the third example of determination can be derived from the product (AND) of BT split possibility determination and TT split possibility determination, similarly to the first example of determination described above. BT split possibility determination and TT split possibility determination are as illustrated in FIGS. 36B and 36C, respectively. Split mode selection flag determination, which is the product of the BT split possibility determination and the TT split possibility determination, can be described as in FIG. 37D. Specifically, in a case that btDepth indicating a level of hierarchy of a split target block is less than maxBTDepth, and ttDepth is maxTTDepth, and (btDepth+ttDepth)<maxPTDepth, it is determined that a split mode selection flag is present (TRUE), and a split mode selection flag as a flag indicating either BT split or TT split is decoded. Note that, as illustrated in FIG. 37B, restriction concerning "width" and "height" of a target block may further be added, in addition to the restriction concerning a level of hierarchy.

Further description is given. In split mode selection flag determination of the third example of determination, condition 4 is different, as compared to conditions of the first example of determination described above. In the third example of determination, split mode selection flag determination is performed, with reference to condition 4 described below.

Condition 4 of Split Mode Selection Flag Determination: (btDepth+ttDepth) indicating a level of hierarchy of a split target block is less than maxPTDepth ((btDepth+ttDepth)<maxPTDepth).

In a case that all of conditions 1 to 3 and condition 4 described above of the first example of determination are satisfied, the CN information decoder 10 determines TRUE. In a case that not all of conditions 1 to 4 described above are satisfied, the CN information decoder 10 determines FALSE.

For example, both of binary tree split and ternary tree split can be restricted to three times or less (split is possible in a case that btDepth<3 and ttDepth<3, respectively), and a total number of times obtained by adding the number of times of binary tree splits and the number of times of ternary tree splits can also be restricted to three times or less ((btDepth+ttDepth)<3 suffices). The following configuration is also possible. That is, a total number of times obtained by adding the number of times of binary tree splits and the number of times of ternary tree splits can be restricted to three times or less (split is possible in a case that btDepth+ttDepth<3), and ternary tree split can be restricted to twice or less (BT split and TT split can be used in a case that btDepth<3 and ttDepth<2, respectively).

In the third example of determination, a split depth variable btDepth of binary tree split and a split depth variable ttDepth of ternary tree split are individually restricted, and a variable obtained by combining together the split depth variable btDepth of binary tree split and the split depth variable ttDepth of ternary tree split is restricted. Consequently, redundancy control can be performed, and unnecessary increase of binary tree splits can be reduced particularly in a case that ternary tree split is performed.

Forth Example of Determination

Details of split mode selection flag determination processing of restricting binary tree split after ternary tree split will now be described. FIG. 38A is a diagram illustrating an example of a pseudocode representing split mode selection flag determination processing of restricting binary tree split after ternary tree split. As illustrated in FIG. 38A, the CN information decoder 10 determines that BT split is not possible in a case that TT split has already been performed. Specifically, in a case that a split depth ttDepth of TT split is greater than 0 (other than 0), the CN information decoder 10 determines that BT split is not possible. In a case that BT split and TT split are possible in split mode selection flag determination, the CN information decoder 10 determines that a split mode selection flag is to be decoded (TRUE).

Fifth Example of Determination

Details of split mode selection flag determination processing of restricting ternary tree split after binary tree split will now be described. FIG. 38B is a diagram illustrating an example of a pseudocode representing split mode selection flag determination processing of restricting ternary tree split after binary tree split. As illustrated in FIG. 38B, the CN information decoder 10 determines that TT split is not possible in a case that BT split has already been performed. Specifically, in a case that a split depth btDepth of BT split is greater than 0 (other than 0), the CN information decoder 10 determines that TT split is not possible. In a case that BT split and TT split are possible in split mode selection flag determination, the CN information decoder 10 determines that a split mode selection flag is to be decoded (TRUE).

The fourth example of determination and the fifth example of determination described above require only simple control, and yet produce an obvious effect of reduction in complexity of coding/decoding of a video.

BB/TT Split Processing

BT/TT split processing of the CN information decoder 10 will now be described with reference to FIGS. 39A and 39B. FIGS. 39A and 39B are diagrams illustrating examples of pseudocodes representing BT/TT split processing. As illustrated in FIGS. 39A and 39B, the CN information decoder 10 splits a split target block, based on a split direction flag and a split mode selection flag. The CN information decoder 10 also configures information (parent . . . ) indicating which type of split is performed on a higher block to generate a split target block. partIdx is an index of a block, and is configured for each loop. Instead of parent . . . , a caller derives information in advance regarding each block as to whether or not restriction is present and as to whether or not restriction can be applied, and configures the information.

Third Embodiment

Split Pattern with Low Frequency of Use

The image decoding apparatus 31 according to the present embodiment includes a configuration similar to the configuration of the second embodiment, unless otherwise specifically limited. Thus, the image decoding apparatus 31 is configured to be capable of TT split, similarly to the image decoding apparatus 31 of the second embodiment. Therefore, there are more split patterns of a block, which is achieved by combinations of splits. Thus, more time is required to determine a split pattern of a block in the image coding apparatus 11. The image decoding apparatus 31 according to the present embodiment restricts (prohibits) a split pattern with low frequency of use. For example, regarding a split pattern that is not the same as but is similar to a specific split pattern, in a case that it is considered that there is not a significant difference between coding efficiency of the similar split pattern and coding efficiency of the specific split pattern, the similar split pattern is prohibited.

Figure 40:
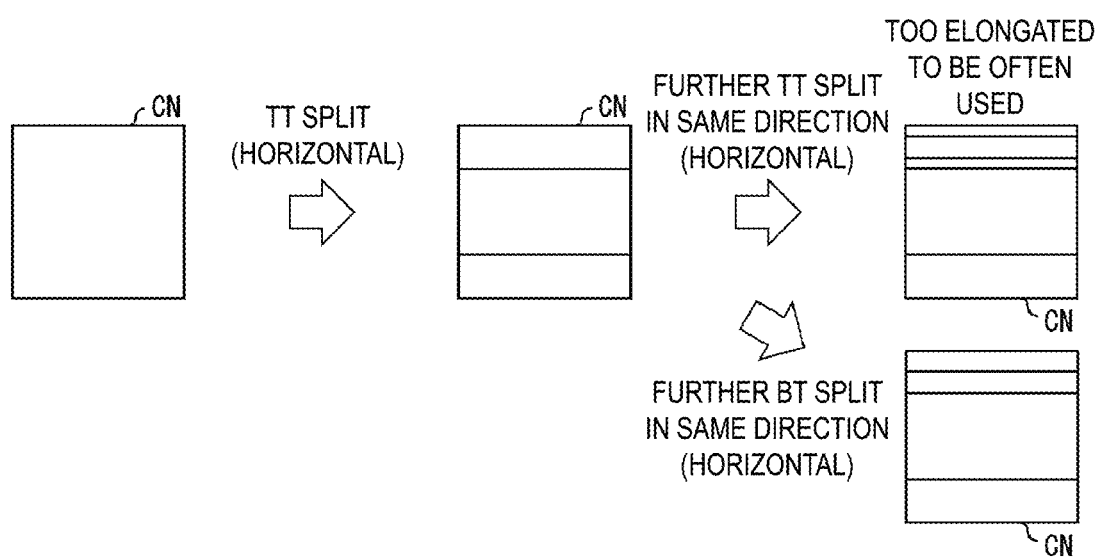
FIG. 40 is a diagram illustrating split patterns of a block.

An example of a split pattern with low frequency of use will be described with reference to FIG. 40. FIG. 40 is a diagram illustrating an example of a split pattern with low frequency of use. In FIG. 40, split pattern 1 and split pattern 2 are illustrated. Split pattern 1 is obtained by horizontally splitting a block (CN) by TT split, and then further horizontally splitting a block obtained by the TT split by TT split. Split pattern 2 is obtained by horizontally splitting a block by TT split, and then further horizontally splitting a block obtained by the TT split by BT split. A block generated by two times of TT split in split pattern 1 has too elongated a shape to have high frequency of use. Therefore, the image decoding apparatus 31 restricts (prohibits) split pattern 1.

According to the configuration described above, the image coding apparatus 11 no longer needs to evaluate a split pattern with low frequency of use. Because a split pattern with low frequency of use is prohibited, coded data, such as a flag related to the split, is no longer required. Therefore, coding efficiency of the image coding apparatus 11 is enhanced.

Restricted Split Patterns

Here, examples of split patterns of a CN restricted by the CN information decoder 10 according to the present embodiment will be described with reference to FIGS. 41A to 41C. FIGS. 41A to 41C illustrate examples of split patterns restricted by the CN information decoder 10. The solid line in FIGS. 41A to 41C denotes a boundary between coding nodes (blocks) generated by splitting a higher coding node or a coding tree unit (higher block). The term "DIVISION ALLOWED" means that split indicated by the dotted line is possible in a split target block. The term "DIVISION RESTRICTED" means that split indicated by the dotted line is restricted (prohibited) in a split target block.

Restricted Split Pattern: B-d

For example, the CN information decoder 10 restricts (prohibits) split of a split target block, which is generated by splitting a higher block by TT split, in a direction the same as a split direction of the higher block.

In other words, in a case that a target block is one of three blocks obtained by performing ternary tree split on a higher block, the CN information decoder 10 restricts split of the target block in a direction the same as a direction of the ternary tree split performed on the higher block.

Restricted Split Pattern: B-d1

In the example illustrated in FIG. 41A, the CN information decoder 10 restricts (prohibits) split of the middle block, which is out of blocks generated by splitting a higher block by TT split, in a direction the same as a split direction of the higher block.

In other words, in a case that a target block is the middle block out of three nodes obtained by performing ternary tree split on a higher block, the CN information decoder 10 restricts split of the target block in a direction the same as a direction of the ternary tree split performed on the higher block.

Restricted Split Pattern: B-d1'

In the example illustrated in FIG. 41B, the CN information decoder 10 restricts (prohibits) split of the middle block, which is out of blocks generated by splitting a higher block by TT split, by split other than TT split performed in a direction different from a split direction of the higher block.

In other words, in a case that a target block is the middle block out of three blocks obtained by performing ternary tree split on a higher block, the CN information decoder 10 restricts split of the target block by split other than ternary tree split with a direction different from a direction of the ternary tree split performed on the higher block.

Restricted Split Pattern: B-d2

In the example illustrated in FIG. 41C, the CN information decoder 10 restricts (prohibits) split of a block, which is out of blocks generated by splitting a higher block by TT split and is other than the middle block, in a direction the same as a direction of the higher block.

In other words, in a case that a target block is a block that is out of three blocks obtained by performing ternary tree split on a higher block and is other than the middle block, the CN information decoder 10 restricts split of the target block in a direction the same as a direction of the ternary tree split performed on the higher block.

Restricted Split Pattern: B-d3

As another example not illustrated, the CN information decoder 10 restricts (prohibits) split of a block, which is generated by splitting a higher block by TT split, by TT split in a direction the same as a split direction of the higher block.

In a case that the target node is one of three nodes obtained by performing ternary tree split on the immediately higher node, the split unit restricts split of the target node by ternary tree split in a direction the same as a direction of the ternary tree split performed on the immediately higher node.

Details of BT/TT Information Decoding Processing

Additional conditions of split direction flag determination for restricted split patterns according to the present embodiment will now be described with reference to FIG. 42 to FIG. 46B. FIG. 42 to FIG. 46B are diagrams illustrating examples of pseudocodes representing additional conditions of split direction flag determination in restricted split patterns.

Split Direction Flag Determination

Split Direction Flag Determination (Additional Condition of B-d)

An additional condition of split direction flag determination for the restricted split pattern (B-d: the CN information decoder 10 restricts (prohibits) split of a split target block, which is generated by splitting a higher block by TT split, in a direction the same as a split direction of the higher block) will be described with reference to FIG. 42.

As illustrated in FIG. 42, in a case that a higher block is split by TT split (parentSplitMode==MODE_TT), the CN information decoder 10 prohibits split of a split target block in a direction the same as a split direction of the higher block. Therefore, a split direction of the split target block is configured to be a direction different from the split direction of the higher block, and it is determined that decoding of a split direction flag is unnecessary (FALSE).

The split direction (parentSplitDir) of the higher block is 0 or 1. Therefore, as illustrated in FIG. 42, parentSplitDir is subtracted from 1. In this manner, a direction different from the direction of the higher block can be derived.

Note that, in the present restricted split pattern, there are no particular additional conditions in "BT/TT split possibility determination" described in the second embodiment. Additional conditions are not particularly configured in the restricted split patterns described below, unless otherwise provided with description of a particular additional condition.

Split Direction Flag Determination (Additional Condition of B-d1)

An additional condition of split direction flag determination for the restricted split pattern (B-d1: the CN information decoder 10 restricts (prohibits) split of the middle block, which is out of blocks generated by splitting a higher block by TT split, in a direction the same as a split direction of the higher block) will be now described with reference to FIG. 43. In a case that a higher block is split by TT split, and that a split target block is the middle block out of blocks generated by the TT split (parentSplitMode==MODE_TT && partIdx==1), a split direction of the split target block is configured to be a direction different from a split direction of the higher block, and it is determined that decoding of a split direction flag is unnecessary (FALSE).

Split Direction Flag Determination (Additional Condition of B-d2)

An additional condition of split direction flag determination for the restricted split pattern (B-d2: the CN information decoder 10 restricts (prohibits) split of a block, which is out of blocks generated by splitting a higher block by TT split and is other than the middle block, in a direction the same as a direction of the higher block) will be now described with reference to FIG. 44. In a case that a higher block is split by TT split, and that a split target block is a block out of blocks generated by the TT split and is other than the middle block (parentSplitMode==MODE_TT && partIdx!=1), a split direction of the split target block is configured to be a direction different from a split direction of the higher block, and it is determined that decoding of a split direction flag is unnecessary (FALSE).

Split Direction Flag Determination (Additional Condition of B-d1')

An additional condition of split direction flag determination for the restricted split pattern (B-d1': the CN information decoder 10 restricts (prohibits) split of the middle block, which is out of blocks generated by splitting a higher block by TT split, by split other than TT split performed in a direction different from a split direction of the higher block) will be now described with reference to FIGS. 45A to 45C. As illustrated in FIG. 45A, in a case that a block is split by TT split, and that a split target block is the middle block out of blocks generated by the TT split (parentSplitMode==MODE_TT && partIdx==1), a split direction of the split target block is configured to be a direction different from a split direction of the higher block, and it is determined that decoding of a split direction flag is unnecessary (FALSE).

Note that, in the present restricted split pattern, there is an additional condition in "BT/TT split possibility determination" described in the second embodiment. The additional condition will be described with reference to FIG. 45B. FIG. 45B is a diagram illustrating an example of a pseudocode representing BT split possibility determination processing in a case that there is a restricted split pattern described above.

As illustrated in FIG. 45B, in a case that a split mode of a higher block is TT split, and that a target block is the middle block out of blocks generated by the TT split (parentSplitMode==MODE_TT && partIdx==1), the CN information decoder 10 determines that BT split is impossible (FALSE). FIG. 45C is a diagram illustrating possible splits in the present restriction. As illustrated in FIG. 45C, the CN information decoder 10 restricts BT split of the middle block generated by TT split. Regarding a split direction of the block, a direction the same as a split direction of a higher block is restricted.

Split Direction Flag Determination (Additional Condition of B-d3)

A flow of processing of the CN information decoder 10 for the restricted split pattern (B-d3: the CN information decoder 10 restricts (prohibits) split of a block, which is generated by splitting a higher block by TT split, by TT split in a direction the same as a split direction of the higher block) will now be described.

Figure 50:
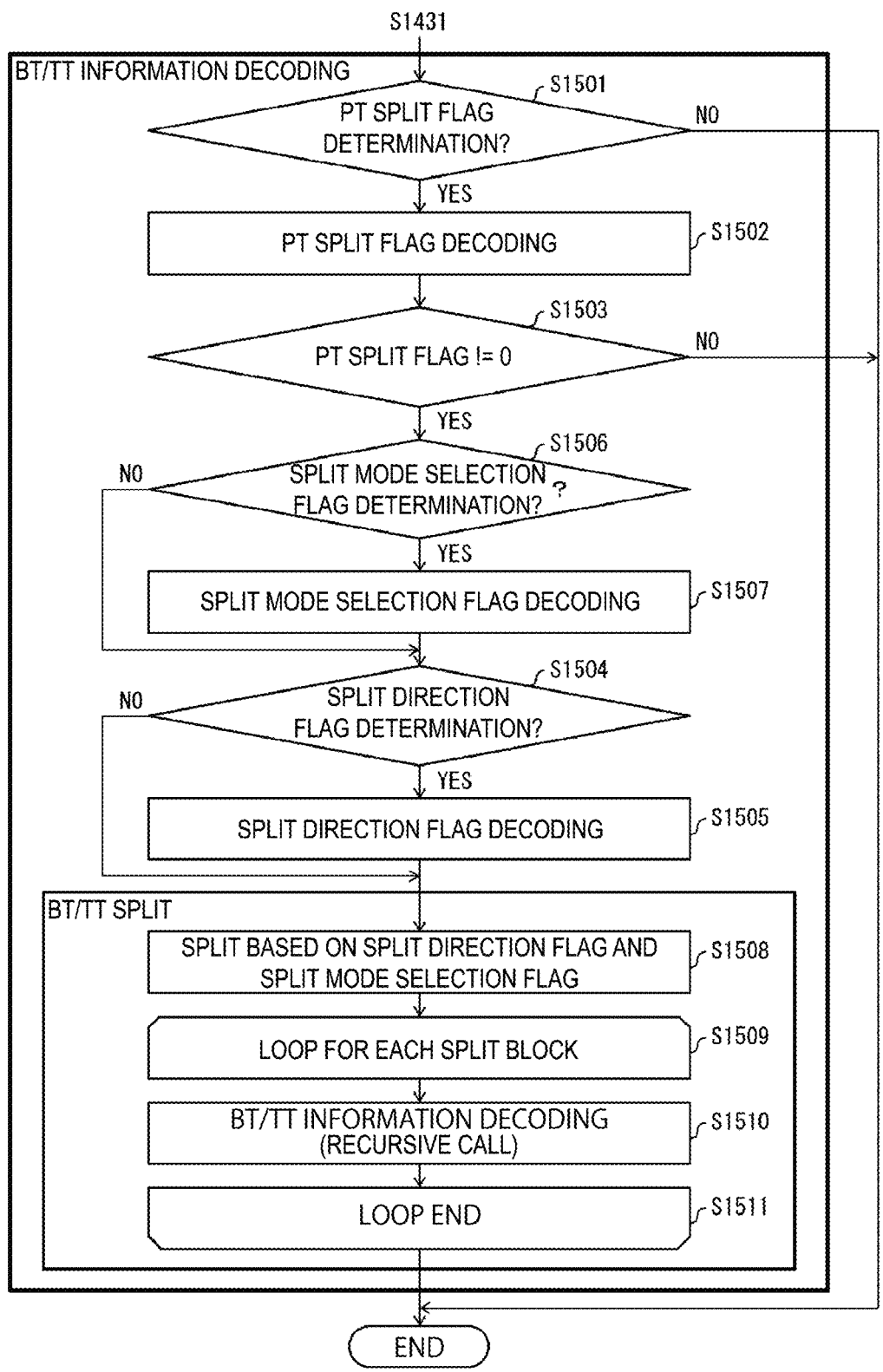
FIG. 50 is a flowchart illustrating decoding processing according to the present embodiment.

FIG. 50 is a diagram illustrating an overview of an example of a flow of processing of the CN information decoder 10 performing the present restriction. As illustrated in FIG. 50, the flow of the present processing is different from the example of the flow of processing of the CN information decoder 10 described in the second embodiment (see FIG. 16) in the following respect. That is, in the present processing, determination of a split mode (split mode selection flag determination S1506, split mode selection flag determination S1507) is performed prior to determination of a split direction (split direction flag determination S1504, split direction flag decoding S1505).

An additional condition of split direction flag determination will now be described with reference to FIGS. 46A and 46B. As illustrated in FIG. 46A, in a case that a higher block is split by TT split, and that a split target block is split by TT split (parentSplitMode==MODE_TT && split_sel_flag[x0][y0]==MODE_TT), a split direction of the split target block is configured to be a direction different from a split direction of the higher block, and it is determined that decoding of a split direction flag is unnecessary (FALSE).

FIG. 46B is a diagram illustrating possible splits in the present restriction. As illustrated in FIG. 46B, only in a case that TT split is selected as split of a target block, the CN information decoder 10 restricts a split direction solely to a direction different from a split direction of a higher block.
Other Restricted Split Patterns Another example of a split pattern of a CN restricted by the CN information decoder 10 according to the present embodiment will now be described with reference to FIGS. 47A to 47L. FIGS. 47A to 47L illustrate examples of split patterns restricted by the CN information decoder 10.
Restricted Split Pattern: B-e In the examples illustrated in FIGS. 47A to 47D and 47G to 47L, the CN information decoder 10 restricts (prohibits) split of a rectangular split target block as illustrated in each of FIGS. 47A to 47D, which is out of blocks generated by splitting a higher block by TT split, in a direction the same as a split direction of the higher block as indicated by the dotted line(s) of the drawings.

In other words, in a case that the shape of a split target block is a square as illustrated in FIGS. 47G to 47L, the CN information decoder 10 does not restrict a method of splitting the target block.

Note that, as illustrated in FIGS. 47E and 47F, even in a case that a split target block is a square, the CN information decoder 10 may restrict (prohibit) split of a redundant split pattern described in the second embodiment.
Split Direction Flag Determination (Additional Condition of B-e)

An additional condition of split direction flag determination for the restricted split pattern (B-e) will now be described with reference to FIG. 48. FIG. 48 is a diagram illustrating an example of a pseudocode representing an additional condition of split direction flag determination for the restricted split pattern (B-e).

Figure 49A:
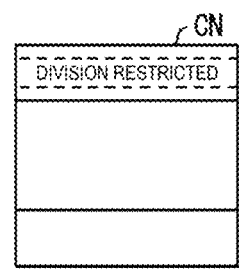
FIGS. 49A and 49B are diagrams illustrating examples of split patterns of the image decoding apparatus according to the present embodiment.
Figure 49B:
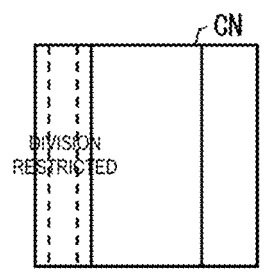

As illustrated in FIG. 48, in a case that a higher block is split by TT split, and that the width and the height of a split target block are different from each other (parentSplitMode==MODE_TT && width!=height), the CN information decoder 10 configures a split direction of the split target block to be a direction different from a split direction of the higher block (split_dir_flag[x0][y0]=1−parentSplitDir), and determines that decoding of a split direction flag is unnecessary (FALSE).
Other Restricted Split Patterns: Aspect Ratio TT Split Restriction Yet other examples of split patterns of a CN restricted by the CN information decoder 10 according to the present embodiment will now be described with reference to FIGS. 49A and 49B. FIGS. 49A and 49B illustrate examples of split patterns restricted by the CN information decoder 10.

In the examples illustrated in FIGS. 49A and 49B, in a case that a target block has a rectangular shape with an aspect ratio of a prescribed value or greater, the CN information decoder 10 restricts split of the target block by such ternary tree split that generates boundaries along a longitudinal direction of the target block.

An aspect ratio of a block herein refers to a maximum value of a ratio between the width and the height, in a case that the width and the height of the block are respectively represented by "width" and "height." Specifically, the expression of max(width/height, height/width) is employed. Aspect ratio TT split restriction prohibits a ratio between "width" and "height" from being a prescribed value or greater by TT split, e.g., 1:8 (4×32, 8×64) and 8:1 (32×4, 64×8). In other words, in a case that a target block has a shape horizontally long to a certain extent or more, horizontal split is prohibited. In a case that a target block has a shape vertically long to a certain extent or more, vertical split is prohibited.

For example, FIG. 49A illustrates an example in which the CN information decoder 10 prohibits horizontal split because a target block has a horizontally long shape. FIG. 49B illustrates an example in which the CN information decoder 10 prohibits vertical split because a target block has a vertically long shape.
Split Mode Selection Flag Determination (Additional Condition of Aspect Ratio TT Split Restriction)

An additional condition of split mode selection flag determination (aspect ratio TT split restriction) will now be described with reference to FIG. 51. FIG. 51 is a diagram illustrating an example of a pseudocode representing an additional condition of split direction flag determination in the restricted split pattern. As illustrated in FIG. 51, in a case that a value of the width of a split target block is greater than a value that is M times as large as a value of the height of the split target block, and that a split direction of the split target block is the horizontal direction (width>M*height && split_dir_flag[x0][y0]==0), split of the split target block is configured to be BT split (split_sel_flag[x0][y0]=MODE_BT), and it is determined that decoding of a split mode selection flag is unnecessary (FALSE).

In a case that a value of the height of a split target block is greater than a value that is M times as large as a value of the width of the split target block, and that a split direction of the split target block is the vertical direction (height>M*width && split_dir_flag[x0][y0]==1), split of the split target block is configured to be BT split (split_sel_flag[x0][y0]=MODE_BT), and it is determined that decoding of a split mode selection flag is unnecessary (FALSE).

Note that there is a case that TT split is restricted. However, here, since a result of PT split flag determination is not affected, a value of TTAVailable is not configured. A value of TTAvailable is not changed either. This subroutine is called only in a case that both BTAVailable/TTAVailable are TRUE. Even in a case that falls under the condition described above and a short-side direction is restricted only to BT split, TT split remains possible in a long-side direction. Therefore, a value of TTAvailable is not affected.

Split Direction Flag Determination (Additional Condition of Aspect Ratio TT Split Restriction)

A flow of processing of the CN information decoder 10 for the present restricted split pattern (aspect ratio TT split restriction) may be the same as the flow of the restricted split pattern (B-d3) illustrated in FIG. 50. The flow of processing illustrated in FIG. 50 is described above, and thus description of the flow of processing illustrated in FIG. 50 is herein omitted. An additional condition of split direction flag determination (aspect ratio TT split restriction) in the flow of processing illustrated in FIG. 50 will be described with reference to FIG. 52. FIG. 52 is a diagram illustrating an example of a pseudocode representing an additional condition of split direction flag determination in the restricted split pattern. As illustrated in FIG. 52, in a case that a value of the width of a split target block is greater than a value that is M times as large as a value of the height of the split target block, and that split of the split target block is TT split (width>M*height && split_sel_flag[x0][y0]==MODE_TT), a split direction of the split target block is configured to be the vertical direction (split_dir_flag[x0][y0]=1), and it is determined that decoding of a split direction flag is unnecessary (FALSE).

In a case that a value of the height of a split target block is greater than a value that is M times as large as a value of the width of the split target block, and that split of the split target block is TT split (height>M*width && split_sel_flag[x0][y0]==MODE_TT), a split direction of the split target block is configured to be the horizontal direction (split_dir_flag[x0][y0]=0), and it is determined that decoding of a split direction flag is unnecessary (FALSE).

MT Information Decoding Processing

Each of operation examples of CN information decoding performed by the CN information decoder 10 will be described with reference to FIG. 55 to FIG. 66.

First Example of MT Information Decoding Processing

Figure 55:
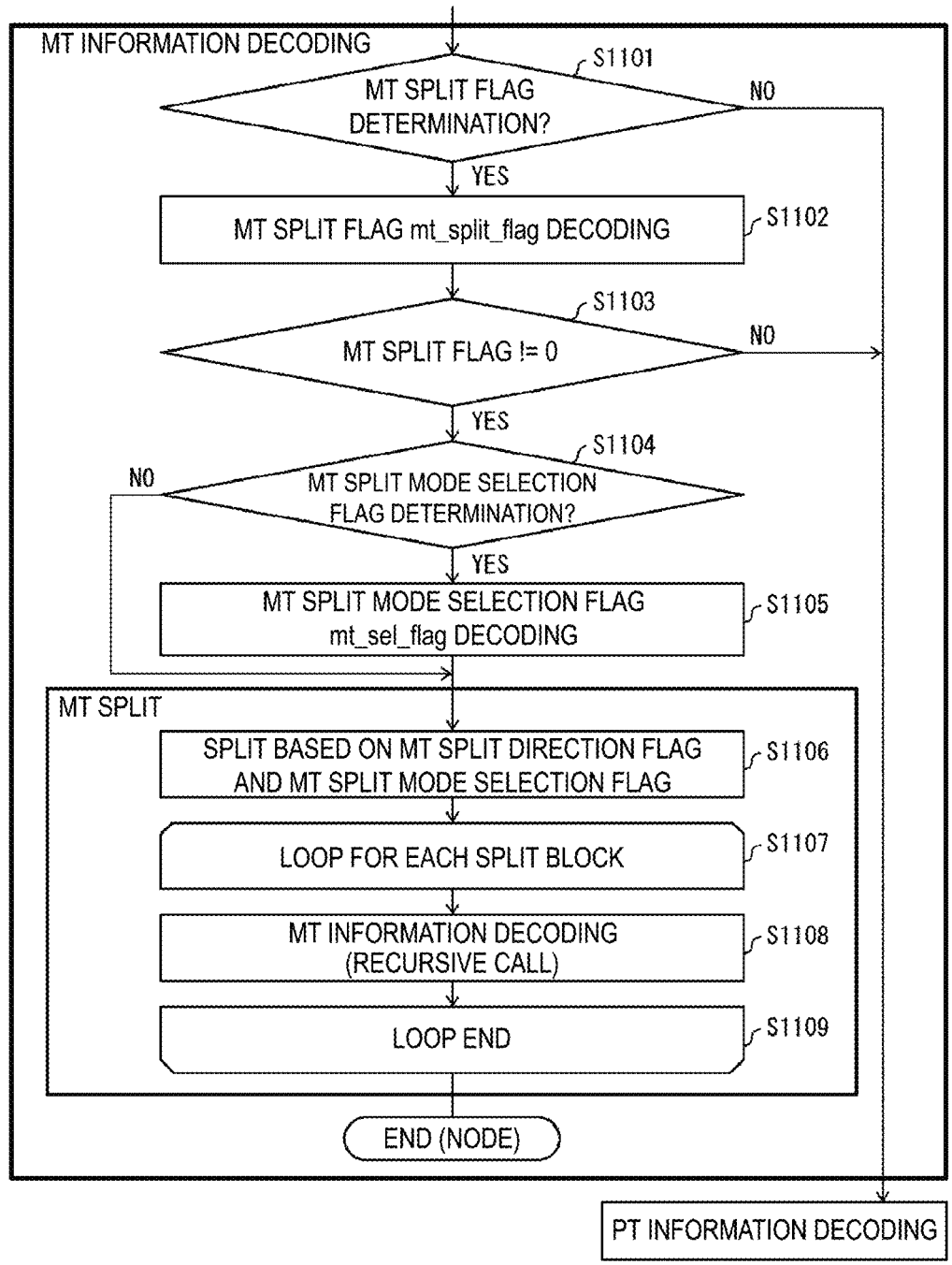
FIG. 55 is a flowchart illustrating decoding processing according to the present embodiment.

FIG. 55 is a flowchart illustrating a first example of MT information decoding processing of the CN information decoder 10 according to one embodiment of the present invention. FIG. 55 is a flowchart illustrating MT decoding processing in a case that MT split includes MNT split and QT split.

S1101

First, in S1101, the CN information decoder 10 determines whether or not an MT split flag is to be decoded (MT split flag determination). In a case that the CN information decoder 10 determines that an MT split flag is to be decoded (MT split flag determination is Y/TRUE), the processing proceeds to Step S1102. In a case that the CN information decoder 10 determines that an MT split flag is not to be decoded (MT split flag determination is N/FALSE), the MT information decoding processing ends.

S1102

In S1102, the CN information decoder 10 performs decoding of an MT split flag mt_split_flag. Here, mt_split_flag=0 indicates that a target block is not to be split, and mt_split_flag=1 indicates that a target block is to be split.

S1103

Subsequently, the CN information decoder 10 determines whether the following determination expression concerning the MT split flag mt_split_flag is true or false.

MT split flag!=0 (Expression 1101) In a case that (Expression 1101) is true, the processing proceeds to Step S1104. In a case that (Expression 1101) is false, the MT information decoding processing ends.

S1104

In S1104, the CN information decoder 10 determines whether or not an MT split mode selection flag is to be decoded (MT split mode selection flag determination). In a case that the CN information decoder 10 determines that an MT split mode selection flag is to be decoded (MT split mode selection flag determination is YES/TRUE), the processing proceeds to Step S1105. In a case that the CN information decoder 10 determines that an MT split mode selection flag is not to be decoded (MT split split mode selection flag determination is NO/FALSE), mt_sel_flag=0 is set, and the processing proceeds to Step S1106.

S1105

In S1105, the CN information decoder 10 decodes the MT split mode selection flag mt_sel_flag. Here, mt_sel_flag=0 indicates that a target block is to be split by QT split, and mt_sel_flag=1 indicates that a target block is to be split by MNT split.

S1106

In S1106, the CN information decoder 10 decodes the split target block by a split mode indicated by the MT split mode selection flag mt_sel_flag.

More specifically, in a case that the MT split mode selection flag mt_sel_flag indicates MNT split, as illustrated in FIG. 53A, the CN information decoder 10 splits the target block (target node) in 1:2:1 in the horizontal direction and 1:2:1 in the vertical direction. Consequently, the CN information decoder 10 splits the target block (target node) into nine nodes (blocks). Specifically, the CN information decoder 10 splits the target node in 1:2:1 in a first direction, and in 1:2:1 in a second direction perpendicular to (orthogonal to) the first direction. Consequently, the CN information decoder 10 splits the target node into nine nodes.

In contrast, in a case that the MT split mode selection flag mt_sel_flag indicates QT split, as illustrated in FIG. 7A, the CN information decoder 10 splits the target block by quad tree split.

Note that a method of split indicated by MNT split may be implemented by consecutively applying two times of TT split, whose split directions are orthogonal to each other, to the target node. In the example described above, however, in a case that mt_sel_flag indicates MNT split, the CN information decoder 10 splits the target node into four or more (here, nine) through single split processing. Therefore, increase in split depth (number of times of splits) can be prevented, and at the same time, complex split can be implemented.

S1107 to S1109

Subsequently, loop processing of repeatedly performing MT information decoding processing on blocks generated by the split is performed (S1107, S1108, S1109). The processing ends after the loop processing ends.

Details of MT split flag determination and MT split mode selection flag determination will be described with reference to FIGS. 56A and 56B. FIG. 56A is a diagram illustrating an example of a pseudocode representing MT split flag determination processing, and FIG. 56B is a diagram illustrating an example of a pseudocode representing MT split mode selection flag determination processing.

MT Split Flag Determination

The CN information decoder 10 performs MT split flag determination, with reference to condition 1 to condition 3 described below.

Condition 1: The height "height" of a split target block is equal to or greater than minPTSize×2, or the width "width" of a split target block is equal to or greater than minPT- Size×2 (height>=minPTSize*2||width>=minPTSize*2). Here, minPTSize represents a minimum value of a block size at the time of PT split.

Condition 2: The width and the height of a split target block are equal to or less than maxMTSize indicating a maximum value of a block size (width<=maxMTSize && height<=maxMTSize). Here, maxMTSize represents a maximum value of a block size at the time of MT split.

Condition 3: qtDepth indicating a level of hierarchy of a split target block is less than maxQTDepth, or mntDepth indicating a level of hierarchy of a split target block is less than maxMNTDepth (qtDepth<maxQTDepth||mntDepth<maxMNTDepth). Here, maxQTSize represents a maximum value of a depth (level of hierarchy) at the time of QT split, and maxMNTSize represents a maximum value of a depth (level of hierarchy) at the time of MNT split.

In a case that all of conditions 1 to 3 described above are satisfied, the CN information decoder 10 determines that MT split is possible (TRUE). In a case that any of conditions 1 to 3 described above is not satisfied, the CN information decoder 10 determines that MT split is not possible (FALSE).

MT Split Mode Selection Flag Determination

The CN information decoder 10 performs MT split mode selection flag determination, with reference to condition 1 to condition 3 described below.

Condition 1: The height and the width of a split target block are equal to or greater than minPTSize×4 (height>=minPTSize*4 && width>=minPTSize*4).

Condition 2: The width and the height of a split target block are equal to or less than maxMTSize indicating a maximum value of a block size (width<=maxPTSize && height<=maxPTSize).

Condition 3: qtDepth indicating a level of hierarchy of a split target block is less than maxQTDepth, and mntDepth indicating a level of hierarchy of a split target block is less than maxMNTDepth (qtDepth<maxQTDepth && mntDepth<maxMNTDepth).

In a case that all of conditions 1 to 3 described above are satisfied, the CN information decoder 10 determines that decoding of an MT split mode selection flag is necessary (TRUE). In a case that any of conditions 1 to 3 described above is not satisfied, the CN information decoder 10 determines that decoding of an MT split mode selection flag is unnecessary (FALSE).

Second Example of MT Information Decoding Processing

Figure 57:
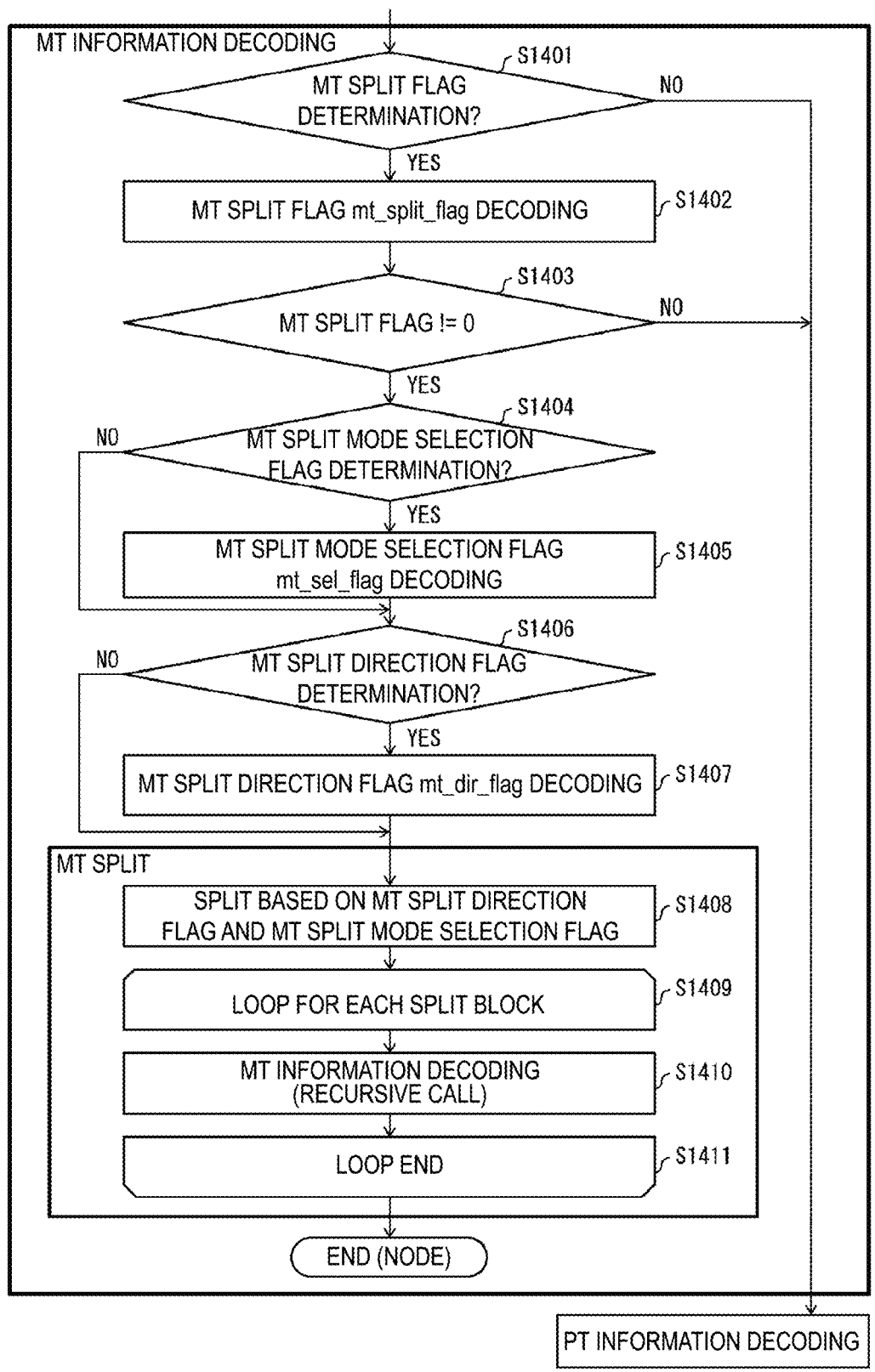
FIG. 57 is a flowchart illustrating decoding processing according to the present embodiment.

FIG. 57 is a flowchart illustrating a second example of MT information decoding processing of the CN information decoder 10 according to one embodiment of the present invention. The second example of MT information decoding processing is different from the first example of MT information decoding processing described above in the following respect. That is, in the present example, in a case that MT split is performed, decoding processing of a flag (MT split direction flag mt_dir_flag) for distinguishing whether a split direction is the horizontal direction or the vertical direction is performed.

S1401 to S1405 correspond to S1101 to S1105 of the first example of MT information decoding processing described above, and S1409 to S1411 correspond to S1107 to S1109 of the first example of MT information decoding processing described above.

In S1404, in a case that the CN information decoder 10 determines that an MT split mode selection flag is not to be decoded, or subsequently to S1405, the processing proceeds to S1406.

S1406

In S1406, the CN information decoder 10 determines whether or not an MT split direction flag is to be decoded. In a case that the CN information decoder 10 determines that an MT split direction flag is to be decoded, the processing proceeds to S1407. In a case that the CN information decoder 10 determines that an MT split direction flag is not to be decoded, the processing proceeds to S1408.

S1407

In S1407, the CN information decoder 10 performs decoding of an MT split direction flag mt_dir_flag. Here mt_dir_flag=0 indicates that a split direction of a target block (target node) is the horizontal direction, and mt_dir_flag=1 indicates that a split direction of a target block (target node) is the vertical direction.

Note that order of decoding processing of an MT split mode selection flag mt_sel_flag (S1404 and S1405) and decoding processing of an MT split direction flag mt_dir_flag (S1406 and S1407) may be in reverse order.

S1408

In S1408, the CN information decoder 10 decodes the split target block, based on the MT split direction flag mt_dir_flag and the MT split mode selection flag mt_sel_flag.

More specifically, in a case that the MT split direction flag is 0 (mt_dir_flag=0), and that the MT split mode selection flag is 1 (mt_sel_flag=1), as illustrated in FIG. 53B, the CN information decoder 10 splits the target block (target node) in 1:2:1 in the horizontal direction to split the target block (target node) into three nodes. Then, the CN information decoder 10 splits the middle node out of the three nodes in 1:2:1 in the vertical direction. Consequently, the CN information decoder 10 splits the target block (target node) into five nodes (blocks).

In a case that the MT split direction flag is 1 (mt_dir_flag=1), and that the MT split mode selection flag is 1 (mt_sel_flag=1), as illustrated in FIG. 53C, the CN information decoder 10 splits the target block (target node) in 1:2:1 in the vertical direction to split the target block (target node) into three nodes. Then, the CN information decoder 10 splits the middle node out of the three nodes in 1:2:1 in the horizontal direction. Consequently, the CN information decoder 10 splits the target block (target node) into five nodes (blocks).

Subsequently, with reference to FIGS. 58A to 58C, details of MT split flag determination, MT split mode selection flag determination, and MT split direction flag determination of the second example of MT information decoding processing will be described. FIG. 58A is a diagram illustrating an example of a pseudocode representing MT split flag determination processing, FIG. 58B is a diagram illustrating an example of a pseudocode representing MT split mode selection flag determination processing, and FIG. 58C is a diagram illustrating an example of a pseudocode representing MT split direction flag determination processing.

MT Split Flag Determination

MT split flag determination of the second example of MT information decoding processing is different from MT split flag determination of the first example of MT information decoding processing in condition 3. Condition 3 of MT split flag determination of the second example of MT information decoding processing is as follows.

Condition 3: qtDepth indicating a level of hierarchy of a split target block is less than maxQTDepth, or mftDepth indicating a level of hierarchy of a split target block is less than maxMFTDepth (qtDepth<maxQTDepth||mftDepth<maxMFTDepth). Here, maxMFTDepth represents a maximum value of a depth (level of hierarchy) at the time of MFT split.

MT Split Mode Selection Flag Determination

MT split mode selection flag determination of the second example of MT information decoding processing is different from MT split mode selection flag determination of the first example of MT information decoding processing in condition 3. Condition 3 of MT split mode selection flag determination of the second example of MT information decoding processing is as follows.

Condition 3: qtDepth indicating a level of hierarchy of a split target block is less than maxQTDepth, and mftDepth indicating a level of hierarchy of a split target block is less than maxMFTDepth (qtDepth<maxQTDepth && mftDepth<maxMFTDepth).

MT Split Direction Flag Determination

The CN information decoder 10 performs MT split direction flag determination, with reference to condition 1 to condition 4 described below.

Condition 1: An MT split mode selection flag indicates MFT split (mt_sel_flag==MODE_MFT).

Condition 2: The height and the width of a split target block are equal to or greater than minPTSize×4 (height>=minPTSize*4 && width>=minPTSize*4).

Condition 3: The width and the height of a split target block are equal to or less than maxMTSize indicating a maximum value of a block size (width<=maxPTSize && height<=maxPTSize).

Condition 4: qtDepth indicating a level of hierarchy of a split target block is less than maxQTDepth, and mftDepth indicating a level of hierarchy of a split target block is less than maxMFTDepth (qtDepth<maxQTDepth && mftDepth<maxMFTDepth).

In a case that all of conditions 1 to 4 described above are satisfied, the CN information decoder 10 determines that decoding of an MT split direction flag is necessary (TRUE). In a case that any of conditions 1 to 4 described above is not satisfied, the CN information decoder 10 determines that decoding of an MT split direction flag is unnecessary (FALSE).

In the second example of MT information decoding processing, in a case that the CN information decoder 10 performs node split on a node higher than a target node by at least any of BT split and TT split, the CN information decoder 10 does not perform split on the target node by a first split type group, which includes a split type for splitting into five nodes (MFT) and QT split. For example, in a case that PT split (BT split, TT split) is performed once, MT split (QT split, MFT split) is not performed after the PT split (BT split, TT split).

FIG. 59 is a table illustrating relationships between shapes and each of values of an MT split flag mt_split_flag, an MT split mode selection flag mt_sel_flag, and an MT split direction flag mt_dir_flag.

In a case that an MT split flag is 1 (mt_split_flag==1), and that an MT split mode selection flag is 0 (mt_sel_flag==0), the CN information decoder 10 performs split so that QT illustrated in FIG. 7A is implemented.

In a case that an MT split flag is 1 (mt_split_flag==1), that an MT split mode selection flag is 1 indicating MT split (mt_sel_flag==1), and that an MT split direction flag is 0 (mt_dir_flag==0), the CN information decoder 10 performs split so that MFT HOR illustrated in FIG. 53B (abbreviated as "MFTH" in FIG. 59) is implemented.

In a case that an MT split flag is 1 (mt_split_flag==1), that an MT split mode selection flag is 1 indicating MT split (mt_sel_flag==1), and that an MT split direction flag is 1 (mt_dir_flag==1), the CN information decoder 10 performs split so that MFT VER illustrated in FIG. 53C (abbreviated as "MFTV" in FIG. 59) is implemented.

Specifically, in a case that an MT split flag indicates that split is to be performed by a first split type group including a split type for splitting into five nodes (MFT) and QT split (mt_split_flag==1), and that an MT split mode selection flag indicates that split is to be performed by a split type for splitting into five nodes (MFT) (mt_sel_flag==1), the CN information decoder 10 employs a direction indicated by an MT split direction flag mt_dir_flag as a first direction to split a target node into five nodes.

Third Example of MT Information Decoding Processing

A flow of MT information decoding processing of the CN information decoder 10 of the third example of MT information decoding processing is the same as the flow of MT information decoding processing of the CN information decoder 10 of the second example of MT information decoding processing.

With reference to FIGS. 60A to 60C, details of MT split flag determination, MT split mode selection flag determination, and MT split direction flag determination of the third example of MT information decoding processing will be described. FIG. 60A is a diagram illustrating an example of a pseudocode representing MT split flag determination processing, FIG. 60B is a diagram illustrating an example of a pseudocode representing MT split mode selection flag determination processing, and FIG. 60C is a diagram illustrating an example of a pseudocode representing MT split direction flag determination processing.

MT Split Flag Determination

MT split flag determination of the third example of MT information decoding processing is different from MT split flag determination of the first example of MT information decoding processing in condition 3. Condition 3 of MT split flag determination of the third example of MT information decoding processing is as follows.

Condition 3: qtDepth indicating a level of hierarchy of a split target block is less than maxQTDepth, or dqtDepth indicating a level of hierarchy of a split target block is less than maxDQTDepth (qtDepth<maxQTDepth||dqtDepth<maxDQTDepth).

MT Split Mode Selection Flag Determination

MT split mode selection flag determination of the third example of MT information decoding processing is different from MT split mode selection flag determination of the first example of MT information decoding processing in condition 3. Condition 3 of MT split mode selection flag determination of the third example of MT information decoding processing is as follows.

Condition 3: qtDepth indicating a level of hierarchy of a split target block is less than maxQTDepth, and dqtDepth indicating a level of hierarchy of a split target block is less than maxDQTDepth (qtDepth<maxQTDepth && dqtDepth<maxDQTDepth). Here, maxDQTDepth represents a maximum value of a depth (level of hierarchy) at the time of DQT split.

MT Split Direction Flag Determination

MT split direction flag determination of the third example of MT information decoding processing is different from MT split direction flag determination of the second example of MT information decoding processing in conditions 1, 2, and 4. Conditions 1, 2, and 4 of MT split direction flag determination of the third example of MT information decoding processing are as follows.

Condition 1: An MT split mode selection flag indicates DQT split (mt_sel_flag==MODE_DQT).

Condition 2: The height of a split target block is equal to or greater than minPTSize×4, or the width of a split target block is equal to or greater than minPTSize×4 (height>=minPTSize*4||width>=minPTSize*4).

Condition 4: qtDepth indicating a level of hierarchy of a split target block is less than maxQTDepth, and dqtDepth indicating a level of hierarchy of a split target block is less than maxDQTDepth (qtDepth<maxQTDepth && dqtDepth<maxDQTDepth).

In the third example of MT information decoding processing, in a case that the CN information decoder 10 performs node split on a node higher than a target node by a split type for splitting into four nodes (DQT), the CN information decoder 10 does not perform split on the target node by a split type for splitting into four or more nodes including a rectangular node. For example, in a case that DQT split is performed even only once, MT split (QT split) is not performed after the DQT split.

FIG. 61 is a table illustrating relationships between shapes and each of values of an MT split flag mt_split_flag, an MT split mode selection flag mt_sel_flag, and an MT split direction flag mt_dir_flag.

In a case that an MT split flag is 1 (mt_split_flag==1), and that an MT split mode selection flag is 0 (mt_sel_flag==0), the CN information decoder 10 performs split so that QT illustrated in FIG. 7A is implemented.

In a case that an MT split flag is 1 (mt_split_flag==1), that an MT split mode selection flag is 1 indicating DQT split (mt_sel_flag==1), and that an MT split direction flag is 0 (mt_dir_flag==0), the CN information decoder 10 performs split so that DQT HOR illustrated in FIG. 53E (abbreviated as "DQTH" in FIG. 61) is implemented.

In a case that an MT split flag is 1 (mt_split_flag==1), that an MT split mode selection flag is 1 indicating DQT split (mt_sel_flag==1), and that an MT split direction flag is 1 (mt_dir_flag==1), the CN information decoder 10 performs split so that DQT VER illustrated in FIG. 53D (abbreviated as "DQTV" in FIG. 61) is implemented.

Specifically, in a case that an MT split flag indicates that split is to be performed by a first split type group including a split type for splitting into four nodes (DQT) and QT split (mt_split_flag==1), and that an MT split mode selection flag indicates that split is to be performed by a split type for splitting into four nodes (DQT), the CN information decoder 10 employs a direction indicated by an MT split direction flag as a first direction to split a target node into four nodes.

Fourth Example of MT Information Decoding Processing

A flow of MT information decoding processing of the CN information decoder 10 of the fourth example of MT information decoding processing is the same as the flow of MT information decoding processing of the CN information decoder 10 of the second example of MT information decoding processing.

With reference to FIGS. 62A to 62C, details of MT split flag determination, MT split mode selection flag determination, and MT split direction flag determination of the fourth example of MT information decoding processing will be described. FIG. 62A is a diagram illustrating an example of a pseudocode representing MT split flag determination processing, FIG. 62B is a diagram illustrating an example of a pseudocode representing MT split mode selection flag determination processing, and FIG. 62C is a diagram illustrating an example of a pseudocode representing MT split direction flag determination processing.

MT Split Flag Determination

MT split flag determination of the fourth example of MT information decoding processing is different from MT split flag determination of the first example of MT information decoding processing in condition 3. Condition 3 of MT split flag determination of the fourth example of MT information decoding processing is as follows.

Condition 3: qtDepth indicating a level of hierarchy of a split target block is less than maxQTDepth, or dftDepth indicating a level of hierarchy of a split target block is less than maxDFTDepth (qtDepth<maxQTDepth||dftDepth<maxDFTDepth). Here, maxDFTDepth represents a maximum value of a depth (level of hierarchy) at the time of DFT split.

MT Split Mode Selection Flag Determination

MT split mode selection flag determination of the fourth example of MT information decoding processing is different from MT split mode selection flag determination of the first example of MT information decoding processing in conditions 1 and 3. Conditions 1 and 3 of MT split mode selection flag determination of the fourth example of MT information decoding processing are as follows.

Condition 1: The height of a split target block is equal to or greater than minPTSize×8, or the width of a split target block is equal to or greater than minPTSize×8 (height>=minPTSize*8 && width>=minPTSize*8).

Condition 3: qtDepth indicating a level of hierarchy of a split target block is less than maxQTDepth, and dftDepth indicating a level of hierarchy of a split target block is less than maxDFTDepth (qtDepth<maxQTDepth && dftDepth<maxDFTDepth).

MT Split Direction Flag Determination

MT split direction flag determination of the fourth example of MT information decoding processing is different from MT split direction flag determination of the third example of MT information decoding processing in conditions 2 and 4. Conditions 2 and 4 of MT split direction flag determination of the fourth example of MT information decoding processing are as follows.

Condition 2: The height of a split target block is equal to or greater than minPTSize×8, or the width of a split target block is equal to or greater than minPTSize×8 (height>=minPTSize*8||width>=minPTSize*8).

Condition 4: qtDepth indicating a level of hierarchy of a split target block is less than maxQTDepth, and dftDepth indicating a level of hierarchy of a split target block is less than maxDFTDepth (qtDepth<maxQTDepth && dftDepth<maxDFTDepth).

In the fourth example of MT information decoding processing, in a case that the CN information decoder 10 performs node split on a node higher than a target node by a split type for splitting into five nodes (DFT), the CN information decoder 10 does not perform split on the target node by a split type for splitting into four or more nodes including a rectangular node. For example, in a case that PT split (DFT split) is performed once, MT split (QT split) is not performed after the PT split (DFT split).

FIG. 63 is a table illustrating relationships between shapes and each of values of an MT split flag mt_split_flag, an MT split mode selection flag mt_sel_flag, and an MT split direction flag mt_dir_flag.

In a case that an MT split flag is 1 (mt_split_flag==1), and that an MT split mode selection flag is 0 (mt_sel_flag==0), the CN information decoder 10 performs split so that QT illustrated in FIG. 7A is implemented.

In a case that an MT split flag is 1 (mt_split_flag==1), that an MT split mode selection flag is 1 indicating DQT split (mt_sel_flag==1), and that an MT split direction flag is 0 (mt_dir_flag==0), the CN information decoder 10 performs split so that DFT HOR illustrated in FIG. 53G (abbreviated as "DFTH" in FIG. 63) is implemented.

In a case that an MT split flag is 1 (mt_split_flag==1), that an MT split mode selection flag is 1 indicating DQT split (mt_sel_flag==1), and that an MT split direction flag is 1 (mt_dir_flag==1), the CN information decoder 10 performs split so that DFT VER illustrated in FIG. 53F (abbreviated as "DFTV" in FIG. 63) is implemented.

Specifically, in a case that an MT split flag indicates that split is to be performed by a first split type group including a split type for splitting into five nodes (DFT) and QT split (mt_split_flag==1), and that an MT split mode selection flag indicates that split is to be performed by a split type for splitting into five nodes (DFT) (mt_sel_flag==1), the CN information decoder 10 employs a direction indicated by an MT split direction flag as a first direction to split a target node into five nodes.

Fifth Example of MT Information Decoding Processing

Figure 64:
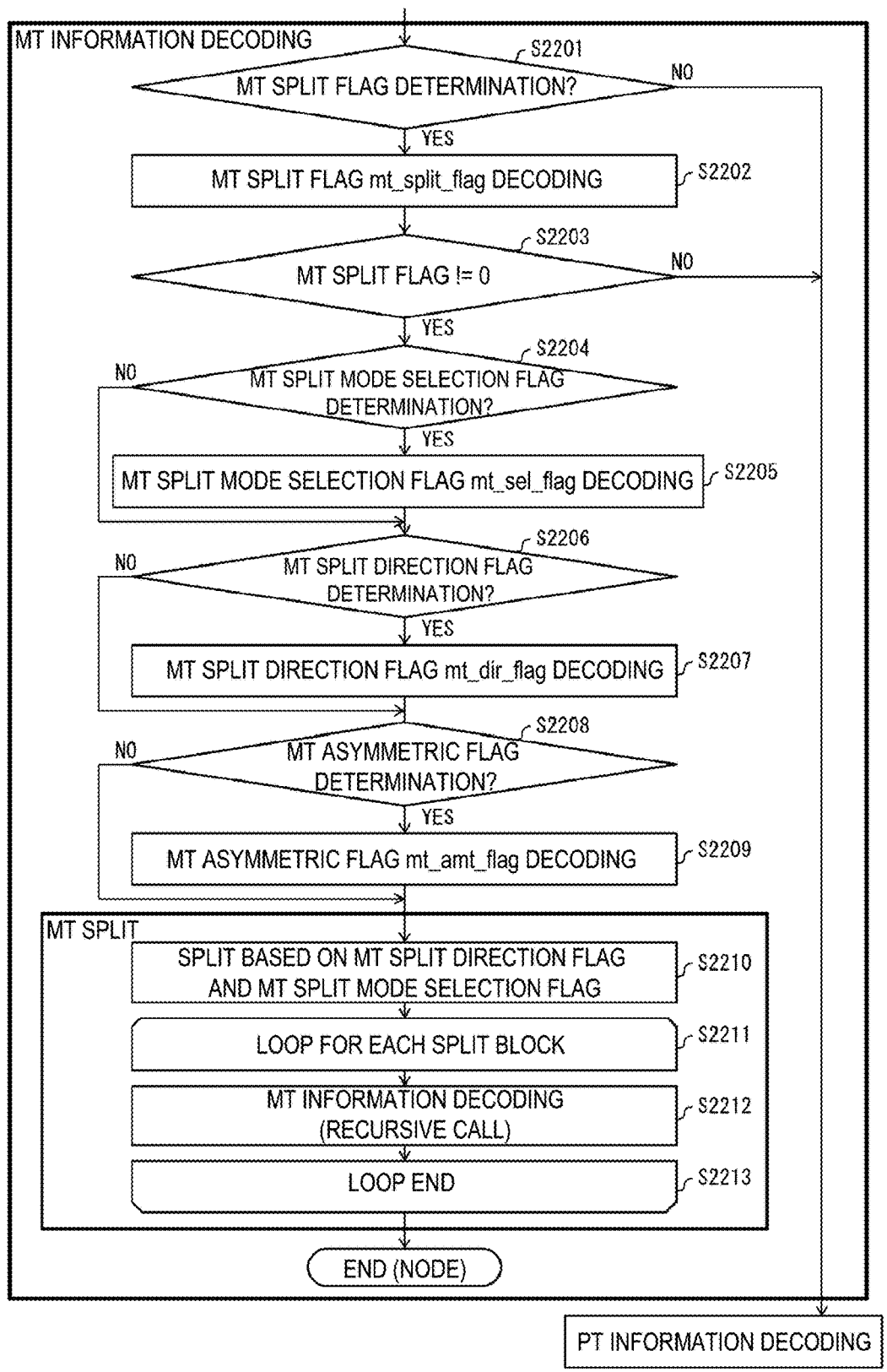
FIG. 64 is a flowchart illustrating decoding processing according to the present embodiment.

FIG. 64 is a flowchart illustrating MT information decoding processing of the CN information decoder 10 according to one embodiment of the present invention. The MT information decoding processing is different from the second example of MT information decoding processing described above in the following respect. That is, in the present embodiment, in a case that MT split is performed, decoding processing of a flag (MT asymmetric flag mt_amt_flag) for distinguishing an asymmetric pattern is performed.

S2201 to S1407 correspond to S1401 to S1407 of the second example of MT information decoding processing described above, and S2211 to S2013 correspond to S1409 to S1411 of the second example of MT information decoding processing described above.

In S2206, in a case that the CN information decoder 10 determines that an MT split direction flag is to be decoded, or subsequently to S2207, the processing proceeds to S2208.

S2208

In S2208, the CN information decoder 10 determines whether or not an MT asymmetric flag is to be decoded. In a case that the CN information decoder 10 determines that an MT asymmetric flag is to be decoded, the processing proceeds to S2209. In a case that the CN information decoder 10 determines that an MT split MMT flag is not to be decoded, the processing proceeds to S2210.

S2209

In S2209, the CN information decoder 10 performs decoding of an MT asymmetric flag mt_amt_flag. Here, mt_amt_flag=0 indicates that a target block (target node) is to be split in 1:4:2:1 sequentially from the top in a case that a split direction of the target block (target node) is the horizontal direction, and indicates that a target block (target node) is to be split in 1:4:2:1 sequentially from left in a case that a split direction of the target block (target node) is the vertical direction. mt_amt_flag=1 indicates that a target block (target node) is to be split in 1:2:4:1 sequentially from the top in a case that a split direction of the target block (target node) is the horizontal direction, and indicates that a target block (target node) is to be split in 1:2:4:1 sequentially from the left in a case that a split direction of the target block (target node) is the vertical direction.

S2210

In S2210, the CN information decoder 10 decodes the split target block, based on the MT split mode selection flag mt_sel_flag, the MT split direction flag mt_dir_flag, and the MT asymmetric flag mt_amt_flag.

Subsequently, with reference to FIGS. 65A to 65C, details of MT split flag determination, MT split mode selection flag determination, and MT split direction flag determination of the fifth example of MT information decoding processing will be described. FIG. 65A is a diagram illustrating an example of a pseudocode representing MT split flag determination processing, FIG. 65B is a diagram illustrating an example of a pseudocode representing MT split mode selection flag determination processing, and FIG. 65C is a diagram illustrating an example of a pseudocode representing MT split direction flag determination processing.

MT Split Flag Determination

MT split flag determination of the fifth example of MT information decoding processing is different from MT split flag determination of the first example of MT information decoding processing in condition 3. Condition 3 of MT split flag determination of the fifth example of MT information decoding processing is as follows.

Condition 3: qtDepth indicating a level of hierarchy of a split target block is less than maxQTDepth, or daqtDepth indicating a level of hierarchy of a split target block is less than maxDAQTDepth (qtDepth<maxQTDepth||daqtDepth<maxDAQTDepth).

Here, maxDAQTDepth represents a maximum value of a depth (level of hierarchy) at the time of DAQT split.

MT Split Mode Selection Flag Determination

MT split mode selection flag determination of the fifth example of MT information decoding processing is different from MT split mode selection flag determination of the fourth example of MT information decoding processing in condition 3. Condition 3 of MT split mode selection flag determination of the fifth example of MT information decoding processing is as follows.

Condition 3: qtDepth indicating a level of hierarchy of a split target block is less than maxQTDepth, and daqtDepth indicating a level of hierarchy of a split target block is less than maxDAQTDepth (qtDepth<maxQTDepth && daqtDepth<maxDAQTDepth).

MT Split Direction Flag Determination

MT split direction flag determination of the fifth example of MT information decoding processing is different from MT split direction flag determination of the fourth example of MT information decoding processing in conditions 1 and 4. Condition 4 of MT split direction flag determination of the fifth example of MT information decoding processing is as follows.

Condition 4: qtDepth indicating a level of hierarchy of a split target block is less than maxQTDepth, and daqtDepth indicating a level of hierarchy of a split target block is less than maxDAQTDepth (qtDepth<maxQTDepth && daqtDepth<maxDAQTDepth).

In the fifth example of MT information decoding processing, in a case that the CN information decoder 10 performs node split on a node higher than a target node by a split type for splitting into four nodes (DAQT), the CN information decoder 10 does not perform split on the target node by a split type for splitting into four or more nodes including a rectangular node. For example, in a case that DAQT split is performed even only once, MT split (QT split) is not performed after the DAQT split.

FIG. 66 is a table illustrating relationships between shapes and each of values of an MT split flag mt_split_flag, an MT split mode selection flag mt_sel_flag, an MT split direction flag mt_dir_flag, and an MT asymmetric flag mt_amt_flag.

In a case that an MT split flag is 1 (mt_split_flag==1), and that an MT split mode selection flag is 0 (mt_sel_flag==0), the CN information decoder 10 performs split so that QT illustrated in FIG. 7A is implemented.

In a case that an MT split flag is 1 (mt_split_flag==1), that an MT split mode selection flag is 1 indicating MT split (mt_sel_flag==1), that an MT split direction flag is 0 (mt_dir_flag==0), and that an MT asymmetric flag is 0 (mt_amt_flag==0), the CN information decoder 10 performs split so that DAQT HOR 0 illustrated in FIG. 54C (abbreviated as "DAQTH0" in FIG. 66) is implemented.

In a case that an MT split flag is 1 (mt_split_flag==1), that an MT split mode selection flag is 1 indicating MT split (mt_sel_flag==1), that an MT split direction flag is 0 (mt_dir_flag==0), and that an MT asymmetric flag is 1 (mt_amt_flag==1), the CN information decoder 10 performs split so that DAQT HOR 1 illustrated in FIG. 54D (abbreviated as "DAQTH1" in FIG. 66) is implemented.

In a case that an MT split flag is 1 (mt_split_flag==1), that an MT split mode selection flag is 1 indicating MT split (mt_sel_flag==1), that an MT split direction flag is 1 (mt_dir_flag==1), and that an MT asymmetric flag is 0 (mt_amt_flag==0), the CN information decoder 10 performs split so that DAQT VER 0 illustrated in FIG. 54A (abbreviated as "DAQTV0" in FIG. 66) is implemented.

In a case that an MT split flag is 1 (mt_split_flag==1), that an MT split mode selection flag is 1 indicating MT split (mt_sel_flag==1), that an MT split direction flag is 1 (mt_dir_flag==1), and that an MT asymmetric flag is 1 (mt_amt_flag==1), the CN information decoder 10 performs split so that DAQT VER 1 illustrated in FIG. 54B (abbreviated as "DAQTV1" in FIG. 66) is implemented.

Specifically, in a case that an MT split flag indicates that split is to be performed by a first split type group including a split type for splitting into four asymmetric and directional nodes (DAQT) and QT split for splitting into four non-directional nodes (mt_sel_flag==1), and that asymmetric and directional split is to be performed (mt_sel_flag==1), the CN information decoder 10 employs a direction indicated by an MT split direction flag as a first direction to split a target node into four nodes, according to a ratio of 1:4:2:1 or a ratio of 1:2:4:1 indicated by an MT asymmetric flag mt_amt_flag (fourth flag described above).

Third Embodiment

MT Split Mode Group and PT Split Mode Group

Also in the present embodiment, the various split modes described above are classified into an MT split mode group (MT split) and a PT split mode group (PT split). Here, MT split includes at least QT split, and PT split includes at least BT split.

In the present embodiment, non-directional split is classified into MT split, and directional split is classified into PT split.

More specifically, in the present embodiment, MT split includes QT split. PT split includes DQT split, DFT split, and DAQT split, besides BT split. PT split may also include TT split.

In the third embodiment, split mode groups include a first mode group (MT split) and a second mode group (PT split). (In a case that an immediately higher node is a square,) the second mode group includes at least BT split of splitting into two rectangular nodes, and split of splitting into four or more nodes including a rectangular node.

PT Information Decoding Processing

First Example of PT Information Decoding Processing

Figure 67:
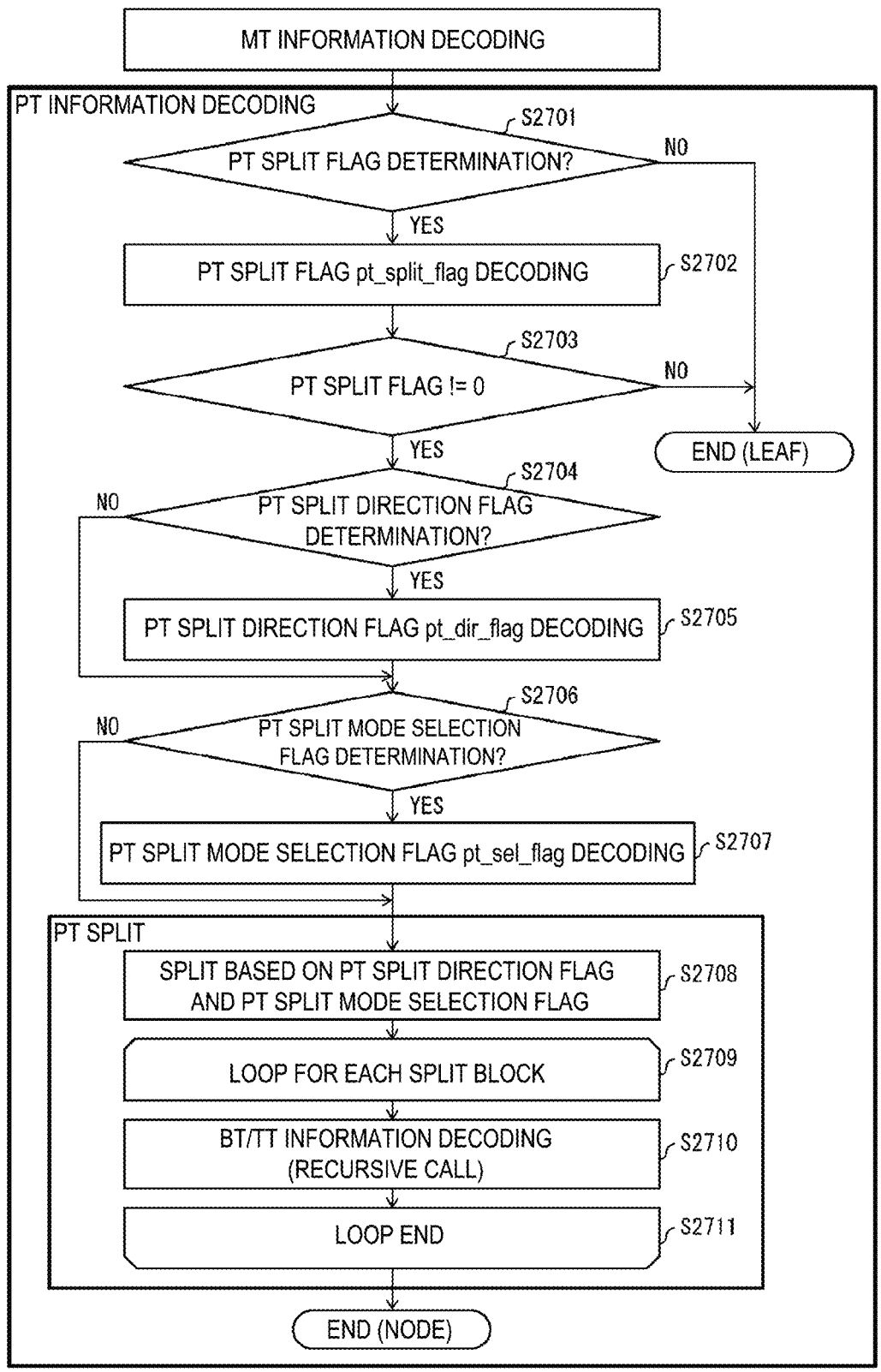
FIG. 67 is a flowchart illustrating decoding processing according to the present embodiment.

FIG. 67 is a flowchart illustrating PT information decoding processing of the CN information decoder 10 according to one embodiment of the present invention. FIG. 67 is a flowchart illustrating PT information decoding processing in a case that PT split includes BT split, TT split, and DQT split. PT decoding processing is performed at a stage later than MT information decoding processing.

S2701

First, in S2701, the CN information decoder 10 determines whether or not a PT split flag is to be decoded. In a case that the CN information decoder 10 determines that a PT split flag is to be decoded, the processing proceeds to Step S2702. In a case that the CN information decoder 10 determines that a PT split flag is not to be decoded, the PT information decoding processing ends.

S2702

In S2702, the CN information decoder 10 performs decoding of a PT split flag pt_split_flag. Here, pt_split_flag=0 indicates that a target block is not to be split, and pt_split_flag=1 indicates that a target block is to be split.

S2703

Subsequently, the CN information decoder 10 determines whether the following determination expression concerning the PT split flag pt_split_flag is true or false.

PT split flag!=0 (Expression 2701) In a case that (Expression 2701) is true, the processing proceeds to Step S2704. In a case that (Expression 2701) is false, the PT information decoding processing ends.

S2704

In S2704, the CN information decoder 10 determines whether or not a PT split direction flag is to be decoded (PT split flag determination). In a case that the CN information decoder 10 determines that a PT split direction flag is to be decoded (PT split flag determination is Y/TRUE), the processing proceeds to Step S2705. In a case that the CN information decoder 10 determines that a PT split direction flag is not to be decoded (PT split flag determination is N/FALSE), the processing proceeds to Step S2706.

S2705

In S2705, the CN information decoder 10 performs decoding of a PT split direction flag pt_dir_flag. Here, pt_dir_flag=0 indicates that a target block is to be horizontally split, and pt_dir_flag=1 indicates that a target block is to be vertically split.

S2706

In S2706, the CN information decoder 10 determines whether or not a PT split mode selection flag is to be decoded (PT split mode selection flag determination). In a case that the CN information decoder 10 determines that a PT split mode selection flag is to be decoded (PT split mode selection flag determination is Y/TRUE), the processing proceeds to Step S2707. In a case that the CN information decoder 10 determines that a PT split mode selection flag is not to be decoded (PT split mode selection flag determination is N/FALSE), the processing proceeds to Step S2708.

S2707

In S2707, the CN information decoder 10 decodes the PT split mode selection flag pt_sel_flag. Here, pt_sel_flag=0 indicates that a target block is to be split by BT split, and pt_sel_flag=1 indicates that a target block is to be split by TT split.

S2708

In S2708, the CN information decoder 10 decodes the split target block in a split direction indicated by the PT split direction flag pt_dir_flag, and by a split mode indicated by the PT split mode selection flag pt_sel_flag.

S2709 to S2711

Subsequently, loop processing of repeatedly performing PT information decoding processing on blocks generated by the split is performed (S2709, S2710, S2711). The processing ends after the loop processing ends.

With reference to FIGS. 68A to 68C, details of PT split flag determination, PT split mode selection flag determination, and PT split direction flag determination of the first example of PT information decoding processing will be described. FIG. 68A is a diagram illustrating an example of a pseudocode representing PT split flag determination processing, FIG. 68B is a diagram illustrating an example of a pseudocode representing PT split mode selection flag determination processing, and FIG. 68C is a diagram illustrating an example of a pseudocode representing PT split direction flag determination processing.

PT Split Flag Determination

The CN information decoder 10 performs PT split flag determination, with reference to condition 1 to condition 3 described below.

Condition 1: The height of a split target block is equal to or greater than minPTSize×2, or the width of a split target block is equal to or greater than minPTSize×2 (height>=minPTSize*2||width>=minPTSize*2).

Condition 2: The width and the height of a split target block are equal to or less than maxMTSize indicating a maximum value of a PT size (width<=maxPTSize && height<=maxPTSize).

Condition 3: ptDepth indicating a level of hierarchy of a split target block is less than maxPTDepth, or dqtDepth indicating a level of hierarchy of a split target block is less than maxDQTDepth (ptDepth<maxPTDepth||dqtDepth<maxDQTDepth).

In a case that all of conditions 1 to 3 described above are satisfied, the CN information decoder 10 determines that a PT split flag is present (TRUE). In a case that any of conditions 1 to 3 described above is not satisfied, the CN information decoder 10 determines that PT split is not possible (FALSE).

PT Split Mode Selection Flag Determination

The CN information decoder 10 performs PT split mode selection flag determination, with reference to condition 1 to condition 3 described below.

Condition 1: The height of a split target block is equal to or greater than minPTSize×4, or the width of a split target block is equal to or greater than minPTSize×4 (height>=minPTSize*4||width>=minPTSize*4).

Condition 2: The width and the height of a split target block are equal to or less than maxMTSize indicating a maximum value of an MT size (width<=maxMTSize && height<=maxMTSize).

Condition 3: ptDepth indicating a level of hierarchy of a split target block is less than maxPTDepth, and dqtDepth indicating a level of hierarchy of a split target block is less than maxDQTDepth (ptDepth<maxPTDepth && dqtDepth<maxDQTDepth).

In a case that all of conditions 1 to 3 described above are satisfied, the CN information decoder 10 determines that decoding of a PT split mode selection flag is necessary (TRUE). In a case that not all of conditions 1 to 3 described above are satisfied, the CN information decoder 10 determines that decoding of a PT split mode selection flag is unnecessary (FALSE).

PT Split Direction Flag Determination

The CN information decoder 10 performs PT split direction flag determination, with reference to condition 1 to condition 4 described below.

Condition 1: A PT split mode selection flag indicates DQT split (pt_sel_flag==MODE_DQT).

Condition 2: The height of a split target block is equal to or greater than minPTSize×4, or the width of a split target block is equal to or greater than minPTSize×4 (height>=minPTSize*4||width>=minPTSize*4).

Condition 3: The width and the height of a split target block are equal to or less than maxMTSize indicating a maximum value of an MT size (width<=maxMTSize && height<=maxMTSize).

Condition 4: ptDepth indicating a level of hierarchy of a split target block is less than maxPTDepth, and dqtDepth indicating a level of hierarchy of a split target block is less than maxDQTDepth (ptDepth<maxPTDepth && dqtDepth<maxDQTDepth).

In a case that all of conditions 1 to 4 described above are satisfied, the CN information decoder 10 determines that decoding of a PT split direction flag is necessary (TRUE). In a case that any of conditions 1 to 4 described above is not satisfied, the CN information decoder 10 determines that decoding of a PT split direction flag is unnecessary (FALSE).

In the first example of PT information decoding processing, in a case that PT split (DQT split) is performed even only once, MT split (QT split) is restricted (prohibited) after the PT split (DQT split). Performing BT split on the middle block generated by TT split is restricted (prohibited). Performing BT split in a direction the same as a direction of blocks generated by BT split is restricted (prohibited).

FIG. 69 is a table illustrating relationships between shapes and each of values of a PT split flag pt_split_flag, a PT split direction flag pt_dir_flag, and a PT split mode selection flag pt_sel_flag.

In a case that a PT split flag is 1 (pt_split_flag==1), that a PT split direction flag is 0 (pt_dir_flag==0), and that a PT split mode selection flag is 0 (pt_sel_flag==0), the CN information decoder 10 performs split so that BT HOR illustrated in FIG. 7B (abbreviated as "BTH" in FIG. 69) is implemented.

In a case that a PT split flag is 1 (pt_split_flag==1), that a PT split direction flag is 0 (pt_dir_flag==0), and that a PT split mode selection flag is 1 (pt_sel_flag==1), the CN information decoder 10 performs split so that TT HOR illustrated in FIG. 7E (abbreviated as "TTH" in FIG. 69) is implemented.

In a case that a PT split flag is 1 (pt_split_flag==1), that a PT split direction flag is 0 (pt_dir_flag==0), and that a PT split mode selection flag is 2 (pt_sel_flag==2), the CN information decoder 10 performs split so that DQT HOR illustrated in FIG. 53E (abbreviated as "DQTH" in FIG. 69) is implemented.

In a case that a PT split flag is 1 (pt_split_flag==1), that a PT split direction flag is 1 (pt_dir_flag==1), and that a PT split mode selection flag is 0 (pt_sel_flag==0), the CN information decoder 10 performs split so that BT VER illustrated in FIG. 7C (abbreviated as "BTV" in FIG. 69) is implemented.

In a case that a PT split flag is 1 (pt_split_flag==1), that a PT split direction flag is 1 (pt_dir_flag==0), and that a PT split mode selection flag is 1 (pt_sel_flag==1), the CN information decoder 10 performs split so that TT VER illustrated in FIG. 7F (abbreviated as "TTV" in FIG. 69) is implemented.

In a case that a PT split flag is 1 (pt_split_flag==1), that a PT split direction flag is 1 (pt_dir_flag==0), and that a PT split mode selection flag is 2 (pt_sel_flag==2), the CN information decoder 10 performs split so that DQT VER illustrated in FIG. 53D (abbreviated as "DQTV" in FIG. 69) is implemented.

Second Example of PT Information Decoding Processing

With reference to FIGS. 70A to 70C, details of PT split flag determination, PT split mode selection flag determination, and PT split direction flag determination will be described. FIG. 70A is a diagram illustrating an example of a pseudocode representing PT split flag determination processing, FIG. 70B is a diagram illustrating an example of a pseudocode representing PT split mode selection flag determination processing, and FIG. 70C is a diagram illustrating an example of a pseudocode representing PT split direction flag determination processing.

PT Split Flag Determination

PT split flag determination of the second example of PT information decoding processing is different from PT split flag determination of the first example of PT information decoding processing in condition 3. Condition 3 of PT split flag determination of the second example of PT information decoding processing is as follows.

Condition 3: ptDepth indicating a level of hierarchy of a split target block is less than maxPTDepth, or dftDepth indicating a level of hierarchy of a split target block is less than maxDFTDepth (ptDepth<maxPTDepth||dftDepth<maxDFTDepth).

PT Split Mode Selection Flag Determination

PT split mode selection flag determination of the second example of PT information decoding processing is different from PT split mode selection flag determination of the first example of PT information decoding processing in conditions 1 and 3. Conditions 1 and 3 of PT split mode selection flag determination of the second example of PT information decoding processing are as follows.

Condition 1: The height of a split target block is equal to or greater than minPTSize×8, or the width of a split target block is equal to or greater than minPTSize×8 (height>=minPTSize*8||width>=minPTSize*8).

Condition 3: ptDepth indicating a level of hierarchy of a split target block is less than maxPTDepth, and dftDepth indicating a level of hierarchy of a split target block is less than maxDFTDepth (ptDepth<maxPTDepth && dftDepth<maxDFTDepth).

PT Split Direction Flag Determination

PT split direction flag determination of the second example of PT information decoding processing is different from PT split direction flag determination of the first example of PT information decoding processing in conditions 1, 2, and 4. Conditions 1, 2, and 4 of PT split direction flag determination of the second example of PT information decoding processing are as follows.

Condition 1: A PT split mode selection flag indicates DFT split (pt_sel_flag==MODE_DFT).

Condition 2: The height of a split target block is equal to or greater than minPTSize×8, or the width of a split target block is equal to or greater than minPTSize×8 (height>=minPTSize*8||width>=minPTSize*8).

Condition 4: ptDepth indicating a level of hierarchy of a split target block is less than maxPTDepth, and dftDepth indicating a level of hierarchy of a split target block is less than maxDFTDepth (ptDepth<maxPTDepth && dftDepth<maxDFTDepth).

In the second example of PT information decoding processing, in a case that PT split (DFT split) is performed even only once, MT split (QT split) is restricted (prohibited) after the PT split (DFT split).

FIG. 71 is a table illustrating relationships between shapes and each of values of a PT split flag pt_split_flag, a PT split direction flag pt_dir_flag, and a PT split mode selection flag pt_sel_flag.

In a case that a PT split flag is 1 (pt_split_flag==1), that a PT split direction flag is 0 (pt_dir_flag==0), and that a PT split mode selection flag is 0 (pt_sel_flag==0), the CN information decoder 10 performs split so that BT HOR illustrated in FIG. 7B (abbreviated as "BTH" in FIG. 71) is implemented.

In a case that a PT split flag is 1 (pt_split_flag==1), that a PT split direction flag is 0 (pt_dir_flag==0), and that a PT split mode selection flag is 1 (pt_sel_flag==1), the CN information decoder 10 performs split so that TT HOR illustrated in FIG. 7E (abbreviated as "TTH" in FIG. 71) is implemented.

In a case that a PT split flag is 1 (pt_split_flag==1), that a PT split direction flag is 0 (pt_dir_flag==0), and that a PT split mode selection flag is 2 (pt_sel_flag==2), the CN information decoder 10 performs split so that DFT HOR illustrated in FIG. 53G (abbreviated as "DFTH" in FIG. 71) is implemented.

In a case that a PT split flag is 1 (pt_split_flag==1), that a PT split direction flag is 1 (pt_dir_flag==1), and that a PT split mode selection flag is 0 (pt_sel_flag==0), the CN information decoder 10 performs split so that BT VER illustrated in FIG. 7C (abbreviated as "BTV" in FIG. 71) is implemented.

In a case that a PT split flag is 1 (pt_split_flag==1), that a PT split direction flag is 1 (pt_dir_flag==0), and that a PT split mode selection flag is 1 (pt_sel_flag==1), the CN information decoder 10 performs split so that TT VER illustrated in FIG. 7F (abbreviated as "TTV" in FIG. 71) is implemented.

In a case that a PT split flag is 1 (pt_split_flag==1), that a PT split direction flag is 1 (pt_dir_flag==0), and that a PT split mode selection flag is 2 (pt_sel_flag==2), the CN information decoder 10 performs split so that DFT VER illustrated in FIG. 53F (abbreviated as "DFTV" in FIG. 71) is implemented.

Third Example of PT Information Decoding Processing

Figure 72:
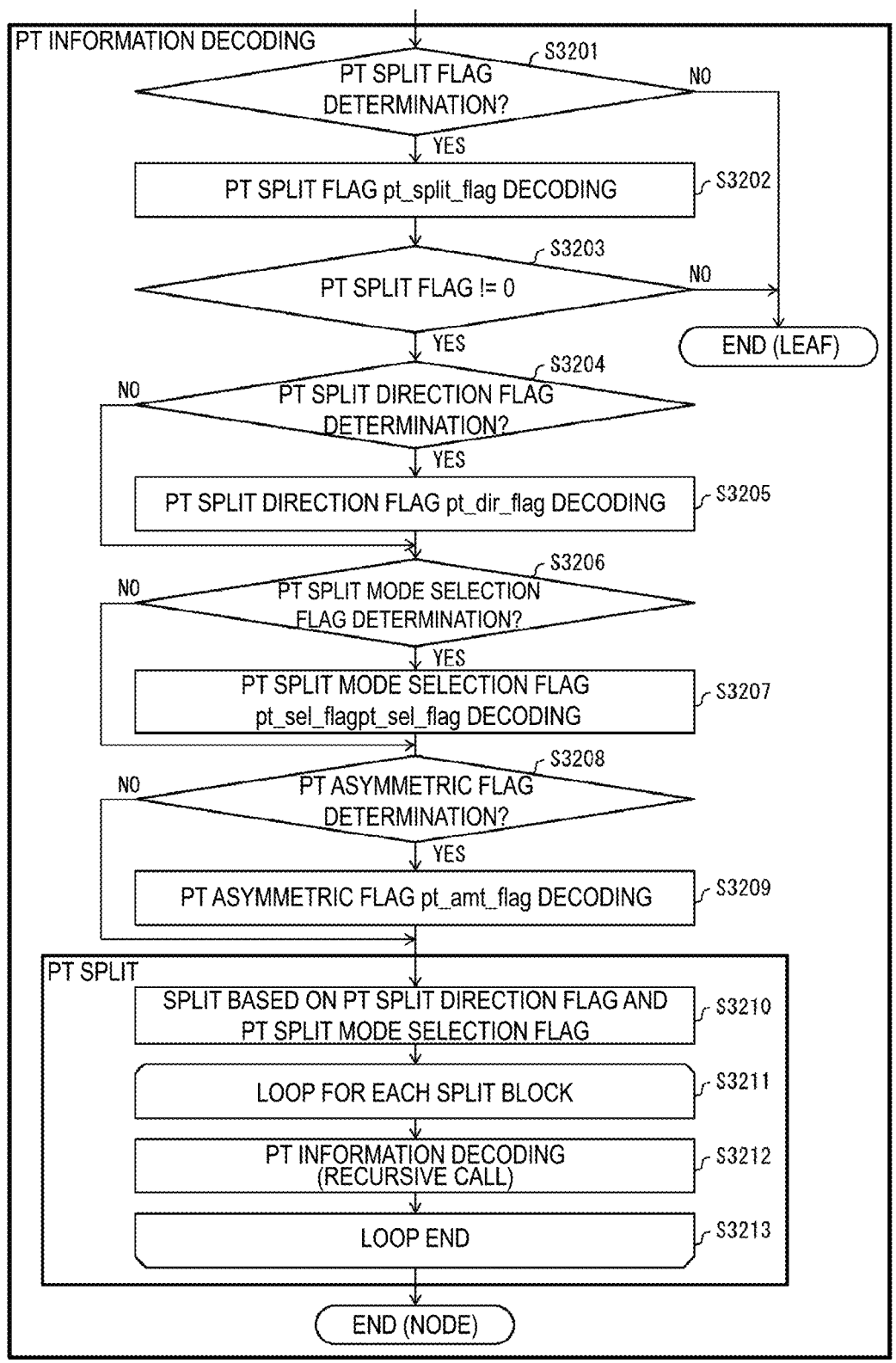
FIG. 72 is a flowchart illustrating decoding processing according to the present embodiment.

FIG. 72 is a flowchart illustrating PT information decoding processing of the CN information decoder 10 according to one embodiment of the present invention. The PT information decoding processing is different from the first example of PT information decoding processing described above in the following respect. That is, in the present embodiment, in a case that PT split is performed, decoding processing of a flag (PT asymmetric flag pt_amt_flag) for distinguishing an asymmetric pattern is performed.

S3201 to S3207 correspond to S2701 to S2707 of the first example of PT information decoding processing described above, and S3210 to S3213 correspond to S2708 to S2711 of the first example of PT information decoding processing described above.

In S3206, in a case that the CN information decoder 10 determines that a PT split mode selection flag is to be decoded, or subsequently to S3207, the processing proceeds to S3208.

S3208

In S3208, the CN information decoder 10 determines whether or not a PT asymmetric flag is to be decoded. In a case that the CN information decoder 10 determines that a PT asymmetric flag is to be decoded, the processing proceeds to S3209. In a case that the CN information decoder 10 determines that a PT asymmetric flag is not to be decoded, the processing proceeds to S3210.

S3209

In S3209, the CN information decoder 10 performs decoding of a PT asymmetric flag pt_amt_flag. Here, pt_amt_flag=0 indicates that a target block (target node) is to be split in 1:4:2:1 sequentially from top in a case that a split direction of the target block (target node) is the horizontal direction, and indicates that a target block (target node) is to be split in 1:4:2:1 sequentially from left in a case that a split direction of the target block (target node) is the vertical direction. mt_amt_flag=1 indicates that a target block (target node) is to be split in 1:2:4:1 sequentially from top in a case that a split direction of the target block (target node) is the horizontal direction, and indicates that a target block (target node) is to be split in 1:2:4:1 sequentially from left in a case that a split direction of the target block (target node) is the vertical direction.

With reference to FIGS. 73A to 73C, details of PT split flag determination, PT split mode selection flag determination, and PT split direction flag determination will be described. FIG. 73A is a diagram illustrating an example of a pseudocode representing PT split flag determination processing, FIG. 73B is a diagram illustrating an example of a pseudocode representing PT split mode selection flag determination processing, and FIG. 73C is a diagram illustrating an example of a pseudocode representing PT split direction flag determination processing.

PT Split Flag Determination

PT split flag determination of the third example of PT information decoding processing is different from PT split flag determination of the first example of PT information decoding processing in condition 3. Condition 3 of PT split flag determination of the third example of PT information decoding processing is as follows.

Condition 3: ptDepth indicating a level of hierarchy of a split target block is less than maxPTDepth, or daptDepth indicating a level of hierarchy of a split target block is less than maxDAQTDepth (ptDepth<maxPTDepth||daqtDepth<maxDAQTDepth).

PT Split Mode Selection Flag Determination

PT split mode selection flag determination of the third example of PT information decoding processing is different from PT split mode selection flag determination of the second example of PT information decoding processing in condition 3. Condition 3 of PT split mode selection flag determination of the third example of PT information decoding processing is as follows.

Condition 3: ptDepth indicating a level of hierarchy of a split target block is less than maxPTDepth, and daqtDepth indicating a level of hierarchy of a split target block is less than maxDAQTDepth (ptDepth<maxPTDepth && daqtDepth<maxDAQTDepth).

PT Split Direction Flag Determination

PT split direction flag determination of the third example of PT information decoding processing is different from PT split direction flag determination of the second example of PT information decoding processing in conditions 1 and 4. Conditions 1 and 4 of PT split direction flag determination of the third example of PT information decoding processing are as follows.

Condition 1: A PT split mode selection flag indicates DAQT split (pt_sel_flag==MODE_DAQT).

Condition 4: ptDepth indicating a level of hierarchy of a split target block is less than maxPTDepth, and dftDepth indicating a level of hierarchy of a split target block is less than maxDFTDepth (ptDepth<maxPTDepth && daqtDepth<maxDAQTDepth).

In the third example of PT information decoding processing, in a case that PT split (DAQT split) is performed even only once, MT split (QT split) is restricted (prohibited) after the PT split (DAQT split).

FIG. 74 is a table illustrating relationships between shapes and each of values of a PT split flag pt_split_flag, a PT split direction flag pt_dir_flag, a PT split mode selection flag pt_sel_flag, and a PT asymmetric flag pt_amt_flag.

In a case that a PT split flag is 1 (pt_split_flag==1), that a PT split direction flag is 0 (pt_dir_flag==0), and that a PT split mode selection flag is 0 (pt_sel_flag==0), the CN information decoder 10 performs split so that BT HOR illustrated in FIG. 7B (abbreviated as "BTH" in FIG. 74) is implemented.

In a case that a PT split flag is 1 (pt_split_flag==1), that a PT split direction flag is 0 (pt_dir_flag==0), and that a PT split mode selection flag is 1 (pt_sel_flag==1), the CN information decoder 10 performs split so that TT HOR illustrated in FIG. 7E (abbreviated as "TTH" in FIG. 74) is implemented.

In a case that a PT split flag is 1 (pt_split_flag==1), that a PT split direction flag is 0 (pt_dir_flag==0), that a PT split mode selection flag is 2 (pt_sel_flag==2), and that a PT asymmetric flag is 0 (pt_amt_flag==0), the CN information decoder 10 performs split so that DAQT HOR 0 illustrated in FIG. 54C (abbreviated as "DAQTH0" in FIG. 74) is implemented.

In a case that a PT split flag is 1 (pt_split_flag==1), that a PT split direction flag is 0 (pt_dir_flag==0), that a PT split mode selection flag is 2 (pt_sel_flag==2), and that a PT asymmetric flag is 1 (pt_amt_flag==1), the CN information decoder 10 performs split so that DAQT HOR 1 illustrated in FIG. 54D (abbreviated as "DAQTH1" in FIG. 74) is implemented.

In a case that a PT split flag is 1 (pt_split_flag==1), that a PT split direction flag is 1 (pt_dir_flag==1), and that a PT split mode selection flag is 0 (pt_sel_flag==0), the CN information decoder 10 performs split so that BT VER illustrated in FIG. 7C (abbreviated as "BTV" in FIG. 74) is implemented.

In a case that a PT split flag is 1 (pt_split_flag==1), that a PT split direction flag is 1 (pt_dir_flag==1), and that a PT split mode selection flag is 1 (pt_sel_flag==1), the CN information decoder 10 performs split so that TT VER illustrated in FIG. 7F (abbreviated as "TTV" in FIG. 74) is implemented.

In a case that a PT split flag is 1 (pt_split_flag==1), that a PT split direction flag is 1 (pt_dir_flag==1), that a PT split mode selection flag is 2 (pt_sel_flag==2), and that a PT asymmetric flag is 0 (pt_amt_flag==0), the CN information decoder 10 performs split so that DAQT VER 0 illustrated in FIG. 54A (abbreviated as "DAQTV0" in FIG. 74) is implemented.

In a case that a PT split flag is 1 (pt_split_flag==1), that a PT split direction flag is 1 (pt_dir_flag==1), that a PT split mode selection flag is 2 (pt_sel_flag==2), and that a PT asymmetric flag is 1 (pt_amt_flag==1), the CN information decoder 10 performs split so that DAQT VER 1 illustrated in FIG. 54B (abbreviated as "DAQTV1" in FIG. 74) is implemented.

Implementation Examples by Software

Note that, part of the image coding apparatus 11 and the image decoding apparatus 31 in the above-mentioned embodiments, for example, the entropy decoder 301, the prediction parameter decoder 302, the loop filter 305, the prediction image generation unit 308, the inverse quantization and inverse DCT unit 311, the addition unit 312, the prediction image generation unit 101, the subtraction unit 102, the DCT and quantization unit 103, the entropy encoder 104, the inverse quantization and inverse DCT unit 105, the loop filter 107, the coding parameter determination unit 110, and the prediction parameter encoder 111, may be realized by a computer. In that case, this configuration may be realized by recording a program for realizing such control functions on a computer-readable recording medium and causing a computer system to read the program recorded on the recording medium for execution. Note that it is assumed that the "computer system" mentioned here refers to a computer system built into either the image coding apparatus 11 or the image decoding apparatus 31, and the computer system includes an OS and hardware components such as a peripheral apparatus. The "computer-readable recording medium" refers to a portable medium such as a flexible disk, a magneto-optical disk, a ROM, a CD-ROM, and the like, and a storage apparatus such as a hard disk built into the computer system. The "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. The program may be configured to realize some of the functions described above, and also may be configured to be capable of realizing the functions described above in combination with a program already recorded in the computer system.

Part or all of the image coding apparatus 11 and the image decoding apparatus 31 in the embodiments described above may be realized as an integrated circuit such as a Large Scale Integration (LSI). Each function block of the image coding apparatus 11 and the image decoding apparatus 31 may be individually realized as processors, or part or all may be integrated into processors. The circuit integration technique is not limited to LSI, and the integrated circuits for the functional blocks may be realized as dedicated circuits or a multi-purpose processor. In a case that with advances in semiconductor technology, a circuit integration technology with which an LSI is replaced appears, an integrated circuit based on the technology may be used.

The embodiment of the present invention has been described in detail above referring to the drawings, but the specific configuration is not limited to the above embodiments and various amendments can be made to a design that fall within the scope that does not depart from the gist of the present invention.

Application Examples

The above-mentioned image coding apparatus 11 and the image decoding apparatus 31 can be utilized being installed to various apparatuses performing transmission, reception, recording, and regeneration of videos. Note that, videos may be natural videos imaged by cameras or the like, or may be artificial videos (including CG and GUI) generated by computers or the like.

At first, referring to FIGS. 75A and 75B, it will be described that the above-mentioned image coding apparatus 11 and the image decoding apparatus 31 can be utilized for transmission and reception of videos.

Figure 75A:
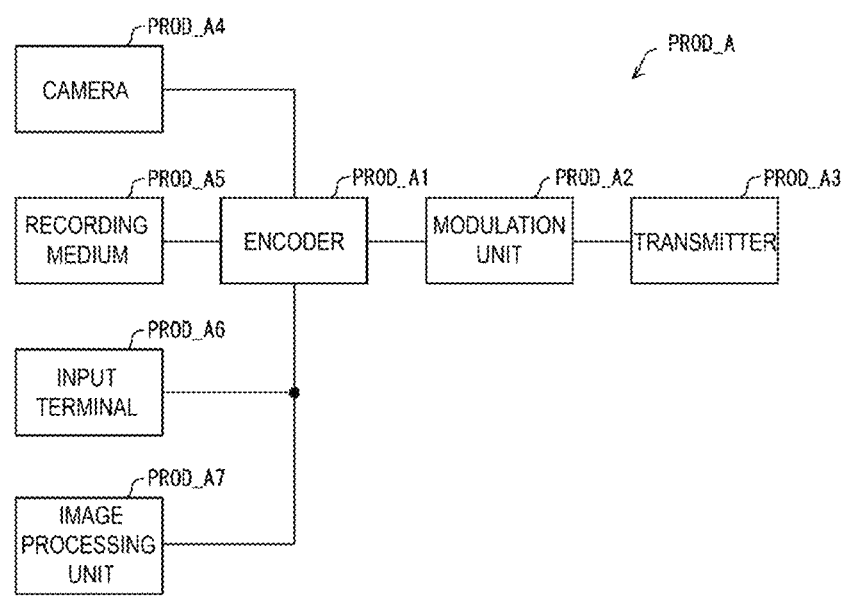
FIGS. 75A and 75B are diagrams illustrating configurations of a transmitting apparatus equipped with the image coding apparatus and a receiving apparatus equipped with the image decoding apparatus according to the present embodiment.

FIG. 75A is a block diagram illustrating a configuration of a transmitting apparatus PROD_A installed with the image coding apparatus 11. As illustrated in FIG. 75A, the transmitting apparatus PROD_A includes a encoder PROD_A1 which obtains coded data by coding videos, a modulation unit PROD_A2 which obtains modulating signals by modulating carrier waves with the coded data obtained by the encoder PROD_A1 and a transmitter PROD_A3 which transmits the modulating signals obtained by the modulation unit PROD_A2. The above-mentioned image coding apparatus 11 is utilized as the encoder PROD_A1.

The transmitting apparatus PROD_A may further include a camera PROD_A4 imaging videos, a recording medium PROD_A5 recording videos, an input terminal PROD_A6 to input videos from the outside, and an image processing unit A7 which generates or processes images, as sources of supply of the videos input into the encoder PROD_A1. In FIG. 75A, although the configuration that the transmitting apparatus PROD_A includes these all is exemplified, a part may be omitted.

Note that the recording medium PROD_A5 may record videos which are not coded, or may record videos coded in a coding scheme for recording different than a coding scheme for transmission. In the latter case, a decoder (not illustrated) to decode coded data read from the recording medium PROD_A5 according to coding scheme for recording may be interleaved between the recording medium PROD_A5 and the encoder PROD_A1.

Figure 75B:
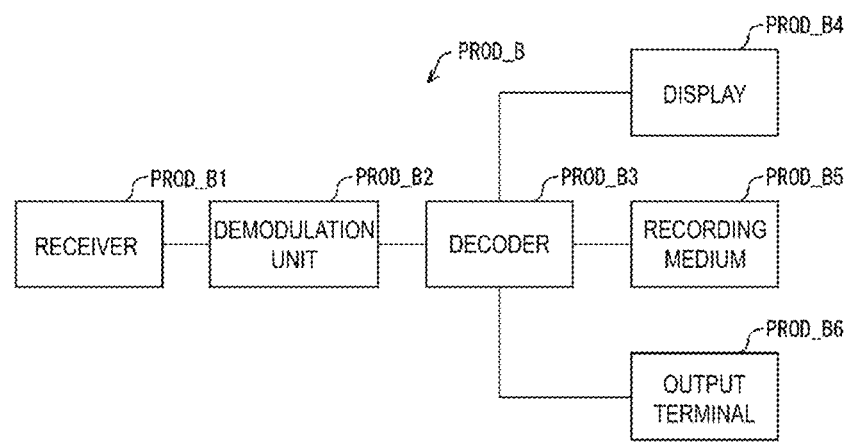

FIG. 75B is a block diagram illustrating a configuration of a receiving apparatus PROD_B installed with the image decoding apparatus 31. As illustrated in FIG. 75B, the receiving apparatus PROD_B includes a receiver PROD_B1 which receives modulating signals, a demodulation unit PROD_B2 which obtains coded data by demodulating the modulating signals received by the receiver PROD_B1, and a decoder PROD_B3 which obtains videos by decoding the coded data obtained by the demodulation unit PROD_B2. The above-mentioned image decoding apparatus 31 is utilized as the decoder PROD_B3.

The receiving apparatus PROD_B may further include a display PROD_B4 displaying videos, a recording medium PROD_B5 to record the videos, and an output terminal PROD_B6 to output videos outside, as supply destination of the videos output by the decoder PROD_B3. In FIG. 75B, although the configuration that the receiving apparatus PROD_B includes these all is exemplified, a part may be omitted.

Note that the recording medium PROD_B5 may record videos which are not coded, or may record videos which are coded in a coding scheme for recording different from a coding scheme for transmission. In the latter case, a encoder (not illustrated) to code videos acquired from the decoder PROD_B3 according to a coding scheme for recording may be interleaved between the decoder PROD_B3 and the recording medium PROD_B5.

Note that the transmission medium transmitting modulating signals may be wireless or may be wired. The transmission aspect to transmit modulating signals may be broadcasting (here, referred to as the transmission aspect where the transmission target is not specified beforehand) or may be telecommunication (here, referred to as the transmission aspect that the transmission target is specified beforehand). Thus, the transmission of the modulating signals may be realized by any of radio broadcasting, cable broadcasting, radio communication, and cable communication.

For example, broadcasting stations (broadcasting equipment, and the like)/receiving stations (television receivers, and the like) of digital terrestrial television broadcasting is an example of transmitting apparatus PROD_A/receiving apparatus PROD_B transmitting and/or receiving modulating signals in radio broadcasting. Broadcasting stations (broadcasting equipment, and the like)/receiving stations (television receivers, and the like) of cable television broadcasting are an example of transmitting apparatus PROD_A/ receiving apparatus PROD_B transmitting and/or receiving modulating signals in cable broadcasting.

Servers (work stations, and the like)/clients (television receivers, personal computers, smartphones, and the like) for Video On Demand (VOD) services, video hosting services using the Internet and the like are an example of transmitting apparatus PROD_A/receiving apparatus PROD_B transmitting and/or receiving modulating signals in telecommunication (usually, any of radio or cable is used as transmission medium in the LAN, and cable is used for as transmission medium in the WAN). Here, personal computers include a desktop PC, a laptop type PC, and a graphics tablet type PC. Smartphones also include a multi-functional portable telephone terminal.

Note that a client of a video hosting service has a function to code a video imaged with a camera and upload the video to a server, in addition to a function to decode coded data downloaded from a server and to display on a display. Thus, a client of a video hosting service functions as both the transmitting apparatus PROD_A and the receiving apparatus PROD_B.

Next, referring to FIGS. 76A and 76B, it will be described that the above-mentioned image coding apparatus 11 and the image decoding apparatus 31 can be utilized for recording and regeneration of videos.

Figure 76A:
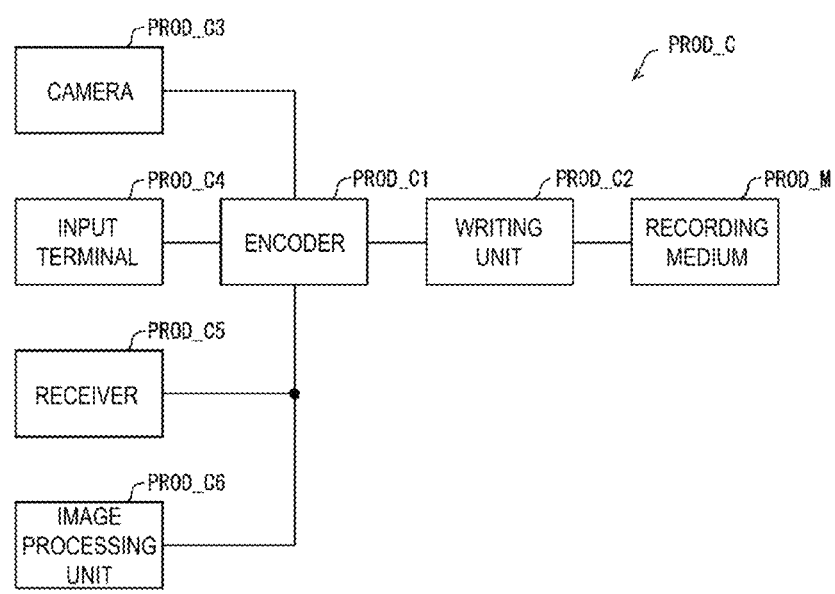
FIGS. 76A and 76B are diagrams illustrating configurations of a recording apparatus equipped with the image coding apparatus and a regeneration apparatus equipped with the image decoding apparatus according to the present embodiment.

FIG. 76A is a block diagram illustrating a configuration of a recording apparatus PROD_C installed with the above-mentioned image coding apparatus 11. As illustrated in FIG. 76A, the recording apparatus PROD_C includes a encoder PROD_C1 which obtains coded data by coding a video, and a writing unit PROD_C2 which writes the coded data obtained by the encoder PROD_C1 in a recording medium PROD_M. The above-mentioned image coding apparatus 11 is utilized as the encoder PROD_C1.

Note that the recording medium PROD_M may be (1) a type built in the recording apparatus PROD_C such as Hard Disk Drive (HDD) or Solid State Drive (SSD), may be (2) a type connected to the recording apparatus PROD_C such as an SD memory card or a Universal Serial Bus (USB) flash memory, and may be (3) a type loaded in a drive apparatus (not illustrated) built in the recording apparatus PROD_C such as Digital Versatile Disc (DVD) or Blu-ray Disc (BD: trade name).

The recording apparatus PROD_C may further include a camera PROD_C3 imaging a video, an input terminal PROD_C4 to input the video from the outside, a receiver PROD_C5 to receive the video, and an image processing unit PROD_C6 which generates or processes images, as sources of supply of the video input into the encoder PROD_C1. In FIG. 76A, although the configuration that the recording apparatus PROD_C includes these all is exemplified, a part may be omitted.

Note that the receiver PROD_C5 may receive a video which is not coded, or may receive coded data coded in a coding scheme for transmission different from a coding scheme for recording. In the latter case, a decoder (not illustrated) for transmission to decode coded data coded in a coding scheme for transmission may be interleaved between the receiver PROD_C5 and the encoder PROD_C1.

Examples of such recording apparatus PROD_C include a DVD recorder, a BD recorder, a Hard Disk Drive (HDD) recorder, and the like (in this case, the input terminal PROD_C4 or the receiver PROD_C5 is the main source of supply of a video). A camcorder (in this case, the camera PROD_C3 is the main source of supply of a video), a personal computer (in this case, the receiver PROD_C5 or the image processing unit C6 is the main source of supply of a video), a smartphone (in this case, the camera PROD_C3 or the receiver PROD_C5 is the main source of supply of a video), or the like is an example of such recording apparatus PROD_C.

Figure 76B:
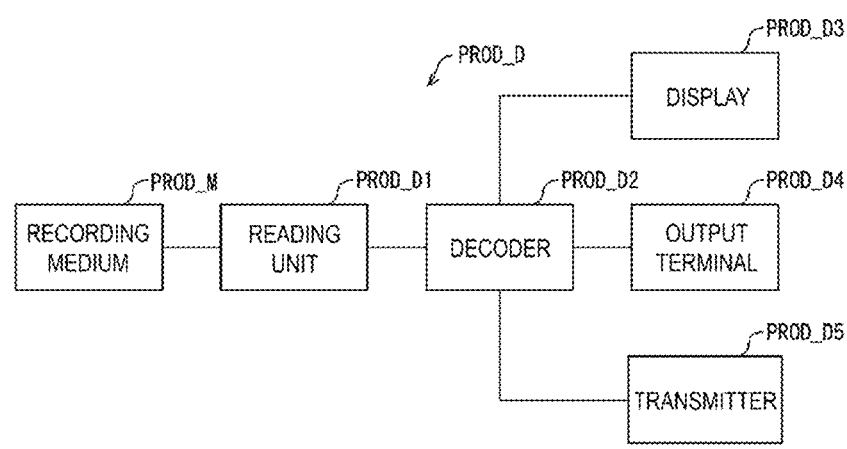

FIG. 76B is a block diagram illustrating a configuration of a regeneration apparatus PROD_D installed with the above-mentioned image decoding apparatus 31. As illustrated in FIG. 76B, the regeneration apparatus PROD_D includes a reading unit PROD_D1 which reads coded data written in the recording medium PROD_M, and a decoder PROD_D2 which obtains a video by decoding the coded data read by the reading unit PROD_D1. The above-mentioned image decoding apparatus 31 is utilized as the decoder PROD_D2.

Note that the recording medium PROD_M may be (1) a type built in the regeneration apparatus PROD_D such as HDD or SSD, may be (2) a type connected to the regeneration apparatus PROD_D such as an SD memory card or a USB flash memory, and may be (3) a type loaded in a drive apparatus (not illustrated) built in the regeneration apparatus PROD_D such as DVD or BD.

The regeneration apparatus PROD_D may further include a display PROD_D3 displaying a video, an output terminal PROD_D4 to output the video to the outside, and a transmitter PROD_D5 which transmits the video, as the supply destination of the video output by the decoder PROD_D2. In FIG. 76B, although the configuration that the regeneration apparatus PROD_D includes these all is exemplified, a part may be omitted.

Note that the transmitter PROD_D5 may transmit a video which is not coded, or may transmit coded data coded in a coding scheme for transmission different than a coding scheme for recording. In the latter case, a encoder (not illustrated) to code a video in a coding scheme for transmission may be interleaved between the decoder PROD_D2 and the transmitter PROD_D5.

Examples of such regeneration apparatus PROD_D include a DVD player, a BD player, an HDD player, and the like (in this case, the output terminal PROD_D4 to which a television receiver, and the like is connected is the main supply target of the video). A television receiver (in this case, the display PROD_D3 is the main supply target of the video), a digital signage (also referred to as an electronic signboard or an electronic bulletin board, and the like, the display PROD_D3 or the transmitter PROD_D5 is the main supply target of the video), a desktop PC (in this case, the output terminal PROD_D4 or the transmitter PROD_D5 is the main supply target of the video), a laptop type or graphics tablet type PC (in this case, the display PROD_D3 or the transmitter PROD_D5 is the main supply target of the video), a smartphone (in this case, the display PROD_D3 or the transmitter PROD_D5 is the main supply target of the video), or the like is an example of such regeneration apparatus PROD_D.

Realization as Hardware and Realization as Software

Each block of the above-mentioned image decoding apparatus 31 and the image coding apparatus 11 may be realized as a hardware by a logical circuit formed on an integrated circuit (IC chip), or may be realized as a software using a Central Processing Unit (CPU).

In the latter case, each apparatus includes a CPU performing a command of a program to implement each function, a Read Only Memory (ROM) stored in the program, a Random Access Memory (RAM) developing the program, and a storage apparatus (recording medium) such as a memory storing the program and various data, and the like. The purpose of the embodiments of the present invention can be achieved by supplying, to each of the apparatuses, the recording medium recording readably the program code (execution form program, intermediate code program, source program) of the control program of each of the apparatuses which is a software implementing the above-mentioned functions with a computer, and reading and performing the program code that the computer (or a CPU or a MPU) records in the recording medium.

For example, as the recording medium, a tape such as a magnetic tape or a cassette tape, a disc including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc (DVD)/CD Recordable (CD-R)/Blu-ray Disc (trade name), a card such as an IC card (including a memory card)/an optical card, a semiconductor memory such as a mask ROM/Erasable Programmable Read-Only Memory (EPROM)/Electrically Erasable and Programmable Read-Only Memory (EEPROM: trade name)/a flash ROM, or a Logical circuits such as a Programmable logic device (PLD) or a Field Programmable Gate Array (FPGA) can be used.

Each of the apparatuses is configured to be connectable with a communication network, and the program code may be supplied through the communication network. This communication network may be able to transmit a program code, and is not specifically limited. For example, the Internet, the intranet, the extranet, Local Area Network (LAN), Integrated Services Digital Network (ISDN), Value-Added Network (VAN), a Community Antenna television/Cable Television (CATV) communication network, Virtual Private Network, telephone network, a mobile communication network, satellite communication network, and the like are available. A transmission medium constituting this communication network may also be a medium which can transmit a program code, and is not limited to a particular configuration or a type. For example, a cable communication such as Institute of Electrical and Electronic Engineers (IEEE) 1394, a USB, a power line carrier, a cable TV line, a phone line, an Asymmetric Digital Subscriber Line (ADSL) line, and a radio communication such as infrared ray such as Infrared Data Association (IrDA) or a remote control, BlueTooth (trade name), IEEE 802.11 radio communication, High Data Rate (HDR), Near Field Communication (NFC), Digital Living Network Alliance (DLNA: trade name), a cellular telephone network, a satellite channel, a terrestrial digital broadcast network are available. Note that the embodiments of the present invention can be also realized in the form of computer data signals embedded in a carrier wave where the program code is embodied by electronic transmission.

The embodiments of the present invention are not limited to the above-mentioned embodiments, and various modifications are possible within the scope of the claims. Thus, embodiments obtained by combining technical means modified appropriately within the scope defined by claims are included in the technical scope of the present invention.

CROSS-REFERENCE OF RELATED APPLICATION

This application claims the benefit of priority to JP 2016-2016-244902 filed on Dec. 16, 2016 and to JP 2016-2016-249778 filed on Dec. 22, 2016, which are incorporated herein by reference in its entirety.

INDUSTRIAL APPLICABILITY

The embodiments of the present invention can be preferably applied to an image decoding apparatus to decode coded data where graphics data is coded, and an image coding apparatus to generate coded data where graphics data is coded. The embodiments of the present invention can be preferably applied to a data structure of coded data generated by the image coding apparatus and referred to by the image decoding apparatus.

REFERENCE SIGNS LIST

10 CN information decoder
11 Image coding apparatus
20 CU decoder
31 Image decoding apparatus
41 Image display apparatus

The invention claimed is:

1. An image decoding apparatus for decoding a picture for each of coding tree units, the image decoding apparatus comprising:
   coding node (CN) information decoding circuitry configured to:
      perform a binary tree (BT) split possibility determination based on a width of a target node, a height of the target node, a first minimum size of a coding unit (CU), a first maximum size of the CU, and a level of hierarchy of the target node,
      perform a ternary tree (TT) split possibility determination based on the width of the target node, the height of the target node, a second minimum size of the CU, a second maximum size of the CU, and the level of hierarchy of the target node,
      determine whether or not decoding of a partition tree (PT) split flag is required, wherein the PT split flag indicates whether or not the target node is to be split by a binary tree split or a ternary tree split,
      decode the PT split flag in a case that decoding of the PT split flag is required,
      determine whether or not decoding of a split direction flag is required in a case that the PT split flag indicates that the target node is to be split by the binary tree split or the ternary tree split, wherein the split direction flag indicates a split direction,
      decode the split direction flag in a case that decoding of the split direction flag is required,
      determine whether or not decoding of a split mode selection flag is required, wherein the split mode selection flag indicates a split method which is the binary tree split or the ternary tree split,
      decode the split mode selection flag in a case that decoding of the split mode selection flag is required, and
      split the target node of the coding tree units by the binary tree split or the ternary tree split based on the split direction flag and the split mode selection flag, wherein
   the CN information decoding circuitry further determines additional conditions of the BT split possibility determination,
   in a case that the target node is a middle node of three nodes obtained by performing the ternary tree split on an immediately higher node, the CN information decoding circuitry prohibits split of the target node by the binary tree split in a direction identical to a direction of the ternary tree split performed on the immediately higher node, and
   in a case that the binary tree split is prohibited, the CN information decoding circuitry does not decode the split mode selection flag and sets the split mode selection flag to a value indicating the ternary tree split.

* * * * *